US012168295B2

(12) United States Patent
De Bonet et al.

(10) Patent No.: US 12,168,295 B2
(45) Date of Patent: Dec. 17, 2024

(54) SYSTEMS AND METHODS FOR PRECISE AND DYNAMIC POSITIONING OVER VOLUMES

(71) Applicant: Building Machines, Inc., Hudson, MA (US)

(72) Inventors: Jeremy Samuel De Bonet, Southborough, MA (US); Nicholas Charles McMahon, Bolton, MA (US)

(73) Assignee: Building Machines, Inc., Hudson, MA (US)

( * ) Notice: Subject to any disclaimer, the term of this patent is extended or adjusted under 35 U.S.C. 154(b) by 0 days.

(21) Appl. No.: 18/707,858

(22) PCT Filed: Oct. 1, 2021

(86) PCT No.: PCT/US2021/053244
§ 371 (c)(1),
(2) Date: May 6, 2024

(87) PCT Pub. No.: WO2022/072887
PCT Pub. Date: Apr. 7, 2022

(65) Prior Publication Data
US 2024/0326237 A1    Oct. 3, 2024

Related U.S. Application Data

(60) Provisional application No. 63/086,825, filed on Oct. 2, 2020, provisional application No. 63/086,812, filed on Oct. 2, 2020.

(51) Int. Cl.
*B25J 9/10* (2006.01)
*B25J 9/00* (2006.01)
(Continued)

(52) U.S. Cl.
CPC .......... *B25J 9/1015* (2013.01); *B25J 9/0078* (2013.01); *B25J 9/026* (2013.01); *B25J 9/1628* (2013.01);
(Continued)

(58) Field of Classification Search
CPC ........ B25J 9/1015; B25J 9/0078; B25J 9/026; B25J 9/1628; B25J 11/00
See application file for complete search history.

(56) References Cited

U.S. PATENT DOCUMENTS 11,556,724 B1 *   1/2023   Barter ..................... G06N 7/08
2010/0280663 A1   11/2010  Abdallah et al.
(Continued)

OTHER PUBLICATIONS

International Search Report and Written opinion issued by the U.S. Patent and Trademark Office as the International Searching Authority (US/ISA) for International PCT Application No. PCT/US2021/053244, mailed Dec. 23, 2021, 14 pages.
(Continued)

*Primary Examiner* — Kira Nguyen
(74) *Attorney, Agent, or Firm* — SPRINKLE IP LAW GROUP

(57) ABSTRACT

Embodiments of positioning systems and methods are disclosed herein. Embodiments of such positioning systems may include a hierarchy of positioning systems. Each of the positioning systems in the hierarchy may be adapted to move each positioning system lower in the hierarchy along with one or more end-effectors. A control system may control the positioning systems of the hierarchy using a control method comprising a coarse step, a refinement step, or an adaptive step.

24 Claims, 44 Drawing Sheets

(51) Int. Cl.
- *B25J 9/02* (2006.01)
- *B25J 9/16* (2006.01)
- *B25J 11/00* (2006.01)
- *B28B 1/00* (2006.01)
- *B33Y 30/00* (2015.01)
- *B33Y 50/02* (2015.01)
- *E04G 11/20* (2006.01)
- *E04G 21/04* (2006.01)
- *E04G 21/06* (2006.01)

(52) U.S. Cl.
CPC ............... *B25J 11/00* (2013.01); *B28B 1/001* (2013.01); *B33Y 30/00* (2014.12); *B33Y 50/02* (2014.12); *E04G 11/20* (2013.01); *E04G 21/04* (2013.01); *E04G 21/065* (2013.01)

(56) References Cited

U.S. PATENT DOCUMENTS

| | | |
|---|---|---|
| 2014/0277743 A1 | 9/2014 | Hart et al. |
| 2014/0358284 A1* | 12/2014 | Laurent ............... G05D 1/0016 700/264 |
| 2017/0226758 A1* | 8/2017 | Meinert ................ B33Y 30/00 |
| 2019/0201158 A1 | 7/2019 | Shelton, IV et al. |
| 2019/0291277 A1 | 9/2019 | Oleynik |
| 2022/0298812 A1* | 9/2022 | Compton ............. B29C 64/106 |

OTHER PUBLICATIONS

International Preliminary Report on Patentability (IPRP) issued by the International Bureau of WIPO for International PCT Application No. PCT/US2021/053244, mailed Apr. 13, 2023, 13 pages.

* cited by examiner

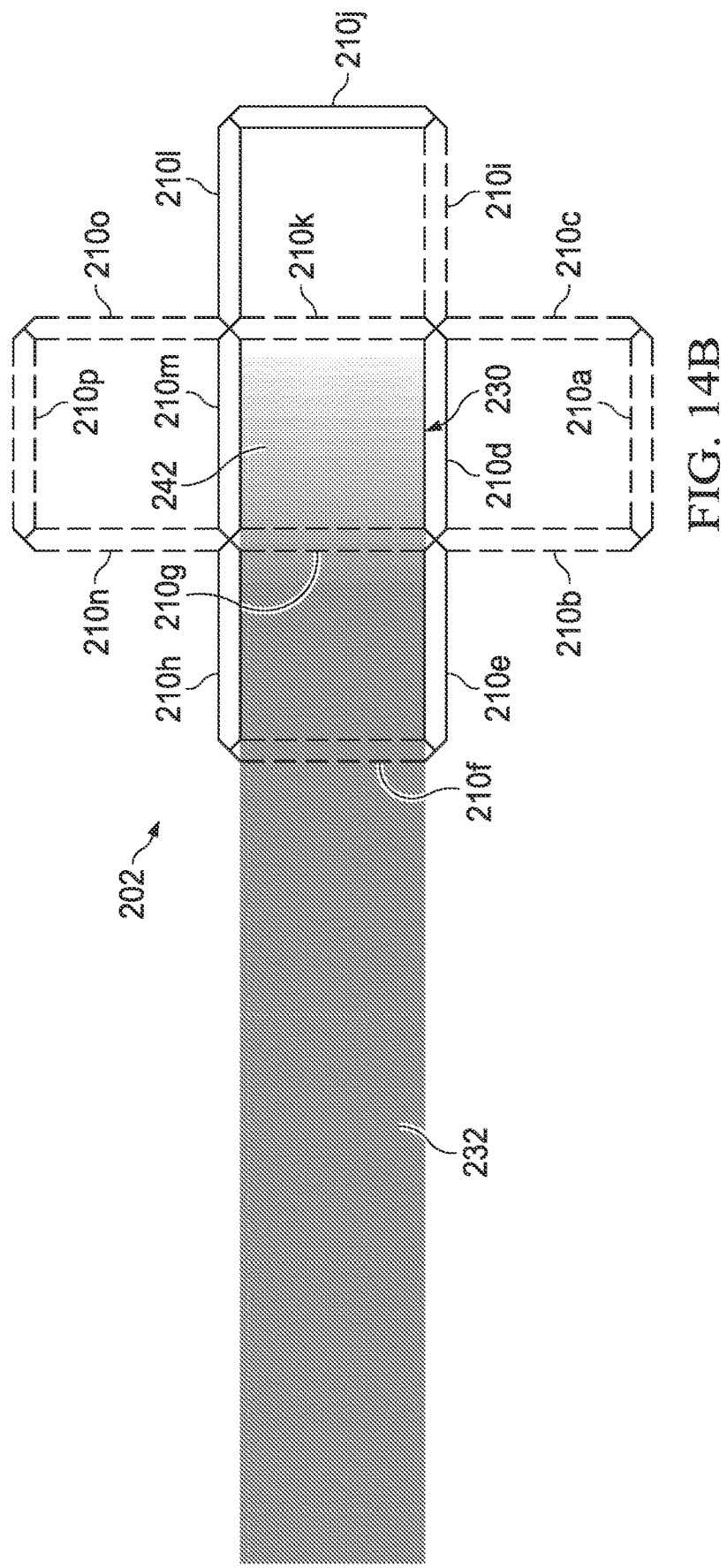

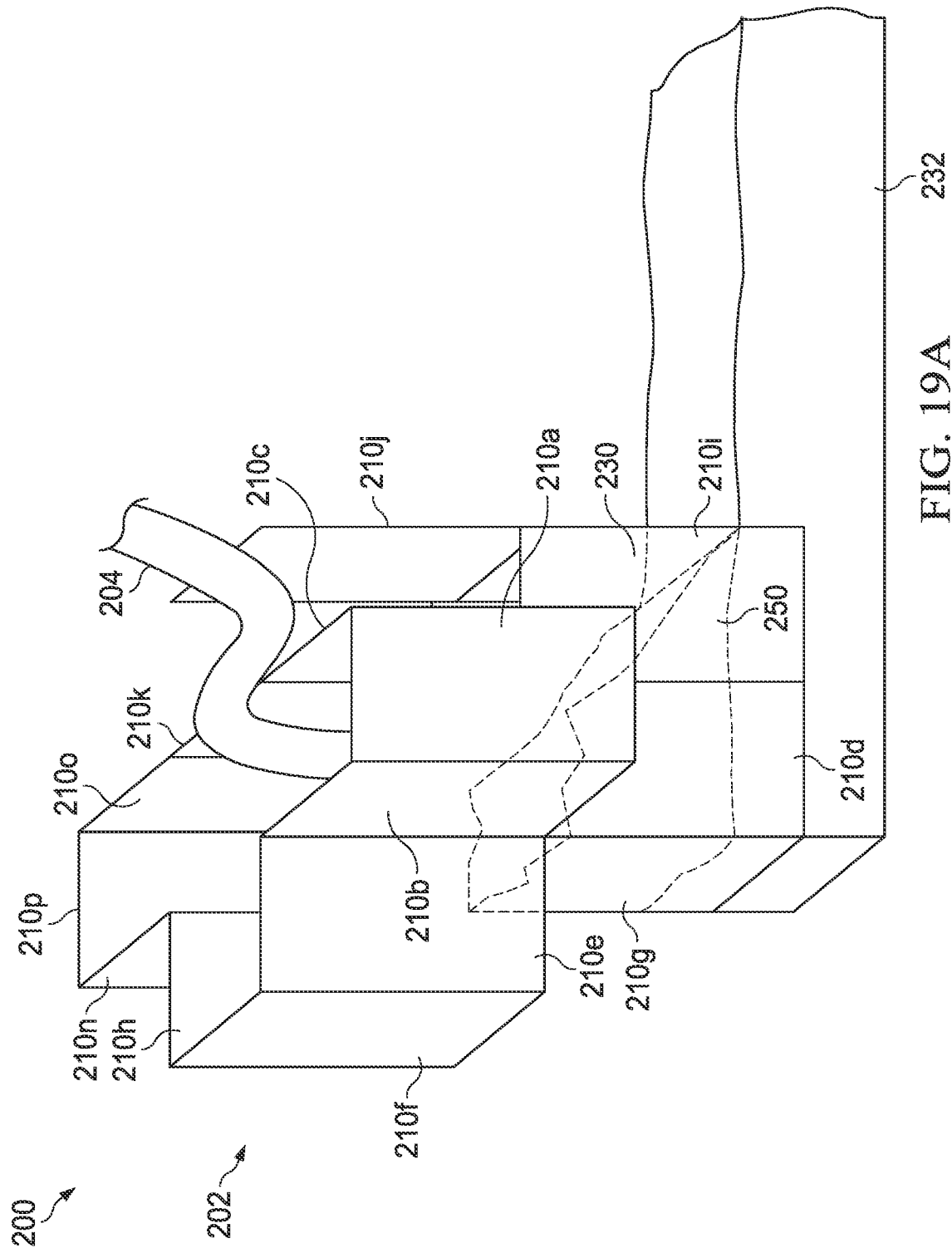

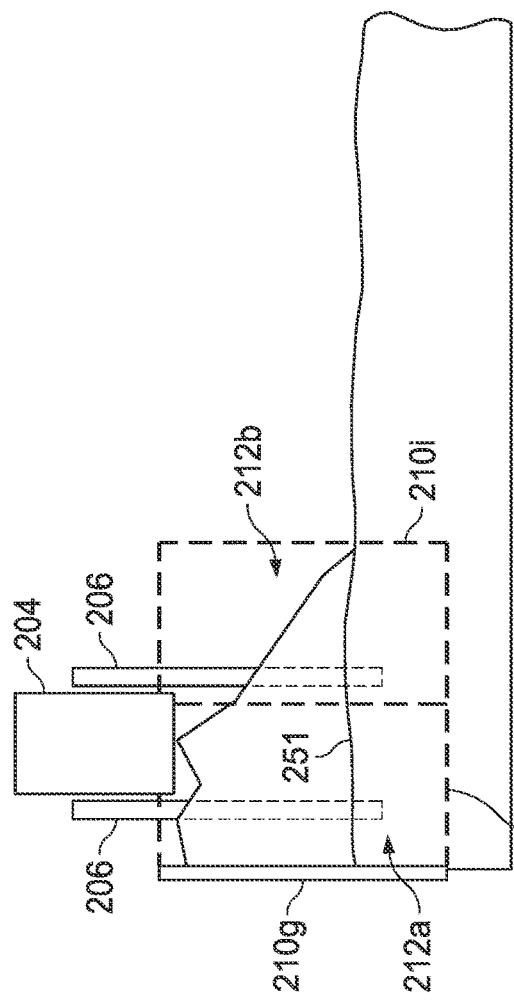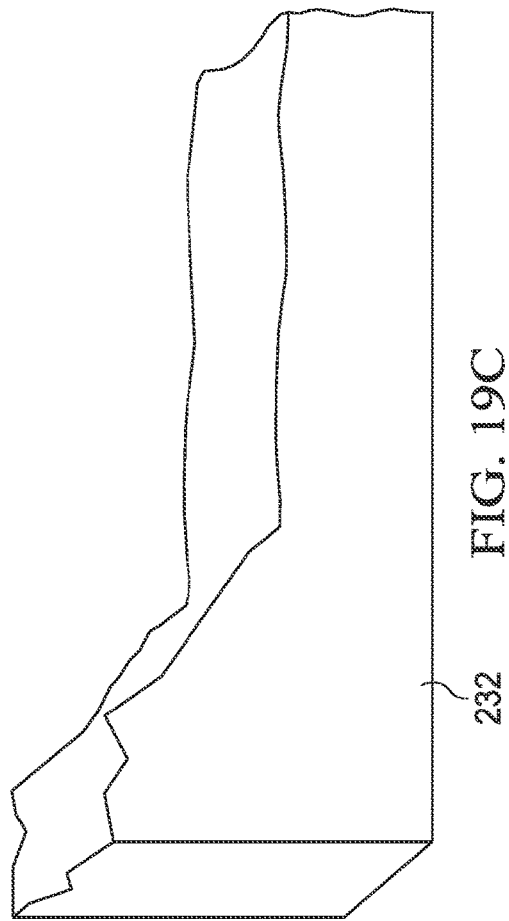

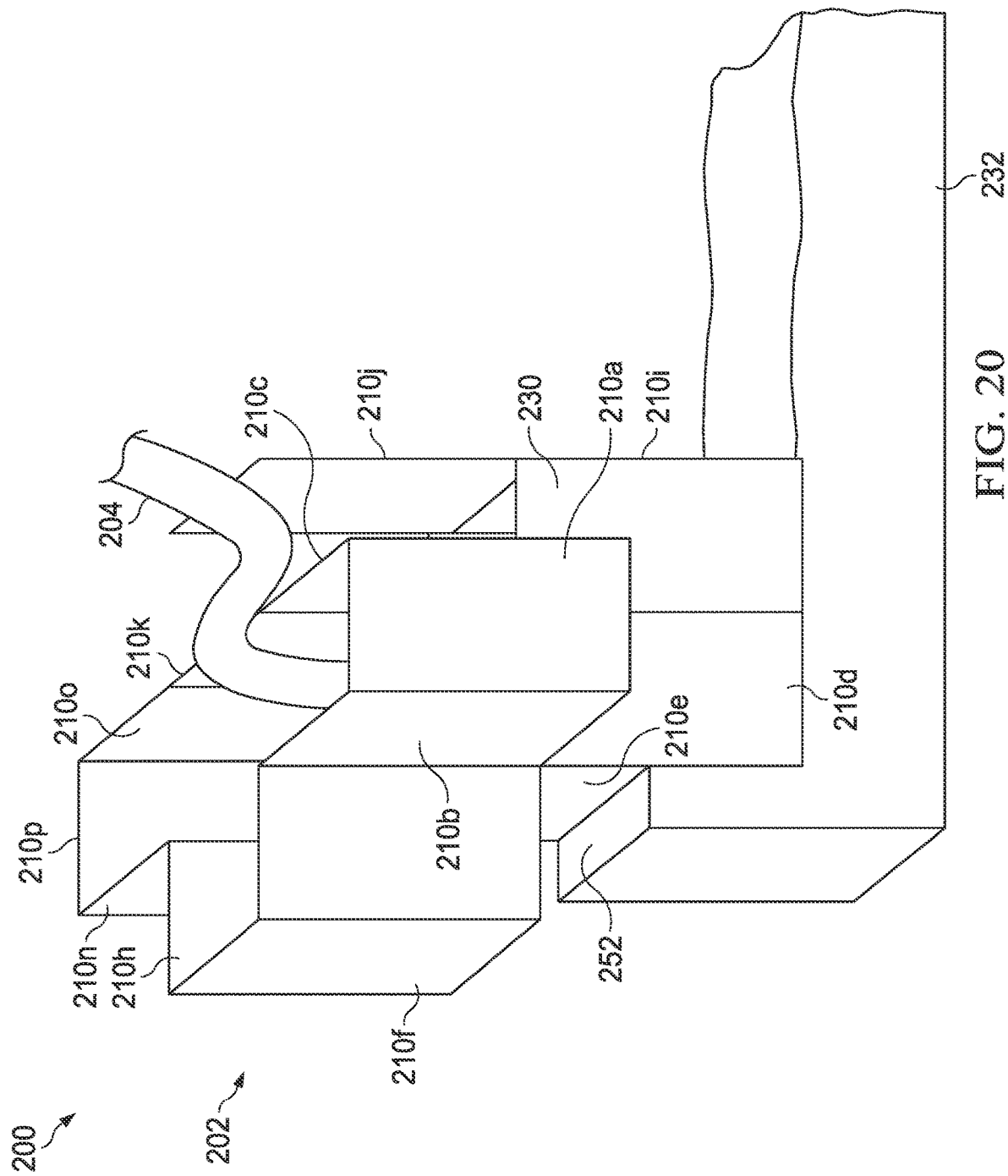

SYSTEMS AND METHODS FOR PRECISE AND DYNAMIC POSITIONING OVER VOLUMES

RELATED APPLICATIONS

This is a national stage application of International Application No. PCT/US2021/053244, filed Oct. 1, 2021, entitled "SYSTEMS AND METHODS FOR PRECISE AND DYNAMIC POSITIONING OVER VOLUMES," and claims the benefit of priority under 35 U.S.C. § 119 to U.S. Provisional Application No. 63/086,825 filed Oct. 2, 2020, entitled "PRECISE AND DYNAMIC POSITIONING OVER LARGE VOLUMES," by De Bonet et. al and to U.S. Provisional Application No. 63/086,812 filed Oct. 2, 2020, entitled "CONTINUOUS CASTING OF MATERIAL THROUGH COMPUTER CONTROLLED DYNAMIC FORM ADJUSTMENT," by McMahon et. al, the entire contents of which are hereby fully incorporated herein by reference in their entirety for all purposes.

TECHNICAL FIELD

This disclosure relates generally to automated positioning systems. More particularly, this disclosure relates to embodiments of automated positioning systems and methods that provide a high degree of precision, even over large spans or volumes. Specifically, this disclosure relates to embodiments of automated positioning systems and methods that provide a high degree of precision in a dynamic environment, such as those environments where conditions may result in a deviation of the actual environment from the anticipated environment.

BACKGROUND

In the modern world, there are myriad circumstances where it is desired to locate a payload in space (e.g., a one, two, or three, or four dimensional space or space-time, or greater dimensional space, including, for example, the Euler Angles Psi, Theta, Phi that will be referred to herein as a volume without loss of generality). In particular, in many of these circumstances it is desired to locate such a payload with a high degree of precision. In many cases, current methods and systems utilized for such positioning require extensive calibration, incur significant cost, complexity, or result in fragile systems.

To illustrate in more detail, current positioning systems, including but not limited to overhead gantries, delta systems, Selective Compliance Articulated Robot Arms (SCARA robots), booms and robotic arms, or other such controllable motion systems, usually operate in an "open-loop" manner with respect to the actual positioning of the end effector. This mode of operation means that these systems adjust their internal actuators to a desired state and then rely on mechanical properties of the system to ensure that the actuation results in accurate positioning of the payload. While the actuators of the positioning system themselves may contain "closed-loop" feedback, wherein the actuators' internal state is measured and adjusted, there is no similar closed-loop that evaluates the position of the payload, which may be the summation of more than one actuators' movements. The current use of these types of positioning systems thus result in either less precision than needed, or higher costs than are desirable, for many applications.

These problems are exacerbated as the volume over which such positioning systems operate grows larger and the precision desired in the positioning of the payload increases. Specifically, as the distance over which the payload moves grows larger it is harder to maintain precision of movement. In the main, this lack of precision is a result of the design and cost constraints of these positioning systems. Usually the resolution of positioning systems designed for large volumes is too low for precise positioning (and repositioning) of a payload: even if the positioning of a payload can be accurately ascertained the size of any correction needed will be increasingly large as the size of the space the payload is moving over increases. Thus, typical positioning systems designed for use in large volumes, and built to account for the cost, weight, complexity, speed or other constraints involved in the implementation or design of such systems, have difficulty obtaining precise positioning of a payload, because the resolution (e.g., the ability to make precise smaller scale movements) of such positioning systems is too large.

While a single very precise system could possibly be built for such volumes, the cost of such a positioning system is infeasible in some contexts. Moreover, because of the nature of such precise positioning systems, the use of such a system over a large volume would result in a high degree of mechanical unreliability of the positioning system. This unreliability stems at least in part from the complexity and weight required for a positioning system designed for precision positioning over large volumes. Generally then, the larger range over which is desired to try to position a payload using a positioning system, the lower the precision of positioning for a given amount of cost and other factors.

In addition to the problems involved in precise positioning of a payload with such positioning systems (e.g., open-loop positioning systems, positioning systems for use with large volumes, etc.), certain problems in the positioning of a payload may be introduced by the environment in which the positioning system is operated. Namely, environmental factors related to the environment in which the payload is being positioned may result in a differentiation between the actual position desired at the time of positioning and the position originally desired at the time of planning.

For example, the payload of a positioning system may be an end-effector adapted to accomplish some task (the terms "end-effector" and "payload" will thus be used herein interchangeably without loss of generality). As but one instance, the end-effector may be a system used in construction to place or form building material to construct an object. The object under construction may thus be constructed according to a plan (e.g., "plan," "blueprint," "schematic," "rendering," "design file," etc. used interchangeably herein). In this manner, using such a plan a position for the end-effector may be determined, and that position provided to the positioning system such that the positioning system can position the end-effector at the desired position (e.g., thus an initially desired or determined position for positioning a payload may be referred to as the "as-planned" position or as-planned environment herein without loss of generality).

However, because of factors such as inaccurate initial positioning (e.g., of the positioning system with respect to the jobsite or an object), or environmental factors such as those resulting from deviations of the actual object under construction from the planned object, wind, vibration, inconsistent or different material properties, changes or deviations in the positioning system or end-effector itself, etc., even if accurately positioned per the initial plan, the end-effector may not actually be properly positioned to accomplish its task. For example, the end-effector may be misaligned with respect to the object (or portion of the object) under construction (thus, the real-world environment may be referred to as the "as-built" or "as-changed" environment without loss of generality). Again, the use of positioning systems in large volumes exacerbates this problem as well, as there tends to be greater deviation between an actual position achieved and the intended position desired when large volumes are involved.

Accordingly, there is a need for improved positioning systems and methods, including improved positioning systems and methods that may be effectively utilized with large volumes or to dynamically position a payload to account for deviations between an as-planned environment and the real-world environment in which the payload is being positioned.

SUMMARY

As discussed above, current positioning systems may provide less precise positioning than is desired for many applications, including use over large volumes. Moreover, such positioning systems may not account for deviation between an initially desired position for payload and a desired position for a payload with respect to the existing, and possibly changing, real-world environment. As such, improved positioning systems and methods that may be effectively utilized with large volumes or to dynamically position a payload to account for the real-world environment are desired.

To those ends, among others, attention is now directed to embodiments of the positioning systems and methods disclosed herein. Embodiments of such positioning systems may include a hierarchy of positioning systems comprising one or more positioning systems of increasing resolution (it will be understood herein that the term resolution as used will encompass both resolution and accuracy). These positioning systems may, or may not, also be of decreasing (or increasing) range, speed, or other characteristics. Thus, a positioning system higher in the hierarchy of positioning systems may have a lesser (coarser) resolution than all other positioning systems lower in the hierarchy, while a positioning system lower in the hierarchy may have a greater (finer) resolution than all other positioning systems higher in the hierarchy. As such, embodiments may provide sequenced positioning systems so that the first positioning system provides a lower positional resolution over a larger area, and then each subsequent system refines that position over a smaller area with greater resolution. In some cases, as a positioning system in the hierarchy may be of lower resolution that those positioning systems lower in the hierarchy (e.g., and of finer resolution), a positioning system may also be adapted to provide faster positional resolution over a larger volume than one or more positioning systems lower in the hierarchy.

Each of the positioning systems in the hierarchy may be adapted (e.g., coupled to) each of the positioning systems lower in the hierarchy (and any payload being positioned by the positioning system) such that each positioning system is adapted to position (e.g., move) each positioning system lower in the hierarchy (along with the payload). Thus, a coarser positioning system in the hierarchy of positioning systems is adapted to position (move) all finer positioning systems in the hierarchy along with the payload.

While any positioning system may be utilized as a positioning system in the hierarchy, by using separate positioning systems in a hierarchy according to embodiments, whereby a coarser positioning system higher in the hierarchy is adapted to position finer resolution systems lower in the hierarchy (along with the payload), the positioning systems in the hierarchy can be tailored to their specific tasks. For example the finer (or finest) positioning system in the hierarchy can be higher cost higher resolution positioning system with lesser range such as a hexapod or robotic arm while a coarser (or coarsest) positioning systems in the hierarchy can be lower cost lower resolution positioning systems such as a gantry, tower and cables or a knuckle boom crane.

By putting wholly separate positioning systems in the hierarchy the positioning systems higher in the positioning hierarchy can be utilized for lower resolution positioning and the positioning systems lower in the hierarchy may be utilized for higher resolution positioning. In this manner, highly accurate positioning can be achieved without the expense, complexity, fragility, or latency of implementing an extremely high resolution positioning system that is capable of positioning over (e.g., large) volumes.

The positioning system according to embodiments may also have a positioning sensor and a control system. The positional (or position) sensor may be adapted to sense the position of the payload being moved and provide the sensed positional data to the control system. The control system may include a processor or controller coupled to the positioning systems of the hierarchy and is configured to control each of the positioning systems of the hierarchy (e.g., to achieve a desired position of the payload).

Specifically, the control system may control the positioning systems of the hierarchy using a control method comprising a coarse control step ("coarse step") and a refinement control step ("refinement step"). In embodiments the coarse step may be a control step for moving the payload to a position desired (e.g., by a plan provided to the control system) while the refinement step may be a control step which applies corrective movement to one or more of the positioning systems of the hierarchy based on the deviation between the actual position sensed by the positional sensor after by coarse step, and the position desired (e.g., according to the plan). The coarse step and the refinement step may each operate as an open-loop or closed-loop control step, however, in one embodiment the coarse step may be an open-loop control step while the refinement step may be a closed-loop control step.

In this manner, the payload may be moved to a desired predetermined position (e.g., according to plan) within a resolution of the finest resolution positioning system of a positioning hierarchy. As discussed, however, the payload being moved by the positioning system of embodiments may be an end-effector used in manipulating objects, depositing material, removing material, marking, or other tasks related to manufacturing, and in particular, additive manufacturing. Thus, the predetermined desired (as-planned) position of the end-effector may not be ideal given the real-world dynamic conditions that exist at the time of positioning.

To address these deviations between the as-planned position and the actual real-world environment or other conditions, the positioning system of embodiments may include a domain sensor that senses domain data about the domain (e.g., related to the pointing system and its deployment or operation). Generally then, a domain refers to entities and conditions within the volume that the positioning system or end effector may encounter or be encountered by. This may include environmental variables such as objects that are native to, or resident in, the volume that the positioning system is working in, or conditions that persist or exist in the volume such as wind, temperature, vibration etc. Other objects may include objects that the end effector or pointing system is interacting with or otherwise building on or subtracting from, picking up or in some way manipulating.

Accordingly, the sensed domain data may include data associated with the position of the end-effector relative to a real-world entity (e.g., an object under construction) or data related to the real-world entity itself, conditions related to the environment in which the positioning system is operating (e.g. the wind, vibration, inconsistent material properties, accumulated positional errors, etc.) or data related to the positioning system or end-effector itself (e.g., the size, shape, degradation or deviation from a norm of the positioning system or end-effector).

A relative position of the payload (e.g., relative to a real-world entity) as sensed by the domain sensor may thus be provided to the control system which is adapted to include a reactive or adaptive (used interchangeably) step in a control method for controlling the (e.g., finest resolution) positioning system of the hierarchy. The adaptive positioning step may run closed-loop such that the control system moves the end-effector by instructing the (e.g., actuator of) a positioning system of the hierarchy (e.g., the finest positioning system) to move (e.g., a certain amount), or achieve a particular position, based on domain data associated with the actual real-world conditions in which the end-effector is to be positioned taken by the domain sensor, or domain data related to the position, orientation or shape, of objects in the environment with which the end-effector will interact.

This adaptive step allows embodiments of the positioning system as disclosed to compensate for differences between the actual real-world conditions and a plan (e.g., the planned environment). For example, in the case where the end-effector is utilized in additive manufacturing to compensate for the deviation between an as-built object and the as-planned object. As an example, the end-effector may be an additive builder having an additive head. The additive builder has slats, wall segments or arms that move to form a cavity into which material may be injected or otherwise deposited or delivered. In some embodiments, one or more of those wall segments may incorporate, or be coupled to, a force sensor to measure the load, or relative load, on one or more of the wall segments to determine if is not positioned over the object (e.g., a wall or the like) being constructed by the additive builder. In that manner, the adaptive step can adjust the position of the additive builder or additive head to balance the output from the sensors in two or more wall segments to balance out the force on each wall segment of the additive builder to ensure that the additive builder or head is equal effectively positioned (e.g., centered) over an object being built.

It will be realized that not only may an end-effector be positioned to correct for deviation between an as-built object and an as-planned object in an adaptive step but, if desired, may instead (or also) be positioned to correct for this deviation such that the object under construction may be brought into (or closer to) compliance with the plan for the object. Accordingly, the adaptive step may position the end-effector based on the domain data to correct for the deviation and (e.g., gradually bring the object being built into (e.g., closer) compliance with the plan for that object.

In some embodiments with multiple positioning systems in the hierarchy of positioning systems, the coarse, refinement, and adaptive steps are first run on the highest (e.g., coarsest) positioning system in the hierarchy, then repeated sequentially on each subsequent finer positioning system. In other embodiments with multiple positioning systems in the hierarchy, some of the coarse, refinement, or adaptive steps may be skipped. For example if the desired position is near to the current position and the highest (e.g., coarsest) positioning system does not have the resolution required to meet the precision required by the adaptive step, the control system may only execute the coarse and refinement control steps with respect to that positioning system.

As can be seen from the previous discussion, embodiments as disclosed herein may thus provide a positioning system that employs a multi-step control method to utilize a hierarchy of positioning systems including one or more positioning systems to accurately locate an end-effector within a volume in such a way that it precisely balances the as-planned position with adjustments needed to compensate for deviations in real-world (e.g., as-built, or as-changed) conditions.

Embodiments of the positioning system establish position based on 1) an open-loop coarse step intended to move an end-effector to a position desired by a plan; 2) a closed-loop refinement step which applies corrective movement based on the deviation between a sensed actual position of the end effector, achieved after the initial positioning of the coarse step is performed, and the position desired by the plan; and 3) a final closed-loop adaptive step which further refines the position based sensed environmental data to dynamically compromise between the actual environment and the idealized as-planned assumptions.

Accordingly, embodiments of a positioning system may utilize a hierarchy of positioning systems to achieve high precision and accuracy even over very large volumes and allow for compensation for deviations between the actual and assumed domain such as those caused by conditions where wind, vibration, inconsistent material properties, accumulated positioning errors, internal problems or changes with the positioning system or reconfigurations of the end-effector itself, or other effects resulting in deviations of the real-world (domain) conditions (e.g., environment) from the as-planned environment. Embodiments may thus be particularly suited to subtractive manufacturing or construction, additive manufacturing or construction, job sites, factories, automating construction site tasks such as building, marking, cutting, excavating, moving materials or equipment, or for other contexts that require accurate positioning or manipulation of objects. As such, embodiments can also be used as a refinement or replacement of positioning systems used in additive or subtractive manufacturing, robotic or robotically-assisted surgery, mobile targeting systems, and robotic manipulation.

As can be seen, embodiments as disclosed may provide a number of advantages. In particular, embodiments may represent a significant advance over current positioning systems which neither evaluate and adjust the final position of payload based upon measurements of the actual location reached after movement (which typically deviates from the intended position due to such factors as tolerance stack-ups, and the inaccuracies inherent to any actuator or system of actuators) nor adequately adjust the final position of a payload based upon evaluation of the actual real-world environment including changes made previously, such as deviations between an as-planned and as-built structure due to inconsistent material properties.

Moreover, embodiments may represent a significant advance over current positioning systems by decoupling a systems accuracy from its range. Typically, motion systems need to trade-off speed, range, and accuracy along with cost, weight and even setup time. Embodiments of the disclosed systems and methods may use a highly accurate system with small range, carried by a low accuracy system with large range, allowing for large areas to be traversed quickly, while still maintaining high accuracy in positioning a payload.

In some embodiments, a positioning system may include a hierarchical positioning system adapted to move an end-effector coupled to the hierarchical positioning system. The hierarchical positioning system can comprise a set of positioning systems arranged in a hierarchy such that a coarse positioning system of the set of positioning systems is adapted to move a finer positioning system of the set of positioning systems and the end-effector, and the finer positioning system is adapted to move the end-effector.

The positioning system can also include a control system adapted to control the hierarchical positioning system by performing a coarse positioning step, wherein performing the coarse positioning step comprises controlling the coarse positioning system of the hierarchical positioning system to move finer positioning system and the end-effector to a first position associated with a plan. This coarse positioning step may be run open-loop or closed-loop in various embodiments. Subsequent to, or while, performing the coarse positioning step the control system may perform a refinement positioning step, wherein performing the refinement positioning step comprises obtaining sensed position data associated with an actual position of the end-effector, and controlling the finer positioning system of the hierarchical positioning system to move the end-effector based on a determination of the difference between the first position and the actual position of the end-effector. This refinement positioning step may also be run open-loop or closed loop in various embodiments.

In various embodiments, the coarse positioning system and finer positioning system are a crane, a gantry, a tower and cable positioning system, a robotic arm, a delta system, a SCARA system, or a hexapod, among others known to practitioners of the art.

In one embodiment, the coarse positioning system and the finer positioning system comprise the same type of positioning system.

In certain embodiments, the control system is adapted to control the hierarchical positioning system by performing a closed-loop adaptive positioning step subsequent to performing the refinement positioning step. Performing the adaptive positioning step may comprise obtaining sensed domain data associated with an environment, including sensed domain data associated with the end-effector and an object in the environment and controlling at least the finer positioning system of the hierarchical positioning system to move the end-effector to a desired position relative to the object in the environment based on the sensed domain data.

In a particular embodiment, the plan is associated with the object and the adaptive positioning step is adapted to compensate for a deviation between the object and the plan associated with the object.

In an embodiment the domain sensor for sensing the sensed domain data may be incorporated into the end-effector or be static with respect to the environment. The end-effector may, for example be an adaptive building head of an additive builder.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions, or rearrangements may be made within the scope of the invention, and the invention includes all such substitutions, modifications, additions, or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 14B is a diagrammatic representation of a top view of one embodiment of the adjustable form with material dispensed at the sixth location to extend the portion of the object being created.

FIG. 19A is a diagrammatic representation of one embodiment of dispensing new material into the adjustable form and at a tenth location, which is above the first location, to vertically extend the portion of the object being created.

FIG. 19B is a diagrammatic representation of one embodiment of consolidating the dispensed material.

FIG. 19C is a diagrammatic representation of one embodiment of a subsection of the portion of the object being created.

FIG. 20 illustrates one embodiment of the adjustable form moving from the tenth location to another location, which is above the second location.

DETAILED DESCRIPTION

Figure 1:
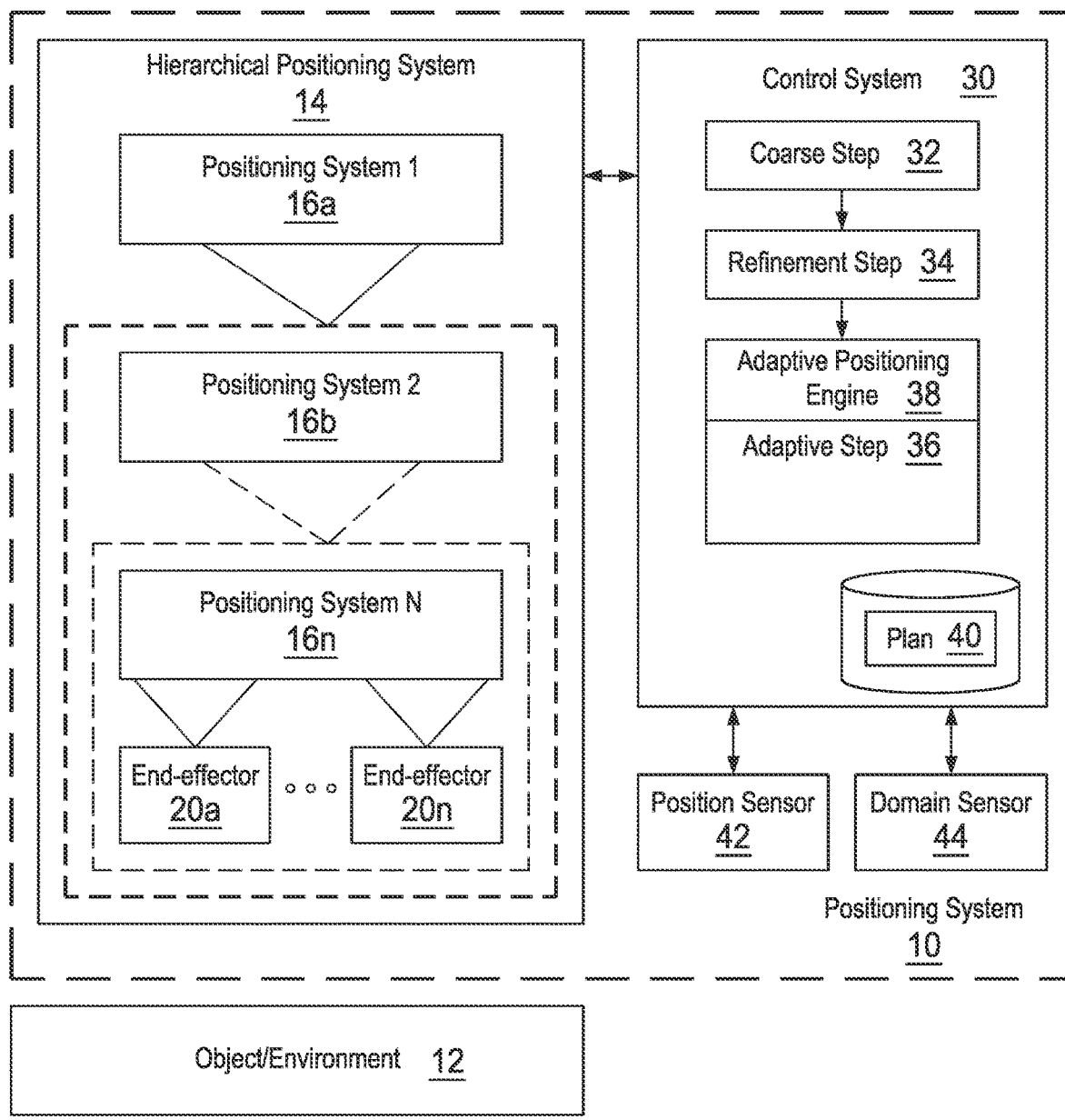
FIG. 1 is a block diagram of one embodiment of a positioning system.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in more detail, it may be helpful to discuss some context around document analysis systems. As mentioned above, current positioning systems have less precision than is needed or desirable for many applications. This problem is exacerbated as the volume over which such positioning systems operate grows larger and the precision desired in the positioning of the payload increases. In addition to the problems involved in precise positioning of a payload with such positioning systems certain problems in the positioning of a payload may be introduced by the environment in which the positioning system is operated. Namely, environmental factors related to the environment in which the payload is being positioned may result in a differentiation between the position desired dynamically at the time of positioning and the original position desired.

For example, the payload of a positioning system may be an end-effector adapted to accomplish some task. As but one instance, the end-effector may be an additive manufacturing system (or portion thereof such as a head or the like) used in construction to place or form building material to construct an object. The object under construction may thus be constructed according to a plan. In this manner, using such a plan a position for the end-effector may be determined, and that position provided to the positioning system such that the positioning system can position the end-effector at the desired position (e.g., thus an initially desired or determined position for positioning a payload may be referred to as the "as-planned" position or as-planned environment herein without loss of generality).

However, because of factors such as inaccurate initial positioning, or environmental factors such as those resulting from deviations of the actual object under construction from the planned object the end-effector may not be properly positioned to accomplish its task. For example, the end-effector may be misaligned with respect to the object (or portion of the object) under construction. Again, the use of positioning systems in large volumes exacerbates this problem as well, as there tends to be greater deviation between an actual position achieved and the intended position desired when large volumes are involved.

Accordingly, there is a need for improved positioning systems and methods, including improved positioning systems and methods that may be effectively utilized with large volumes or to dynamically position a payload to account for deviations between an as-planned environment and the real-world environment in which the payload is being positioned.

To those ends, among others, attention is now directed to embodiments of the positioning systems and methods disclosed herein that are adapted to position a payload in a volume (e.g., a one, two, or three, or four dimensional space or space-time, or greater dimensional space, including, for example, the Euler Angles Psi, Theta, Phi). These positioning systems may employ a hierarchy of positioning system comprising one or more positioning systems of increasing resolution such that embodiments may provide a sequenced positioning system so that a higher positioning system in the hierarchy provides a lower positional resolution over a larger volume, and each subsequent system lower in the hierarchy refines that position over a smaller volume with greater resolution.

The positioning system according to embodiments may also have a positioning sensor and a control system to control each of the positioning systems of the hierarchy (e.g., to achieve a desired position of the payload). Specifically, the control system may control the positioning systems of the hierarchy using a control method comprising a coarse control step (coarse step) and a refinement control step (refinement step). Embodiments of the positioning system establishes position based on the open-loop coarse step intended to move an end-effector to a position desired by a plan and a closed-loop refinement step which applies corrective movement based on the deviation between a sensed actual position achieved after the initial positioning of the coarse step is performed.

Moreover, embodiments of a positioning system as disclosed may account for deviations between an as-planned position and the actual real-world conditions (e.g., environment) by including an domain sensor that senses domain data that can include data associated with the position of the end-effector relative to a real-world entity (e.g., an object under construction), data related to the real-world entity itself, conditions related to the environment in which the positioning system is operating (e.g. the wind, vibration, inconsistent material properties, accumulated positional errors, etc.) or data related to the positioning system or end-effector itself (e.g., the size, shape, degradation or deviation from a norm of the positioning system or end-effector). The control system can thus employ a final closed-loop adaptive step which further refines the position of the payload based on sensed domain data to dynamically compromise between the actual conditions (e.g., environment) and the idealized as-planned assumptions.

Accordingly, embodiments of a positioning system may utilize a hierarchy of positioning systems to achieve high precision and accuracy even over very large volumes and allow for compensation for deviations between the actual and assumed conditions (e.g., environment) such as those caused by conditions where wind, vibration, inconsistent material properties, or other effects result in deviations of the real-world environment from the as-planned environment.

Looking now at FIG. 1, then, a block diagram of one embodiment of just such a positioning system is depicted. Here, positioning system 10 may utilize a hierarchical positioning system 14, comprising a set of (e.g., one or more) hierarchically arranged positioning systems 16 controlled by control system 30. Control system 30 utilizes input from position sensor 42 or domain sensor 44 to move one or more (a set of) end-effectors 20 (e.g., 20a, 20n, referred to herein as end-effector 20) to a position in environment 12 (e.g., for interacting with an object in environment 12). The control system may control each of the positioning systems 16 and may employ any or all of a coarse control step 32, a refinement control step 34 or an adaptive control step 36 when controlling the positioning systems 16. Each positioning system 16 may be coupled to, or otherwise adapted to move, the end-effector 20, and may also be adapted to move each of the positioning systems 16 lower in hierarchy of positioning systems 16 (e.g., but may not be adapted to move any positioning systems 16 higher in the hierarchy of positioning systems 16).

Position sensor 42 may be fixed in position, or attached to any of the positioning systems 16 or may be attached to the end-effector 20. The position sensor 42 is adapted to sense the position of the end-effector 20 and provide position data to the control system 30 (e.g., for use is refinement step 34). An domain sensor 44 may be fixed in position, or attached to any of the positioning systems 16 or may be attached to the end-effector 20. The domain sensor 44 may be the same as position sensor 42 or completely or partially make use of position sensor 42. The domain sensor 44 may sense domain data related to the real-world conditions including those associated with environment 12 or entities within the environment 12 (e.g., objects), or with which or in which the end-effector 20 will operate, and provide the sensed domain data to the control system 30 (e.g., for use in adaptive step 36). This domain data may thus include data on conditions such as the data related to object under construction, wind, vibration, material properties, accumulated positioning errors, internal problems or changes with the positioning system or end-effector itself, or other data associated with real-world conditions. The environment 12 or objects in the environment may be manipulated, added to, subtracted from, or otherwise interacted with by the end-effector 20 in response to instructions delivered by the control system 30.

To illustrate in more detail, embodiments of positioning system 10 may include a hierarchy of positioning systems 14 comprising one or more positioning systems 16 of increasing resolution (resolution being defined as the margin of error, precision, or accuracy, of a positioning system in positioning a payload, with a lesser resolution being associated with a greater margin of error and lesser precision or accuracy when positioning that payload and a greater resolution being associated with a lesser margin of error and greater precision or accuracy when positioning that payload). Thus, a positioning system 16 higher in the hierarchy of positioning systems 14 (e.g., positioning system 1 16a) may have a lesser resolution (referred to also as a coarser resolution) than all other positioning systems 16 lower in the hierarchy, while a positioning system lower in the hierarchy (e.g., positioning system N 16n) may have a greater resolution (referred to also as a finer resolution) than all other positioning systems 16 higher in the hierarchy. Thus, embodiments may provide sequenced positioning systems 16 so that the first positioning system 16a provides a lower positional resolution over a larger area, and then each subsequent system 16 refines that position over a smaller area with greater resolution.

Each of the positioning systems 16 in the hierarchy of positioning systems 14 may be adapted to provide movement along the same axes or dimensions as the other positioning systems 16 in the hierarchy such that the positioning systems 16 may provide redundant or parallel movement along the same axes. The axes of each positioning system 16 need not be aligned in embodiments; thus the positioning systems 16 may provide movement along unaligned axes such that the positioning systems 16 subtend the same space. Thus for example, one positioning system 16 can move the payload along an X, Y or Z axis, while the second positioning system 16 can provide movement of the payload along an X', Y' or Z' axis such that X, Y, or Z axes and X', Y' or Z' axes of the respective positioning system 16 may not be aligned but the positioning systems 16 may still be adapted to subtend the same space.

Each of the positioning systems 16 in the hierarchy may be adapted (e.g., coupled to) each of the positioning systems 16 lower in the hierarchy (and the end-effector 20 being positioned by the positioning system) such that each positioning system 16 is adapted to position (e.g., move) each positioning system 16 lower in the hierarchy (along with the end-effector 20). Thus, a coarser positioning system 16 in the hierarchy of positioning systems 14 is adapted to position (move) all finer positioning systems 16 in the hierarchy along with the end-effector 20.

While any positioning system such as overhead gantries, knuckle boom cranes, delta systems, SCARA robots, tower and cables, robotic arms, hexapods, linear stage, rotary stage, springs or other passive compliance, or other methods for creating motion as would be understood by those of ordinary skill the art may be utilized as a positioning system 16 in the hierarchy, by using separate positioning systems 16 in a hierarchy, whereby a coarser positioning system 16 higher in the hierarchy is adapted to position finer resolution positioning systems 16 lower in the hierarchy (along with the end-effector 20), the positioning systems 16 in the hierarchy can be tailored to their specific tasks. For example the finer (or finest) positioning system 16 (e.g., positioning system 16n) in the hierarchy can be a higher cost, higher resolution, lower speed positioning system with lesser range such as a hexapod while the coarser (or coarsest) positioning systems in the hierarchy (e.g., positioning system 16a) can be lower cost, lower resolution, higher speed positioning systems with larger range such as a gantry, tower and cables or a knuckle boom crane.

Moreover, the positioning system 16 selected for use in the hierarchy, or at a particular level of the hierarchy, may be selected based on the operating environment 12 in which the positioning system 10 is going to be operated, or the end-effector 20 being moved, or an object under construction. As an example, towers and cables may be utilized as a coarser positioning system 16 in cases where a tall building is being constructed while a gantry or knuckle boom crane may be utilized as a coarser positioning system 16 when a housing foundation is being constructed.

Generally then, the first (e.g., coarsest) positioning system 16 may be selected to have a range of motion that extends to the complete volume of interest of the application (e.g., the volume of environment 12), and the final (e.g. finest) positioning system must meet the resolution and accuracy required by the application (e.g., for which the positioning system is being employed). Additionally, each positioning system 16 in the hierarchy can be selected to have a range of motion that covers at least a potential margin of error of the positioning system 16a above it in the hierarchy (e.g., positioning system 16b may have a range of motion that covers at least the potential margin of error of positioning system 16a).

As an example, in the case where two positioning systems 16 are utilized in the hierarchy in an additive manufacturing process (which will be discussed herein in more detail), the coarse positioning system (e.g., a knuckle boom crane, tower and cable, or gantry) may be selected to have a margin of error of about one foot while the finer positioning system (e.g., hexapod) may be selected to have a range of about two feet with a margin of error of about a millimeter. By putting wholly separate positioning systems in the hierarchy the positioning systems higher in the positioning hierarchy can be utilized for lower resolution positioning and the positioning systems lower in the hierarchy may be utilized for higher resolution positioning. In this manner, highly accurate positioning can be achieved without the expense of implementing an extremely high resolution positioning system that is capable of positioning over (e.g., large) volumes.

The positioning system 10 according to embodiments may also have positional (also referred to as position) sensor 42 and control system 30. The positional sensor 42 may be adapted to sense the position of the end-effector 20 being positioned and provide the sensed positional data for the end-effector 20 to the control system 30. Such a positional sensor 42 may be, for example, a globally accurate positional sensor 42 such as laser range finder, computer vision sensors, or another type of positional sensor 42. More generally, sensors used to measure the position may employ light, sound, or other sensing modalities, and use algorithms such as computer vision, interferometry, interval timing, or others, combined with landmarks, fiducials, or other markers naturally present or added in the area around the working volume, to determine the actual position of the end-effector 20. Accordingly, the positional sensor 42 may be in a fixed position (e.g., in the environment in which the positioning system 10 is being operated) and may not be coordinated with any of the positioning systems 16 of the hierarchy or may be coupled to one or more of the positioning systems 16 of the hierarchy or the end-effector 20 itself.

The control system 30 may include a processor or controller coupled through a communication medium (e.g., a communication bus, analog signal lines, etc.) to the positioning systems 16 of the hierarchy 14 and is adapted to control each of the positioning systems 16 of the hierarchy (e.g., to achieve a desired position of the end-effector 20). Specifically, the control system 30 may control the positioning systems 16 of the hierarchy using a control method comprising a coarse control step (coarse step) 32 and a refinement control step (refinement step) 34.

In embodiments the coarse step 32 may be an open-loop control step for moving the end-effector 20 to a position desired (e.g., according to a plan 40 provided to the control system 30) while the refinement step 34 may be a closed-loop control step which applies corrective movement to one or more of the positioning systems 16 of the hierarchy based on the deviation between the actual position sensed by the positional sensor 42 after the coarse step 32, and the position desired (e.g., according to the plan 40).

In particular, according to embodiments, the coarse step 32 operates in an open-loop manner in so far as it moves the end-effector 20 (and all other positioning systems 16 lower in the positioning system hierarchy 14) by instructing the (e.g., actuator of) a positioning system 16 of the hierarchy (e.g., the coarsest positioning system where the positioning hierarchy only has two positioning systems) to achieve a particular setting (e.g., position) based only on a predetermined position (e.g., based on instructions of the plan 40) and not on measurement or feedback of the position of the end-effector 20. Thus, the end-effector 20 (and all lower positioning systems 16 in the hierarchy) may be moved to the desired position (within the margin of error of the (e.g., coarsest) actuated positioning system). It will be noted that while some physical actuators of positioning systems 16 may internally contain closed-loop systems to ensure that they move to a specified setting (e.g., to compensate for mechanical slippage, and actuator tolerances) this is different from evaluating whether or not the end-effector 20 itself has reached the desired position, especially when magnified over large movement distances.

The control system 30 may then perform refinement positioning step 34 in a closed-loop manner such that it moves the end-effector 20 by instructing the (e.g., actuator of) a (e.g., lower) positioning system of the hierarchy (e.g., the finest positioning system where the positioning hierarchy only has two positioning systems) to achieve a desired position based on a determination of the difference between the actual position sensed by the position sensor and the planned position (e.g., predetermined position) of the end-effector 20.

For example, the coarse step 32 and refinement step 34 may employ an inverse kinematic algorithm such that some combination of the coarse positioning step 32 and the refinement positioning step 34 will position the end-effector at the desired position within the resolution of the finest resolution positioning system 16 in the hierarchy of positioning systems 14. Usually this will comprise performing the coarse positioning step 32 using a coarser positioning system of the hierarchy 14 followed by a refinement step 34 using a finer resolution positioning system 16 of the hierarchy 14.

In some instances, however, during the refinement step 34 it may be determined that the finer resolution positioning system is at the extent of its travel or range. In such cases, the coarse step 32 may be repeated using the next higher positioning system 16 in the hierarchy of positioning systems 14, followed by a repetition of the refinement step 34 using the finer resolution positioning system. Thus in some embodiments, as discussed, the resolution of a positioning system 16 (e.g., a finer resolution positioning system) is at least equal to or slightly greater than, the resolution of the next coarsest positioning system in the hierarchy 14.

Accordingly, in embodiments, after a coarse positioning step 32 is performed by the control system 30, the control system 30 can sense (e.g., using the positional sensor 42) if the end-effector 20 is within the resolution of the coarser positioning system 16. If the end-effector 20 is not within the resolution (of the coarser positioning system 16) the control system 30 may perform the coarse step 32 (e.g., again) using the coarser positioning system 16 in the hierarchy, while if the end-effector 20 is within the resolution of the coarser positioning system 16 the control system 30 can invoke the refinement step 34 using a finer positioning system 16. If performing the refinement step 34 moves the end-effector 20 out of the resolution of the finer resolution positioning system 16, the control system 30 may (re)invoke the coarse positioning step 32 using the coarser positioning system 16. This process may be repeated by the control system 30 until the end-effector 20 is at the desired (e.g., predetermined) position (e.g., according to the plan 40) within the resolution of the finest resolution positioning system 16 of the hierarchy of positioning systems 14.

In this manner, the end-effector 20 may be moved to a desired predetermined position (e.g., according to plan 40) within a resolution of the finest resolution positioning system 16 of a positioning hierarchy 14. As discussed, however, the end-effector 20 being moved by the positioning system 10 of embodiments may be an end-effector 20 used in manipulating objects, depositing material, removing material, marking, or other tasks additive manufacturing. Thus, the predetermined desired (as-planned) position of the end-effector 20 may not be ideal or desirable given the real-world dynamic conditions that exist at the time of positioning. These deviations may be caused by deviations of the actual object under construction from the planned object (e.g., according to plan 40), wind, vibration, inconsistent or different material properties, etc., such that the end-effector 20 may not be properly positioned to accomplish it task. For example, the end-effector 20 may be misaligned with respect to an object (or portion of the object) under construction.

To address these deviations between the as-planned position and the actual real-world environment, the positioning system 10 of embodiments may include a domain sensor 44 that senses domain data, where this domain data may be associated with real-world conditions such as the position of the end-effector 20 relative to a real-world entity. This real-world entity may be, for example, an object under construction in a building process. This domain sensor 44 may be the same or similar to the positional sensor 42 (and may, in some embodiments, comprise the same sensor), but is used to measure domain data related to an end-effector's environment, not a position (e.g., of the end-effector 20). Such sensors may include, for example, a force or pressure sensor, a distance sensor such as those employing light or ultrasound, a computer vision sensor, a magnetometer, an echolocation sensor, a capacitance or inductive sensor, or another kind of domain sensor. This domain sensor 44 may be incorporated into the end-effector 20 itself, a positioning system 16 of the hierarchy (e.g., the finest resolution positioning system 16n) or may be a standalone sensor. Accordingly, the domain sensor 44 may be in a fixed position (e.g., in the environment 12 in which the positioning system 10 is being operated) and may not be coordinated with any of the positioning systems 16 of the hierarchy 14; the domain sensor 44 may be coupled to one or more of the positioning systems 16 of the hierarchy 14; or the domain sensor 44 may be incorporated into the end-effector 20 itself.

The relative position of the end-effector 20 (e.g., relative to an real-world entity) as sensed by the domain sensor 44 may thus be provided to the control system 30 which is adapted to include a reactive or adaptive (used interchangeably) step 36 in the control method for controlling a positioning system 16 (e.g., the finest resolution positioning system 16n) of the hierarchy. In one embodiment, this adaptive positioning step 36 may be performed after the coarse step 32 and refinement positioning steps 34 are performed. The adaptive positioning step 36 may run closed-loop such that the control system 30 moves the end-effector 20 by instructing the (e.g., actuator of) a positioning system 16 of the hierarchy (e.g., the finest positioning system 16n) to move (e.g., a certain amount), or achieve a particular or desired position, based on domain data associated with the actual environment 12 in which the end-effector 20 is to be positioned taken by the domain sensor 44, or domain data related to the position, orientation, or shape of objects in the environment 12 with which the end-effector 20 will interact. The adaptive positioning step 36 may employee an adaptive positioning engine 38 using an adaptive positioning function (e.g., an objective function or the like) such that the control system 30 may control the positioning system 16 (e.g., the finest resolution positioning system 16n of the hierarchy 14) to maximize or minimize such an adaptive positioning function based on the domain data sensed by the domain sensor 44 of the positioning system 10.

This adaptive step 36 allows embodiments of the positioning system 10 as disclosed to compensate for differences between the actual environment 12 and plan 40 (e.g., the planned environment). For example, in the case where the end-effector 20 is utilized in additive manufacturing, the adaptive step may be used to compensate for the deviation between an as-built object and an as-planned object. In some applications, such precise compensation may allow an end-effector 20 used in additive manufacturing to grip or otherwise interact with the object of interest or add or remove material seamlessly with that added or removed when in prior positions, as will be discussed in more detail.

Specifically, the end-effector 20 may be an additive builder having an additive head. The additive builder has slats or wall segments that move to form a cavity into which material may be injected or otherwise deposited or delivered. In some embodiments, one or more of those wall segments may incorporate, or be coupled to, a domain sensor 44. This domain sensor 44 may be a force sensor to measure the load, or relative load, on one or more of the wall segments to determine if it is (or is not) positioned over the object (e.g., a wall or the like) being constructed by the additive builder. In that manner, the adaptive step 36 can adjust the position of the end-effector 20 comprising the additive builder or additive head to balance the output from the domain sensors 44 in two or more wall segments of the additive builder to balance out the force on each wall segment of the additive builder to ensure that the additive builder or head is equal, and thus effectively positioned (e.g., centered) over an object being built.

In some embodiments with multiple positioning systems 16 in the hierarchy of positioning systems 14, the coarse step 32, refinement step 34, and adaptive step 36 are first run on the highest (e.g., coarsest) positioning system 16 (e.g., positioning system 16a) in the hierarchy 14, then repeated sequentially on each subsequent finer positioning system 16 in the hierarchy 14. In other embodiments with multiple positioning systems in the hierarchy, some of the coarse, refinement, or adaptive steps 32, 34, 36 may be skipped. For example if the highest (e.g., coarsest) positioning system 16 (e.g., positioning system 16a) does not have the resolution required to meet the precision required by the adaptive step 36, the control system 30 may only execute the coarse and refinement control steps 32, 34 with respect to that positioning system 16.

In a particular embodiment, the hierarchy of positioning systems 14 may comprise three positioning systems 16 whose tradeoff between positional range and positional resolution are chosen to align with the requirements of the three positional control steps (coarse 32, refinement 34 and adaptive 36), whereby the highest (coarsest) positioning system 16 is controlled by the control system 30 to perform the coarse positioning step 32, the middle (finer) positioning system 16 is controlled by the control system 30 to perform the refinement positioning step 34, and the lowest (finest) positioning system 16 is controlled by the control system 30 to perform the adaptive positioning step 36.

As can be seen from the previous discussion, embodiments as disclosed herein may thus provide a positioning system that employs a multi-step control method to utilize a hierarchy of positioning systems including one or more positioning systems to accurately locate an end-effector within a volume in such a way that it precisely balances the as-planned position with adjustments needed to compensate for deviations in the real-world (e.g., as-built, or as-changed) environment.

Accordingly, embodiments of a positioning system may utilize a hierarchy of positioning systems to achieve high precision and accuracy even over very large volumes and allow for compensation for deviations between the actual and assumed environment such as those caused by conditions where wind, vibration, inconsistent material properties, or other effects result in deviations of the real-world environment from the as-planned environment. Embodiments may thus be particularly suited to subtractive manufacturing or construction, additive manufacturing or construction, job sites, factories, automating construction site tasks such as building, marking, cutting, excavating, moving materials or equipment, or for other contexts that require accurate positioning or manipulation of objects.

Figure 2:
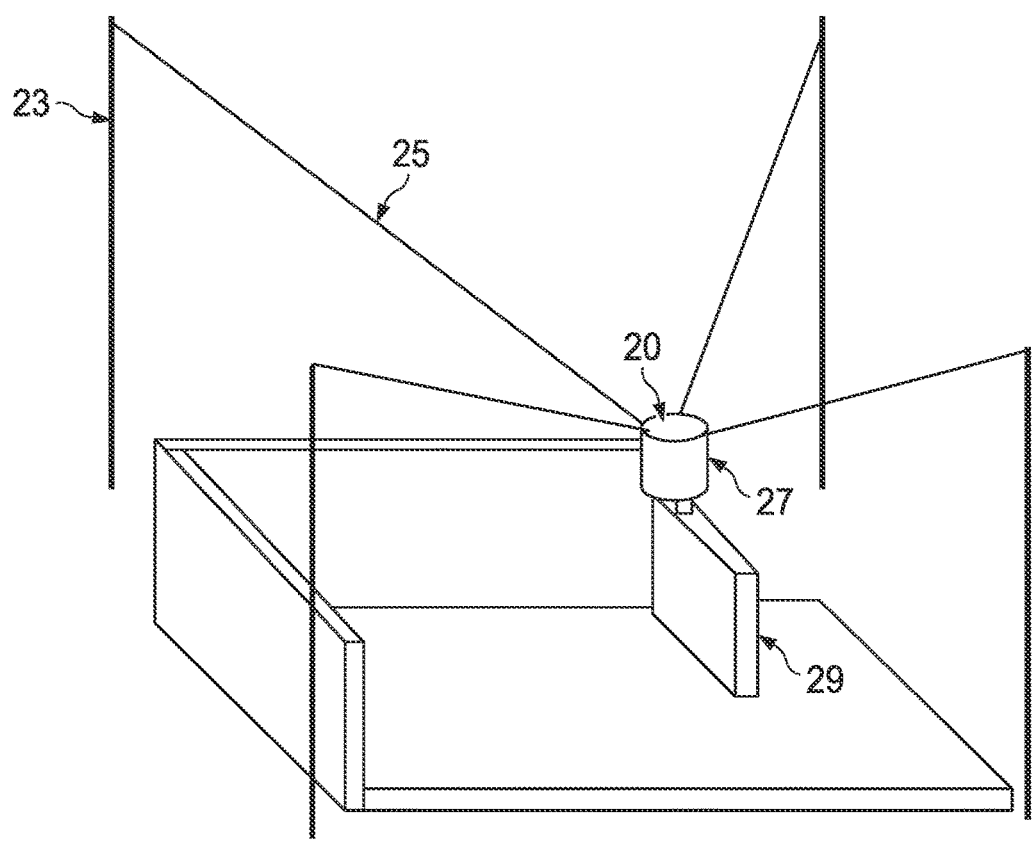
FIG. 2 is a diagrammatic representation of one embodiment of a positioning system being used to construct a wall.

It may now be useful to an understanding of embodiments to discuss particular embodiments of positioning systems and their uses and operation in the context of additive building application. With that in mind, reference is made to FIG. 2, which is a diagrammatic representation of a positioning system being used to construct a wall, where the positioning system is a delta-style positioning system. In this embodiment, the end-effector 20 is positioned by a single positioning system made up of towers 23 and cables 25 in a delta style configuration. This positioning system moves the end-effector and sensor 27 coupled to the end-effector 20 such that the sensor 27 (e.g., a positional and domain sensor, which may be the same sensor) provides positional data on the actual position of the end-effector 20 as well as domain data related to the object being built (in this example, a section of wall 29) to the control system. The control system can then refine the position of the end-effector 20 through a coarse step, refinement step or adaptive step as discussed until the end-effector is positioned as optimally as possible to balance the intended as-planned design with the actual as-built section of wall 29.

Figure 3:
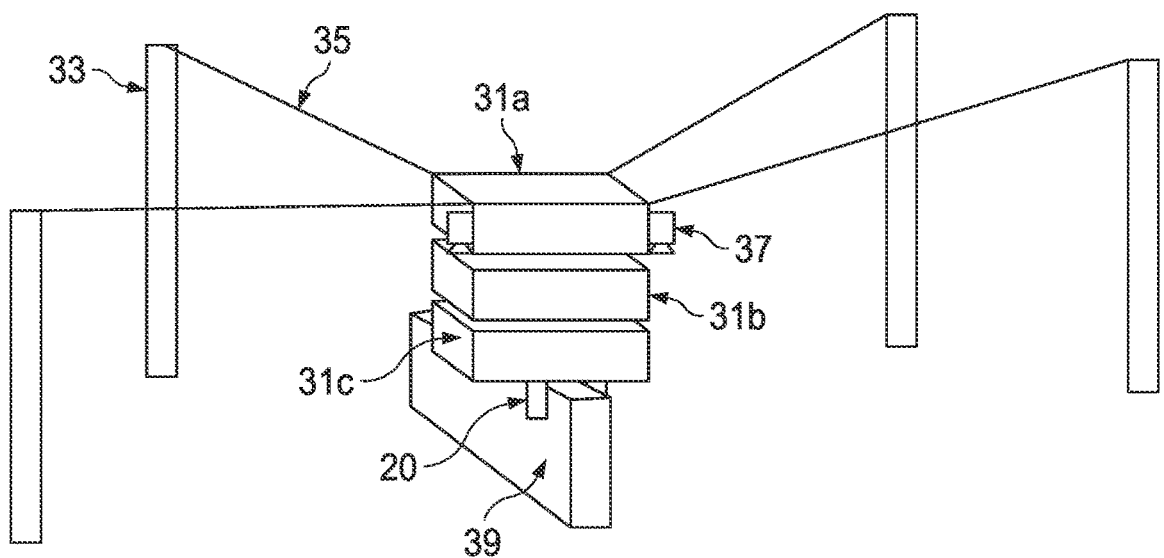
FIG. 3 is a diagrammatic representation of one embodiment of a positioning system used in additive manufacturing comprising a hierarchy of positioning systems including multiple positioning systems where the coarsest system is a cable system.

Moving now to FIG. 3, a diagrammatic representation of an embodiment employing multiple positioning systems in a hierarchy of positioning systems for use in additive manufacturing is depicted. Here, the first positioning system 31a (e.g., the highest or coarsest positioning system in the hierarchy of positioning systems) may be a delta-style positioning system made up of towers 33 and cables 35. The first positioning system 31a is adapted to move second positioning system 31b and third positioning system 31c, along with end-effector 20.

Second positioning system 31b (e.g., a finer positioning system in the hierarchy of positioning systems) may be a Cartesian positioning system (e.g., a gantry system) adapted to move third positioning system 31c along with end-effector 20, while third positioning system 31c (e.g., the finest positioning system in the hierarchy of positioning systems) may be a spring actuated compliance system that is incorporated into, and adapted to move, an end-effector 20 used for additive manufacturing.

In this embodiment the end-effector 20 may be, for example, a form that grips a section of wall 39 under construction. Sensor 37 may include a position sensor, which could be cameras or another type of sensor as discussed, coupled to one of the positioning systems 31a, 31b, 31c (e.g., first positioning system 31a or third positioning system 31c) and utilized to provide data (e.g. positional data) to a control system for use in positioning the positioning systems 31a, 31b and 31c during a refinement step and thereby correct for inaccurate positioning. In this embodiment, an (e.g., environmental) sensor may also include an object sensor embedded in the end-effector 20 (not shown) to provide domain data associated with the actual position of the as-built wall 39 (or a position of end-effector 20 relative to the as-built section of wall 39, to be utilized as domain data for an adaptive step.

Figure 4:
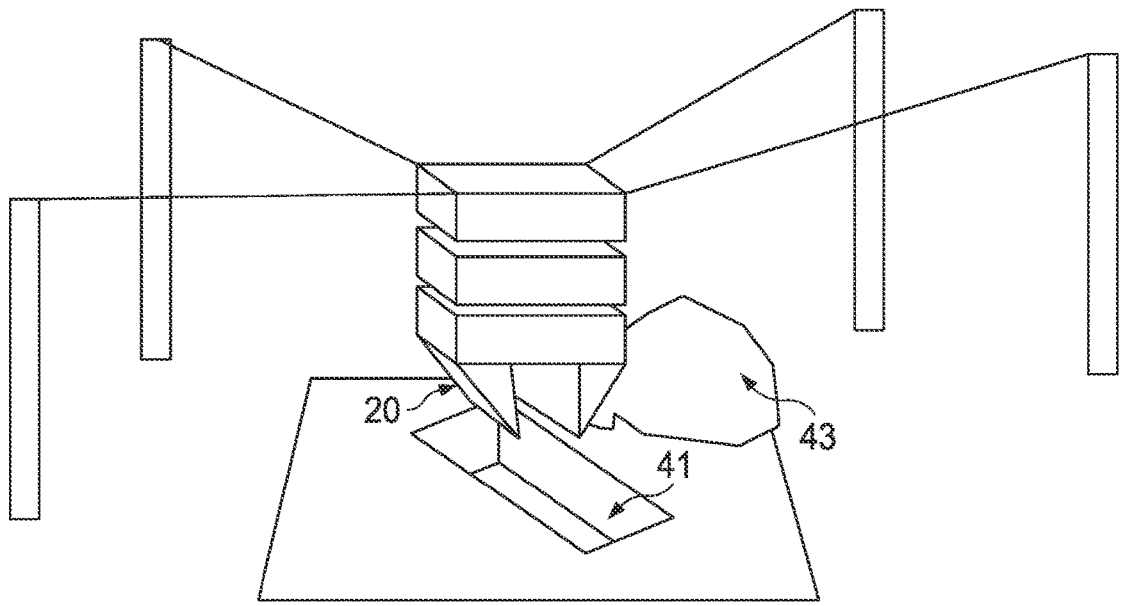
FIG. 4 is a diagrammatic representation of one embodiment of a positioning system using in an excavation application comprising a hierarchy of positioning systems including multiple positioning systems where the coarsest system is a cable system.

FIG. 4 is a diagrammatic representation of an embodiment employing multiple positioning systems in a hierarchy of positioning systems similar to FIG. 3, however in the embodiment depicted in FIG. 4 end-effector 20 may be used for material removal (e.g., such as excavation or the like). For example, end-effector 20 may be a digging implement such as those known in art, for use in the removal of material from a substrate 41. As shown, this removed material 43 may be deposited in an area removed from the area being excavated.

Figure 5:
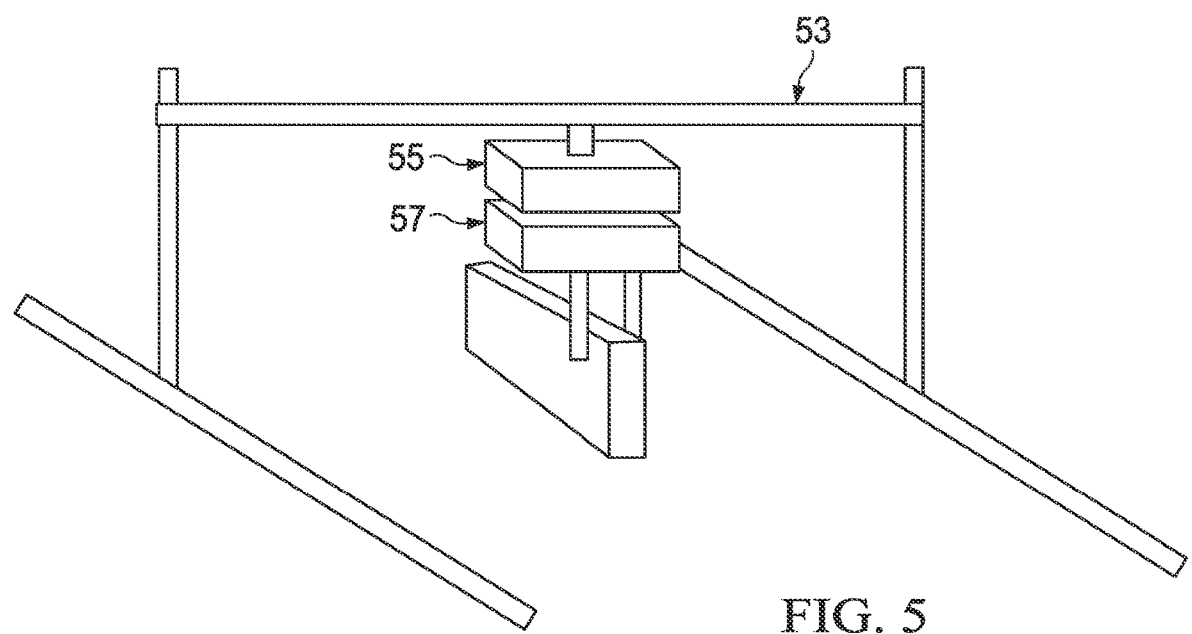
FIG. 5 is a diagrammatic representation of one embodiment of a positioning system used in additive manufacturing comprising a hierarchy of positioning systems including multiple positioning systems where the coarsest system is a gantry.

FIG. 5 is a diagrammatic representation of another embodiment employing multiple positioning systems in a hierarchy of positioning systems for use in additive manufacturing. Here, the first positioning system 53 (e.g., the highest or coarsest positioning system in the hierarchy of positioning systems) may be a Cartesian gantry. Specifically, first positioning system 53 may be a 3-axis X, Y, Z style-gantry adapted to move the positioning systems 55, 57 lower in the hierarchy of positioning systems and end-effector through a volume of interest.

Second positioning system 55 (e.g., a finer positioning system in the hierarchy of positioning systems) may be an X,Y gantry and rotational stage adapted to move third positioning system 57 (along with the end-effector), while third positioning system 57 (e.g., the finest positioning system in the hierarchy of positioning systems) may be a spring actuated compliance system that is incorporated into, and adapted to move, an end-effector used for additive manufacturing.

Thus, has been shown in FIGS. 2-5 embodiments of positioning systems as disclosed herein may be usefully utilized in construction or manufacturing, including with additive or subtractive builders and, in particular, in the positioning of end-effectors utilized in such additive or subtractive building processes.

As will be recalled from the above discussions, when positioning an end-effector, embodiments may employ an adaptive step. This adaptive step allows embodiments of the positioning system as disclosed to compensate for differences between the actual environment and the planned environment. Specifically, in the case where the end-effector is utilized in additive manufacturing the adaptive step may be used to compensate for the deviation between an as-built object and an as-planned object. Thus, in an additive manufacturing context such precise compensation may allow the end-effector to grip or otherwise interact with the object of interest, or add or remove material seamlessly with that added or removed when in prior positions.

It will also be recalled that the adaptive step may utilize domain data from an domain sensor. In certain embodiments, these domain sensors may be incorporated directly into the end-effector itself. To continue with the example of additive manufacturing, in such contexts the end-effector may be an additive builder having an additive head. The additive builder has slats or wall segments that move to form a cavity into which material may be injected or otherwise deposited or delivered. In some embodiments, one or more of those wall segments may incorporate, or be coupled to, an domain sensor for providing such domain data for use in adaptive step.

This domain sensor may be a force sensor to measure the load, or relative load, on one or more of the wall segments to determine if it is (or is not) positioned over the object (e.g., a wall or the like) being constructed by the additive builder. In that manner, the adaptive step can adjust the position of the end-effector comprising the additive builder or additive head to balance the output from the domain sensors in two or more wall segments of the additive builder to balance out the force on each wall segment of the additive builder to ensure that the additive builder or head is equal, and thus effectively positioned (e.g., centered) over an object being built.

Figure 6:
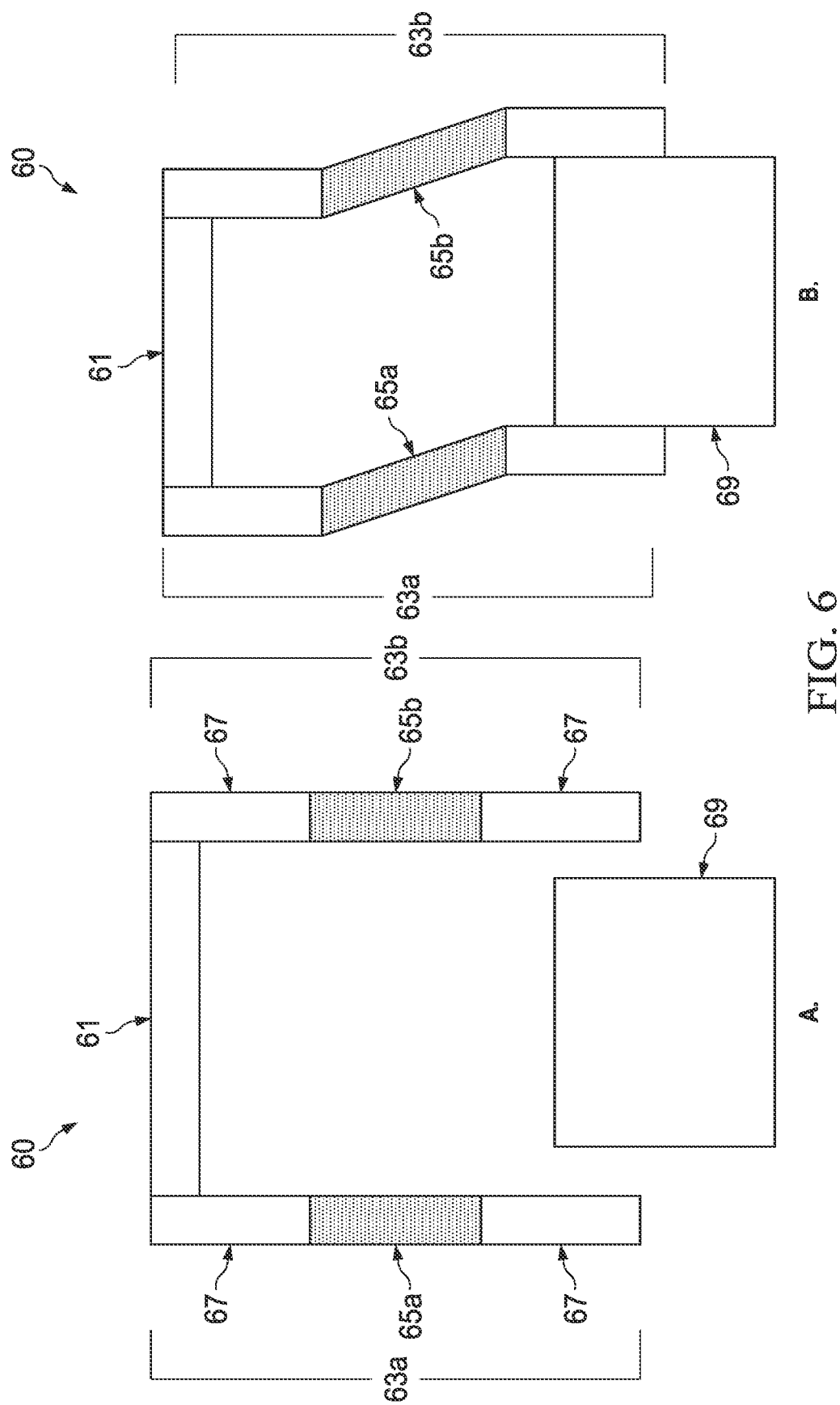
FIG. 6 is a diagrammatic representation of one embodiment of an end-effector with integrated compliant pressure-sensors used as domain sensors.

Referring then to FIG. 6, a diagrammatic representation of one embodiment of an end-effector for use in additive building, and including an integrated domain sensor, is depicted. For example, the end-effector may be an additive builder, or additive head of an additive builder. Here, the domain sensor may be one or more compliant pressure-sensors integrated into the end-effector and used to sense domain data comprising force or pressure on at least a portion of the end-effector to provide that domain data to a control system for use in an adaptive step.

Specifically, embodiments of a control system of a positioning system may utilize domain data from the domain sensor integrated into the end-effector 60 to utilize compliance to actuate or otherwise move a positioning system (e.g., the finest positioning system) of a hierarchy of positioning systems during an adaptive step. In this embodiment, the end-effector 60 includes two symmetric arms or wall-segments 63a, 63b coupled to an actuator 61. Each arm 63a, 63b is comprised of rigid links 67 connected by a flexible link 65 and adapted to be placed on different sides or faces of object 69 when being used in building object 69. Domain sensors may be embedded in the end-effector 60 (e.g., in one more of actuator 61, a rigid link 67 or a flexible link 65) and may measure the amount of force applied to flexible links 65a, 65b. This domain data (e.g., the force being applied to flexible link 65a or flexible link 65b) can be provided to a control system for use in adaptive step to control the position of end-effector 60.

As can be seen, in state A, the end-effector 60 is larger than the section of the object 69 being built. As shown in state B when an adaptive step is performed or the end-effector 60 is moved, the length of actuator 61 is reduced. In response, flexible links 65 may flex to accommodate the reduced length of the actuator 61. The embedded domain sensor (e.g., in one more of actuator 61, a rigid link 67 or a flexible link 65) may measure the force being applied to the one or more of flexible links 65a and 65b. This domain data (e.g., the force being applied to one or more of the flexible links 65a and 65b sensed by the embedded domain sensor) may be provided to a control system for use in an adaptive step to move the end-effector 60 such that the force being applied to flexible links 65a and 65b is balanced between the two flexible links 65. If the position of the object 69 is exactly where it was planned to be (if the as-built object 69 exactly matches the plan for the object 69), the adaptive step will move the end-effector 60 to exactly balance the force applied to the flexible links 65a and 65b. If alternatively, the as-built object 69 deviates from the plan for the object 69, a control system executing the adaptive step may move the end-effector 60 to apply more force to either flexible link 65a or flexible link 65b, and correspondingly less force to the other flexible link 65a or flexible link 65b, such that there is a desired correction for the deviation between the as-built object 69 and as-planned object 69, and ensuring the smooth continuity of the object 69 being built.

It will be realized that not only may an end-effector be positioned in an adaptive step to correct for deviation between an as-built object and an as-planned object but, if desired, may also be positioned to correct for this deviation such that the object under construction may be brought into (or closer to) compliance with the plan for the object. Accordingly, for purposes of illustration, state B of FIG. 6 depicts the situation in which the as-built object 69 is slightly to the right of where it should be per the as-planned design, and the end-effector 60 has been positioned such that the forces on flexible links 65 (e.g., gradually) correct the position of the subsequent layer of the object being built in the direction of the as-planned position. And, in this manner, the fixed links 65, 67 may apply pressure to the object 69 being built, ensuring seamless continuity between the prior built section of object 69 with new material that will be added into the cavity between the two arms of end-effector 60. Embodiments will be better understood with reference to embodiments of additive manufacturing processes and additive builders as described herein with which embodiments of pointing systems may be utilized.

Specifically, embodiments described herein may be utilized with systems and methods for manufacturing of objects by molding or casting of materials using an adjustable form having a cavity shape that can be dynamically changed for various locations at which material is to be cast. For example, such a device can be controlled per a 3D design defined within a computer program.

According to one embodiment, the adjustable form is moved to a position corresponding to a dispense location at which material is to be cast. Before, after or during movement to the position, the adjustable form is configured so that the forming chamber has a shape suitable for the dispense location. The material is cast at the location using the form. More particularly, the material is dispensed (e.g., poured, injected using applied force or pressure, or otherwise dispensed) into the forming chamber and consolidated as needed. As will be appreciated, consolidating a material reduces the internal friction in the material, allowing the material to flow. For example, a cementitious material can be consolidated to reduce the internal friction of the material and liquefy the material so that it flows and settles under the force of gravity, which may be aided by other forces in some embodiments. According to one embodiment, the material is consolidated so that it takes on a shape that is at least partially defined by the adjustable form or previously dispensed material and is void free. For example, the material can be consolidated so that it takes on a shape that has at least one finished surface as defined by the adjustable form. In some embodiments, the material is consolidated so that it will fill a central void created by all surrounding deposited materials of a structure and ultimately have a finished surface on all sides. Further, the material may be consolidated so that it mechanically intermixes with horizontally or vertically adjacent previously cast sections. The form can be removed once the material has stiffened to a shape-holding state. This may occur, for example, after consolidation is complete. For purposes of this application, a "shape-holding state" is a state in which the material is sufficiently stable to maintain its shape without a form. In a particular embodiment, the shape-holding state is a zero-slump state.

Additional material can then be cast at a new location to additively build on to the structure being created. As such, the adjustable form can be moved to a new position to create an additional portion of the structure being created. The adjustable form is potentially reconfigured to change the shape of the forming chamber for the new location. In various embodiments, the reconfiguration of the adjustable form is performed before, after, or during movement to the new location. In some cases, the adjustable form is reconfigured into a movement configuration suitable for moving to the new location and then reconfigured into a casting configuration suitable for casting the material at the new location. The additional material is dispensed at the new location and consolidated so as to create a structure, which may be a portion of the overall structure being built, with the previously cast material. The process may be repeated until the desired shape or structure is obtained. Embodiments described herein can be utilized to create a contiguous and seamless structure.

To this end, the system for additive manufacturing comprises an adjustable form that defines a forming chamber into which material is dispensed. The shape of the forming chamber is adjusted so as to create a volume that defines a small portion of a structure. The adjustable form is moved to a position at which that portion of the structure is desired (before, after, or during reconfiguring the adjustable form for that position). Material is automatically dispensed into the adjustable form and consolidated as needed. By this process, a portion of the structure can be cast. Once the material is sufficiently stable to maintain a shape without support of the form, if necessary, the adjustable form is first reconfigured to allow it to be moved or removed without colliding with the cast material; then the adjustable form is moved or removed. The cavity shape is reconfigured if necessary for the next portion of the structure, the adjustable form moved to the next position (before, after, or during reconfiguring the adjustable form for that position), and material dispensed and consolidated as needed at the new location. By repeating this process of continually adjusting the forming chamber, moving the adjustable form, dispensing and consolidating additional material, an entire object can be made. In some embodiments, the object may be a building structure or other architectural structure created at a building or construction site. In other embodiments the object may be a precast component created off-site that is later transported to and assembled or placed on site after curing.

One example application is the construction of structures made from concrete or other cementitious materials using a casting form having an adjustable shape and position. A system automatically and continually dispenses cementitious material into the adjustable casting form and consolidates the material in the form. More particularly, the system continually dispenses and consolidates material in a dynamically formed and positioned forming chamber to extend previously created portions of a structure until the entire structure is formed. According to one embodiment, the shape and position of the casting form are adjusted per instructions defined by a program run on a controlling computer.

While embodiments described herein are discussed primarily in the context of casting cementitious materials, it will be appreciated that other embodiments may be adapted for other castable materials, such as, but not limited to, plastics, metals, plasters, or mortars.

Figure 7:
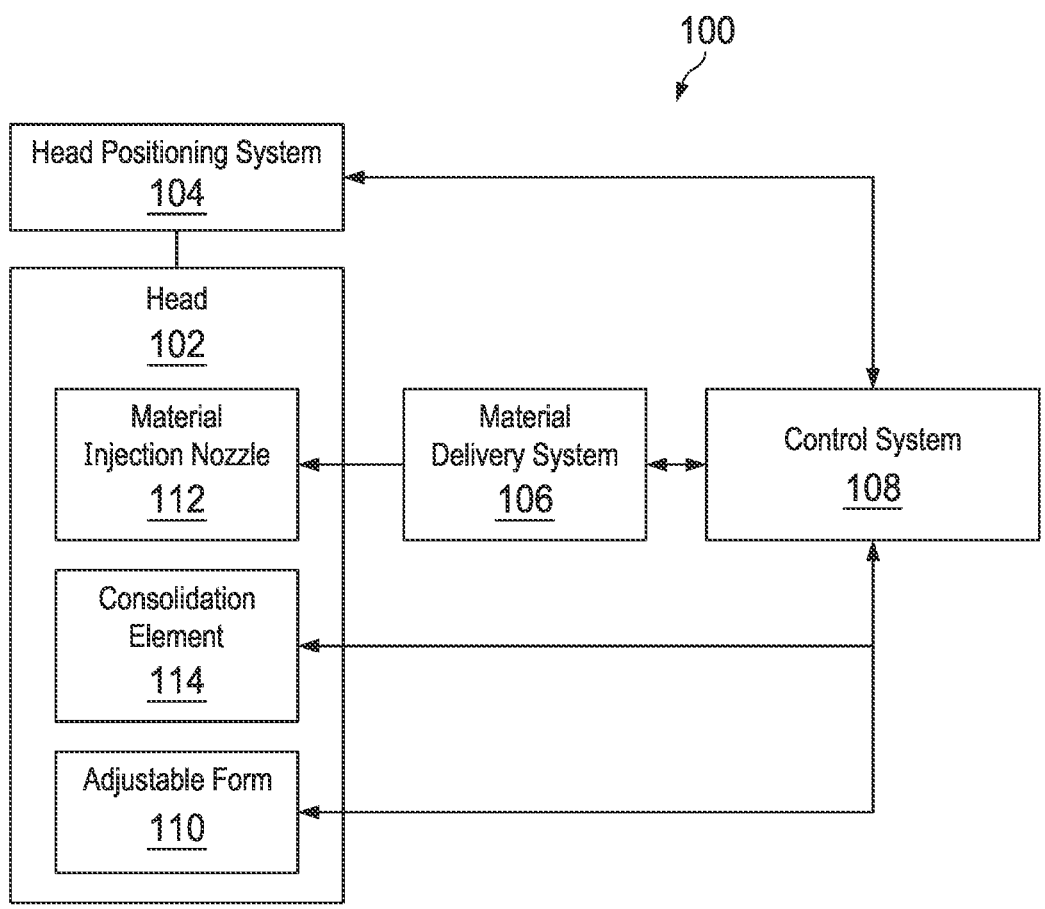
FIG. 7 is a diagrammatic representation of one embodiment of an additive manufacturing system.

FIG. 7 is a diagrammatic representation of one embodiment of an additive manufacturing system 100 for casting a material, such as a paste or other semi-liquid material, that sets after being dispensed at a location. The material used may comprise a matrix of material components. In some embodiments, the additive manufacturing system 100 is adapted to dispense cementitious materials. More particularly, in accordance with some embodiments, the additive manufacturing system 100 is a 3D concrete casting system.

The additive manufacturing system 100 includes a head 102 to dispense material to a work area, a head positioning system 104 to position the head 102. The head 102 can be fluidly connected to a material source, such as a material delivery system 106 that provides material to the head 102. A control system 108 controls the head 102, the head positioning system 104, and the material delivery system 106.

The head 102 comprises an adjustable form 110 that is configurable to define a forming chamber having various shapes. Material is dispensed into the forming chamber via a material delivery path 112, which can comprise any suitable flow path through which material can be directed to the forming chamber. Material delivery path 112 may be defined, for example, by a hose, pipe, machined flow path or other components or combinations thereof. In some embodiments, the material delivery path 112 may include a nozzle through which the material to be dispensed flows. In some embodiments, separate constituent ingredients of the material may be transported separately or in subsets along delivery path 112, and then combined prior to being dispensed. In some embodiments, the head 102 further includes a consolidation element 114.

The head 102 is movable in a 3D build volume by the head positioning system 104 so that material can be dispensed at desired locations. The adjustable form 110 comprises a plurality of form sections (also referred to as wall segments) that define the inner surfaces of the forming chamber. The form sections can be raised and lowered to change the shape of the adjustable form, and more particularly, to change the shape of the forming chamber. The form sections may have a variety of shapes, sizes, and reconfiguration mechanics Examples of form sections include, but are not limited to, blades, slats, blocks, or other components that can be used to define a forming chamber.

The shape of the forming chamber can be configurable to match the portion of the structure that is desired at a particular location by selectively moving the form sections up or down. Thus, when material is dispensed at a dispense location, it is dispensed into a cavity created by the current configuration of the adjustable form 110. The shape of the forming chamber can be dynamically changed for different dispense locations.

In one embodiment, the form sections are of sufficient length that the finished structure is cast without adjusting the height of the head 102. In another embodiment, the form sections allow for a first layer of material, such as concrete, to be cast in place, followed by subsequent layers where the head is positioned above the preceding layer, and additional material is cast to form the current layer and consolidated together with the preceding layer to form a seamless, joint free, and mechanically interlocked substructure. The process is repeated until the final height of the structure is achieved.

As discussed, some embodiments include consolidating the material dispensed into the forming chamber. Various methods of consolidation known or developed in the art may be used, including, but not limited to, vibration-based consolidation, consolidation using electromagnetic radiation, consolidation using magnetic fields, chemical consolidation, or other types of consolidation or combinations thereof.

Consolidation allows the material to settle under the action of the stimulating energy and gravity into a shape at least partially defined by the adjustable mold or previously dispensed material. In addition, or in the alternative, to allowing settlement under gravity, other forces may be applied to aid settlement. Consolidation can also be used to join newly dispensed material with previously dispensed material. In one embodiment, consolidation is performed across newly dispensed material and previously dispensed material so that, for example, the matrix of material components is evenly mixed and void-free within and across the newly dispensed material and the previously dispensed material. More particularly, in some embodiments, consolidation is applied to consolidate newly dispensed material and previously dispensed material together into a monolithic, contiguous, and joint free composition of material.

In the illustrated embodiment, the head 102 includes a consolidation element 114. The consolidation element may include, for example, an internal vibrator (such as one or more rod vibrators), a form vibrator, an electromagnetic radiation generator, a magnetic field generator, or other component usable to consolidate the dispensed material. In some embodiments, the consolidation element 114 comprises an internal vibrator that can be positioned in the forming chamber, a form vibrator that vibrates adjustable form 110, or another type of consolidation element, or combinations thereof. In one embodiment, consolidation element 114 comprises a plurality of vibrators that can be lowered into the material in the forming chamber and vibrated to consolidate the material. When consolidation is complete, the vibrators are retracted. In some embodiments, the consolidation element 114 is adapted to consolidate both the newly dispensed material as well as material adjacent to the newly dispensed material. In addition, or in the alternative, to using a consolidation element 114 incorporated in the head 102, consolidation may be performed by human laborers or additional automated equipment.

The head positioning system 104 is adapted to position the head 102 in a three-dimensional build volume. The head positioning system 104 may have a variety of forms. In one embodiment, the head positioning system comprises an overhead gantry having X, Y and Z stages. In another embodiment, the head may be positioned by a series of cables attached to controllable spools. As the cables wind around the spool the head moves in position. Simultaneously adjusting one or more spools translates the head in X, Y, Z space. Other examples of head positioning systems include, but are not limited to, a robotic arm, an overhead crane, a boom truck, a SCARA arm, a Delta robot, or a ground-based robot. The head positioning system 104 may comprise multiple positioning systems. In one embodiment, the head 102 may be coarsely positioned by one system and finely positioned by a different position.

The material delivery system 106 is connected to the material delivery path 112 and may comprise a bulk material hopper or other material storage unit and pumps or other devices to deliver material to the adjustable form via the material delivery path 112. The material delivery system 106 may include mixers or other components to add admixtures. In some embodiments, the material delivery system 106 is an injection system that injects material using applied force or pressure. The material delivery system 106 may be located on or inside of the head 102 or at another location and is fluidly connected to the forming chamber of the adjustable form 110 by the material delivery path 112. In other embodiments, the material is manually poured into the adjustable form 110.

The control system 108, according to one embodiment, comprises a computer system running software to control the head 102, the head positioning system 104, and material delivery system 106. In particular, the control system 108 controls the head positioning system 104 to position the head 102 desired positions, the head 102 so that adjustable form 110 has desired configurations, and material delivery system 106 to provide material, which is dispensed through head 102. Further, the control system 108 controls the consolidation element 114.

In one embodiment of operation, the control system 108 controls the head positioning system 104 to position the head 102 at a desired position in a build volume based on a design of a resulting structure. Before, during or after moving the head 102 to the desired position, the control system 108 controls the head 102 to adjust the adjustable form 110 so that the forming chamber into which material is to be dispensed has a configuration for casting the material at that dispense location. According to one embodiment, the cavity shape of the forming chamber is adjusted so as to create a volume that defines a portion of the structure being formed. With the head 102 at the desired position and the adjustable form 110 in the desired configuration, the control system 108 controls the material delivery system 106 to provide material to head 102. The material is delivered to the forming chamber via the material delivery path 112. In some embodiments, the control system 108 dynamically adjusts the mixture of cementitious material components, fiber reinforcement, or the rate of admixtures at the time of casting.

The consolidation element 114 is then activated to consolidate the material that was dispensed. The consolidation element 114 imparts energy to the material for the purpose of consolidating the material. The material can be consolidated so that it takes on a shape that is at least partially defined by the adjustable form or previously dispensed material, is void free, and has mechanically intermixed with horizontally or vertically adjacent previously cast sections. The consolidation element is removed and, according to one embodiment, the material is retained in the form until it reaches a shape-holding state, which may occur almost immediately when then the application of consolidation energy ceases in some embodiments.

The adjustable form 110 is removed once the material is sufficiently stable to maintain a shape without support of the form. The cavity shape of the forming chamber is reconfigured if necessary for a next portion of the structure, the head 102 moved to the next position (before, after, or during reconfiguring the adjustable form 110 for that position), and material dispensed at the new dispense location. By repeating this process of continually adjusting the forming chamber, moving the head 102, and dispensing additional material, and consolidating the material as needed, an entire object, such as a precast object, is made.

In some embodiments, the object is formed by building the object layer-by-layer. For example, after completing a layer of the object, the additive manufacturing system 100 may form a subsequent layer on top of the preceding layer, adding subsequent layers until the object has reached the required height. At the time that the last layer is being formed the additive manufacturing system 100 may use elements of the adjustable form to scrape the top surface of the structure thus leveling or screeding the surface.

The additive manufacturing system 100 can pause the forming process so that a human or another machine may interact with the structure being formed. The interaction may be for the purpose of testing or inspecting the structure, correction of errors, or performing additional work, such as placing rebar, lintels, conduit, penetration sleeves, lifting embeds, or adding other components; or making modifications that cannot be created via the 3D casting system, such as adding date stamps or decorative features.

As mentioned, the positions of the head 102, the configuration of the adjustable form 110, the activation of consolidation element 114, and the dispensing of material are controlled by a program running on the control system 108 in some embodiments. In other embodiments, one or more of the positions of the head 102, the configuration of the adjustable form 110, the activation of consolidation element 114 or the dispensing of material may be controlled by manual controls. Further, in some embodiments, consolidation may be performed by human laborers or additional automated equipment in addition to or as alternative to using a consolidation element 114.

In one embodiment, human laborers, or additional automated equipment position steel reinforcement bar (rebar) interleaved and in coordination with the automatic steps taken by the additive manufacturing system 100. In addition, or in the alternative, the head 102 is augmented with a mechanism to insert rebar or other reinforcing material automatically. In one embodiment, an appropriate dosage of steel fibers can be used to provide tensile strength in lieu of steel reinforcing bar (rebar).

Manufacturing system 100 is adapted to dispense concrete or other cementitious materials in some embodiments. As will be appreciated, concrete generally comprises a mixture of cement, aggregates, and water. Concrete may also include additional materials or admixtures. The concrete is selected to have desirable working properties, which can be controlled using, for example, admixtures so that the concrete exhibits desired stiffness (ability of the concrete to hold its own shape) and strength (ability to hold its shape when external force is applied, such as by stacking additional concrete on top of it), while retaining the capability to be consolidated to allow the concrete to mechanically intermix with adjacent concrete.

The working properties of concrete can be controlled using, for example, various admixtures, such as water reducing (superplasticizers) admixtures, set-retarders, accelerators, air entraining agents or other admixtures. The present method can work with a wide variety of concretes and other castable materials. According to one embodiment, admixtures can be added just before the concrete is dispensed. "Part 645 Construction Inspection National Engineering Handbook," United States Department of Agriculture, 210-VI-NEH, Amend. 81, April 2017, which is fully incorporated by reference herein describes, for example, that admixtures can be delivered by a separate hose and added to the concrete at a nozzle. Furthermore, "Volume II: Investigation On Thixotropy Of Vibration-Free Concrete Mixtures Intended For Rapid Pavement Construction, by Dimitri Feys and Piyush Rajendra Lunkad, published by Research on Concrete Applications for Sustainable Transportation (RE-CAST), Publication No. RECAST UTC #00055304, is incorporated by reference herein in its entirety. The publication describes that admixtures can be added just before the material passes through a nozzle. In some embodiments, a high- or medium-slump concrete is used and then admixtures are introduced just before the concrete is dispensed to adjust the working properties of the concrete.

In preferred embodiments, the material used has a rheology such that it liquefies essentially immediately or otherwise quickly when consolidation energy is applied and stiffens essentially immediately or otherwise quickly upon the cessation of the application of the consolidation energy. Further, the material has a curing profile so that it begins to set immediately or almost immediately upon being dispensed. More particularly, in some embodiments, the material has a rheology so that it becomes stiff and non-deforming enough to hold its shape upon being dispensed into the forming chamber but has sufficient shear thinning properties such that it liquefies as soon as consolidation energy is applied, and returns to a shape-holding state upon the cessation of the application of consolidation energy. In one embodiment, the material exhibits properties of a zero-slump or no-slump state upon being dispensed and returns to that state upon cessation of the application of consolidation energy.

As discussed, the working properties of concrete can be controlled using admixtures. In one embodiment, a viscosity modifying admixture is used, and more particularly, an admixture that promotes shear thinning. In the absence of consolidation energy, the admixture-modified concrete forms a paste or gel-like substance. However, when consolidation energy is applied, such as through vibration or other forms of consolidation, the concrete liquefies quickly—for example, almost instantaneously—through the phenomena known as shear thinning. Furthermore, a second admixture can be used so that the concrete begins to set quickly so that it rapidly gains an at rest shear strength to support the weight from subsequent layers stacked atop it, while remaining workable—in particular, retaining the capability to be liquefied and mechanically intermixed with the subsequent layer—when the immediately subsequent layer is formed atop it.

Figure 8:
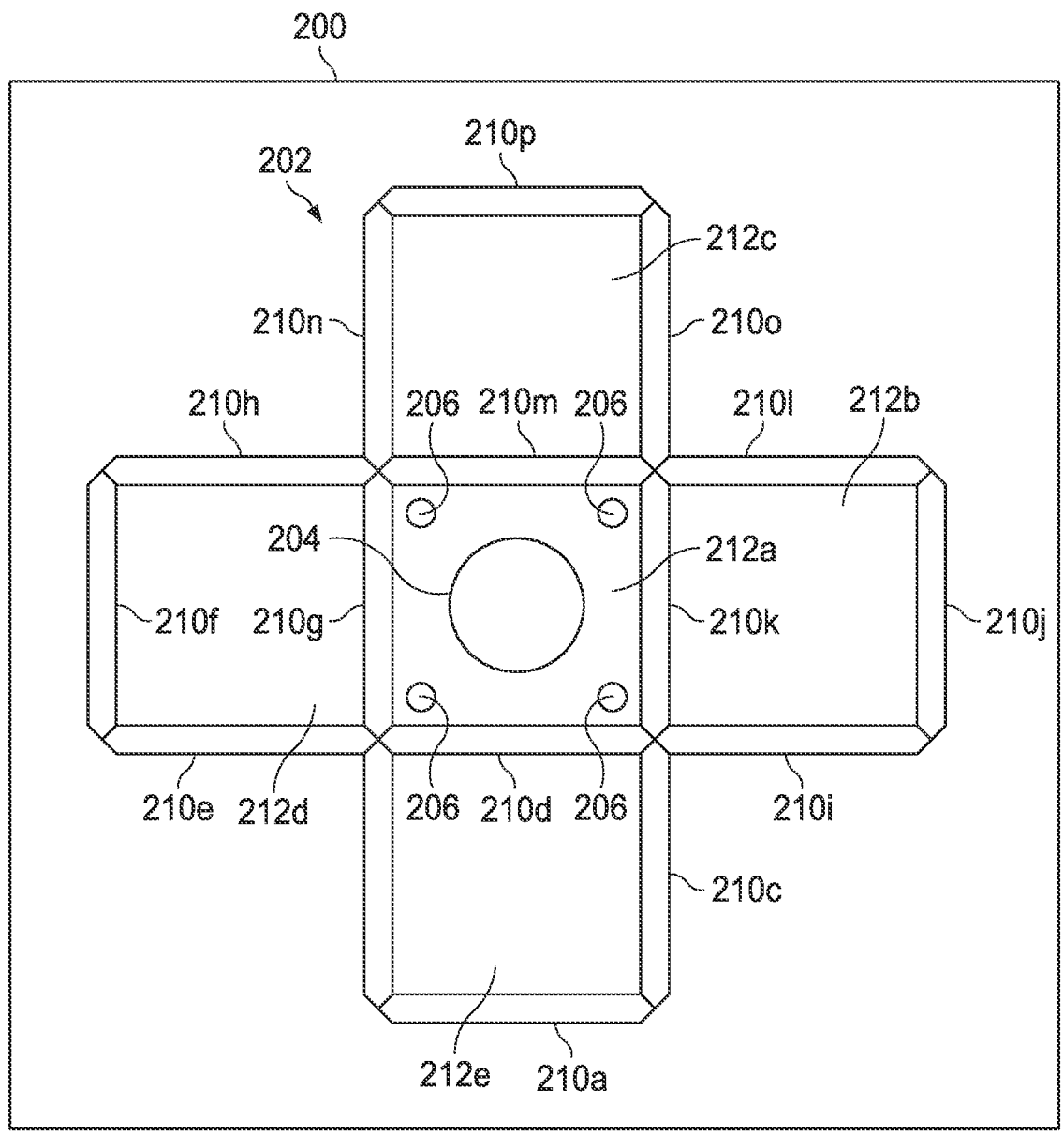
FIG. 8 is a diagrammatic representation of a top view of one embodiment of a head.
Figure 9:
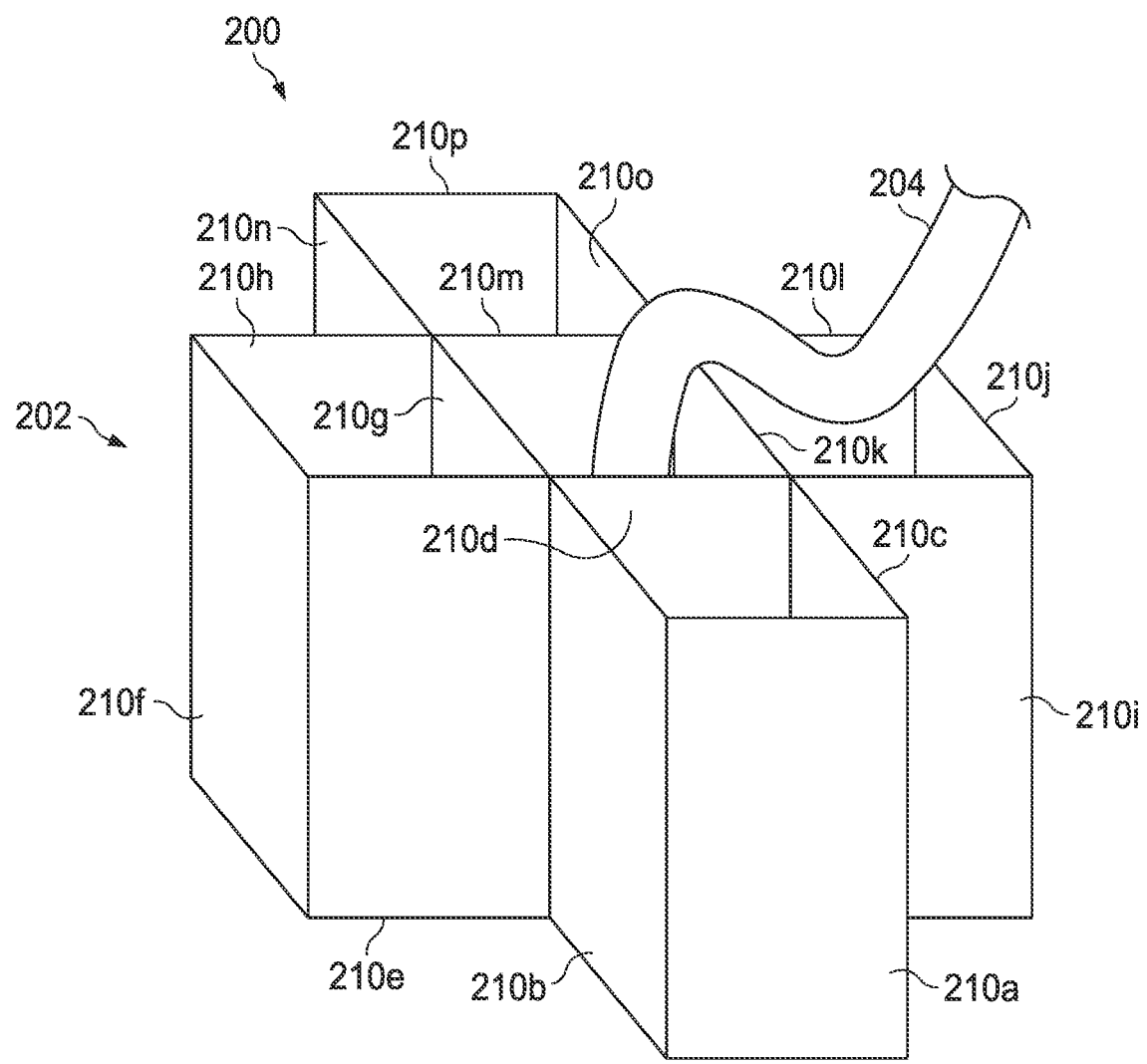
FIG. 9 is a diagrammatic representation of an orthographic three-dimensional view of one embodiment of the head of FIG. 8.

FIG. 8 is a diagrammatic representation of a top view of one embodiment of a head 200, which is one embodiment of head 102. FIG. 9 is a diagrammatic representation of an orthographic three-dimensional view of one embodiment of head 200. In the embodiment of FIG. 8, the head 200 comprises an adjustable form 202, a material delivery hose 204 to deliver material from a source (e.g., material delivery system 106 of FIG. 7) to adjustable form 202, and a consolidation element 206. In this embodiment, the material delivery hose 204 is placed at the center of the adjustable form 202. The consolidation element 206 comprises a set of vibrators disposed about the material delivery hose 204. The vibrators can be raised, lowered, and activated as needed. In addition, or in the alternative, head 200 may include a form vibrator to vibrate the adjustable form 202. In some embodiments, the form vibrator comprises a plurality of discrete form vibrators to vibrate any combination of the form sections.

The adjustable form 202 comprises a plurality of form sections including form section 210a, form section 210b, form section 210c, form section 210d, form section 210e, form section 210f, form section 210g, form section 210h, form section 210i, form section 210j, form section 210k, form section 210l, form section 210m, form section 210n, form section 210o, and form section 210p. While illustrated as relatively thin wall segments, the form sections may have a variety of shapes, sizes and mechanisms of movement. Examples include, but are not limited to, blades, slats, blocks, or other components that can be used to define a forming chamber.

The form sections may be selectively actuated to form a forming chamber having a desired shape as defined by the lowered form sections. In the illustrated embodiments, the forming chamber comprises a central chamber portion 212a, which can be fluidly connected to zero or more additional chamber portions (e.g., chamber portion 212b, chamber portion 212c, chamber portion 212d, chamber portion 212e). zero or more of chamber portion 212b, chamber portion 212c, chamber portion 212d, or chamber portion 212e. Material is dispensed via material delivery hose 204 into chamber portion 212a and may flow to other sections of the forming chamber. In some embodiments, the material delivery hose 204 does not protrude into the forming chamber. In other embodiments, the material delivery hose 204 partially protrudes into the forming chamber. According to one embodiment, the vibrators of the consolidation element 114 are positioned and controlled so the vibration influences the material dispensed in chamber portion 212a. The vibrations may also extend at least partially into adjoining chamber portions.

According to one embodiment, the form sections are configured to create a forming chamber for a first location. The head 200 is positioned at a position corresponding to the first location and material is dispensed and consolidated at the first location. If the next dispense location requires a different configuration of the adjustable form, any form sections that are lowered in the current configuration but raised in the next configuration are raised prior to moving head 200 to the next position. In other embodiments, all the form sections are raised. The head 200 then moves to position the adjustable form for the next dispense location. Any raised form sections that need to be lowered for the new location are lowered to create the forming chamber for that location. Additional material is dispensed and consolidated at that location. This process can be repeated to build an object.

FIG. 10A through FIG. 20 illustrate an example of an additive process using the adjustable form 202 to form a portion 232 of an object being created. In the example of FIG. 10A through FIG. 19B, the head is positioned at various locations (a first location, a second location, etc.) so that material can be dispensed at those locations. The first location, second location, etc. are provided by way of explanation. As will be appreciated, the locations at which material is dispensed and the order in which material is dispensed will vary depending on the object being built and the build order used.

Figure 10A:
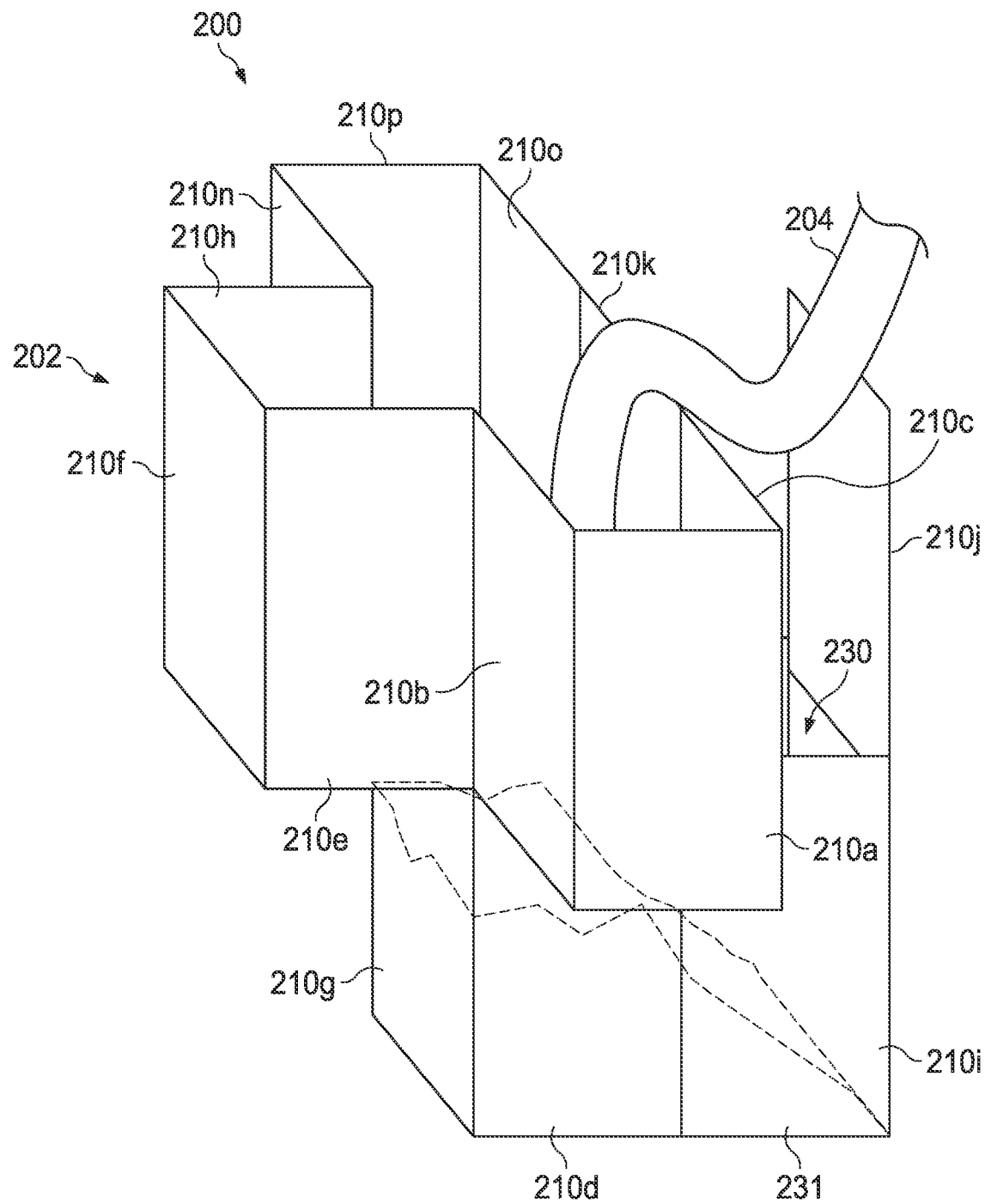
FIG. 10A is a diagrammatic representation of one embodiment of a head in a first configuration for an example first location.
Figure 10B:
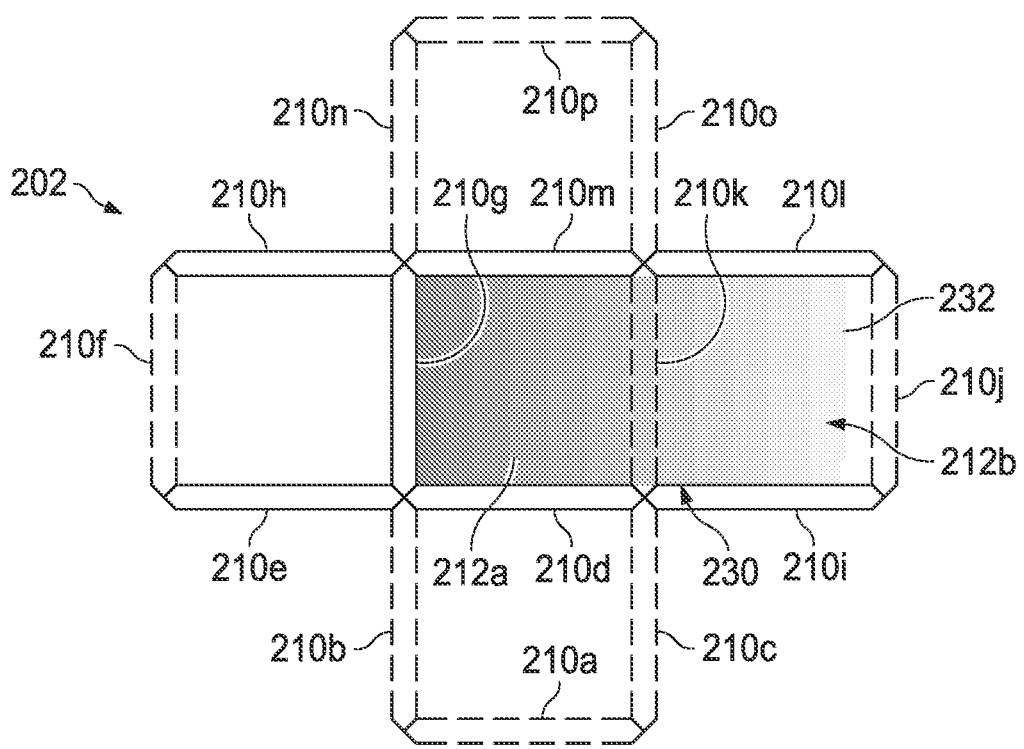
FIG. 10B is a diagrammatic representation of a top view of one embodiment of the adjustable form at the example first location.
Figure 10C:
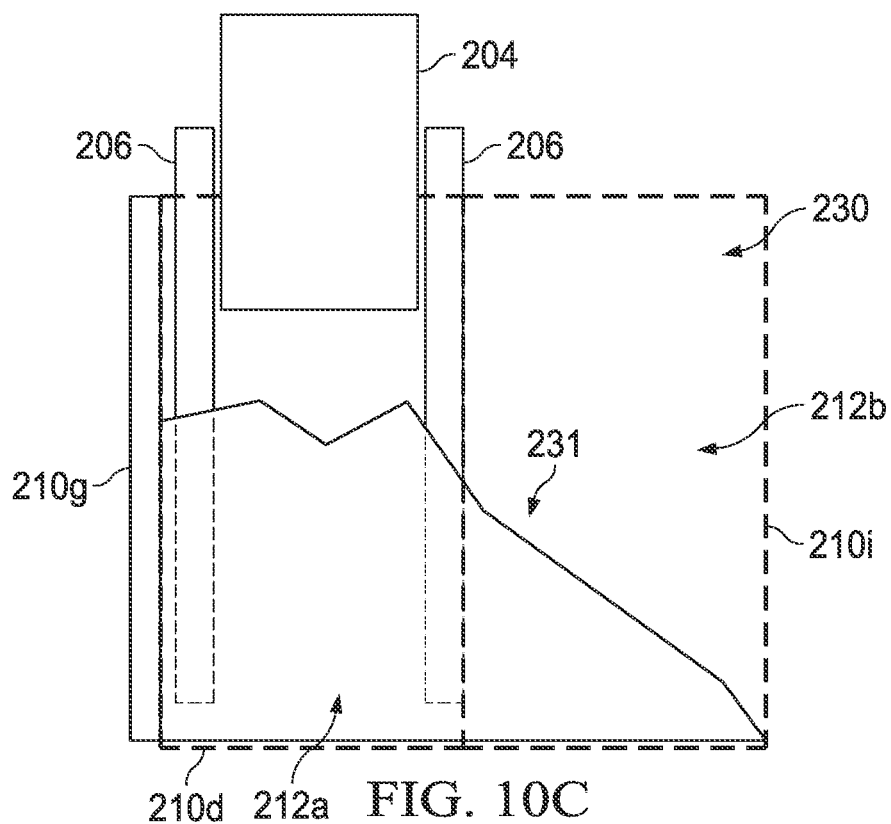
FIG. 10C is a diagrammatic representation of one embodiment of consolidating dispensed material.
Figure 10D:
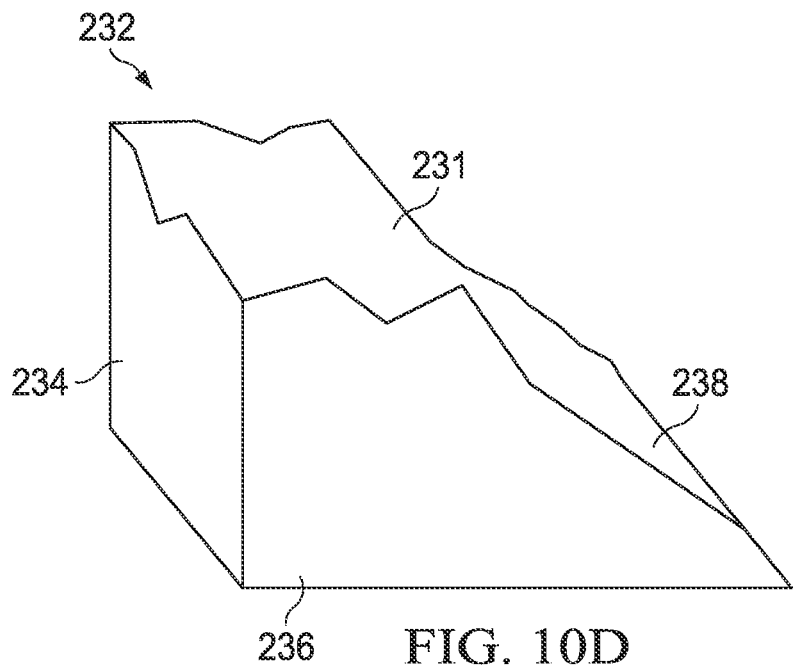
FIG. 10D is a diagrammatic representation of one embodiment of the portion of the object formed by depositing material at the first location.
Figure 10E:
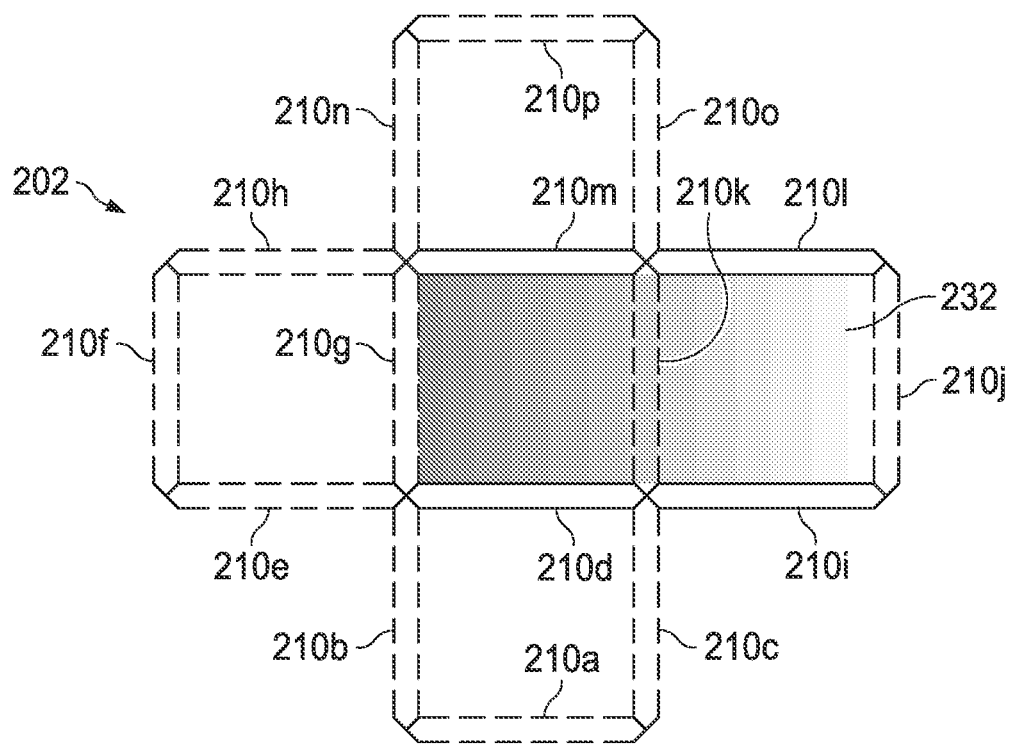
FIG. 10E is a diagrammatic representation of one embodiment of the adjustable form configured for movement to an example second location.

FIG. 10A is a diagrammatic representation of one embodiment of the head 200 with the adjustable form 202 in a first configuration for a first example location, FIG. 10B is a diagrammatic representation of a top view of one embodiment of the adjustable form 202 at the first location, FIG. 10C is a diagrammatic representation of one embodiment of consolidating the dispensed material, FIG. 10D is a diagrammatic representation of one embodiment of the portion of the object formed by dispensing material at the first location, and FIG. 10E is a diagrammatic representation of one embodiment of the adjustable form configured for movement to an example second location.

Figure 11A:
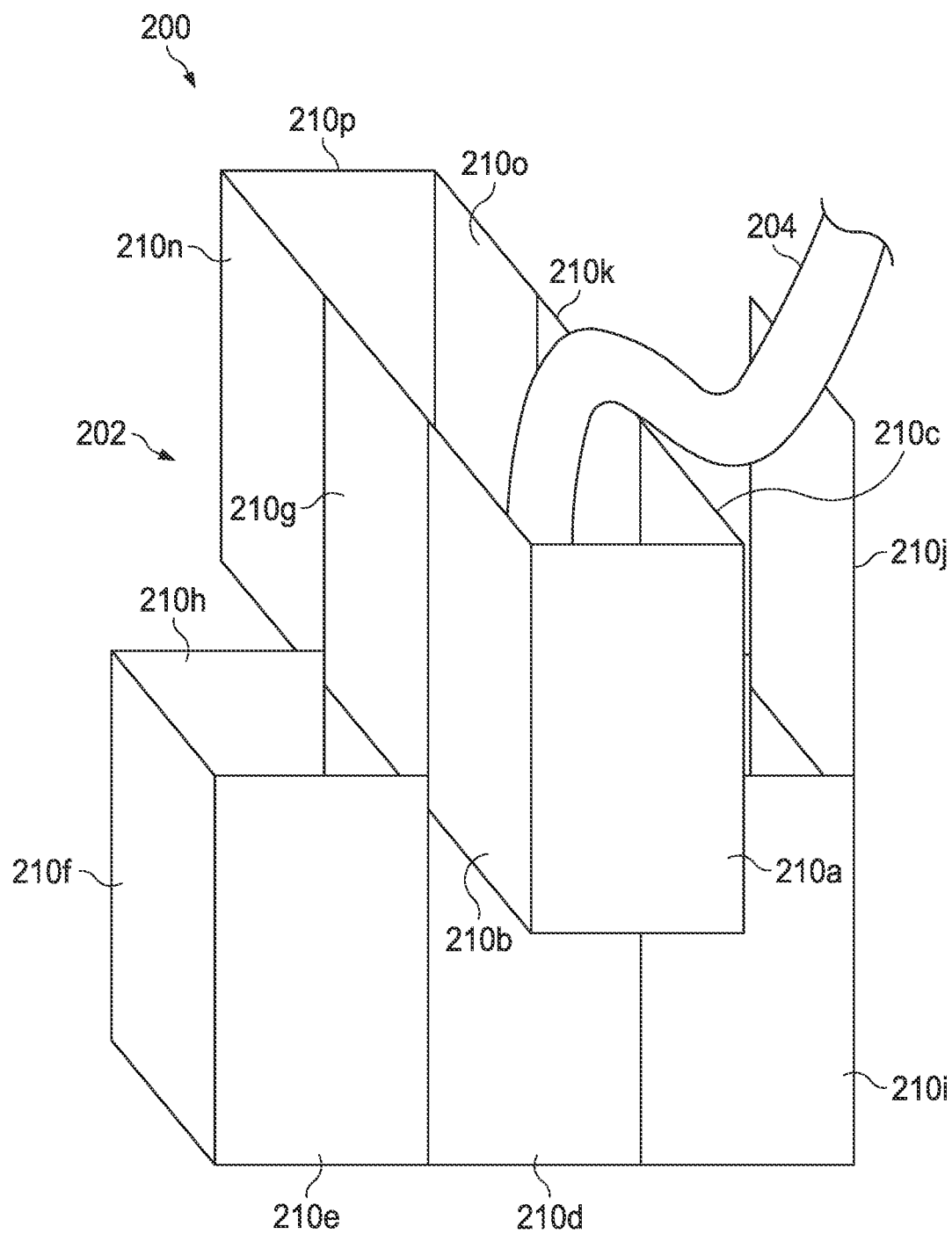
FIG. 11A is a diagrammatic representation of one embodiment of the adjustable form in another configuration for dispensing material at the example second location.
Figure 11B:
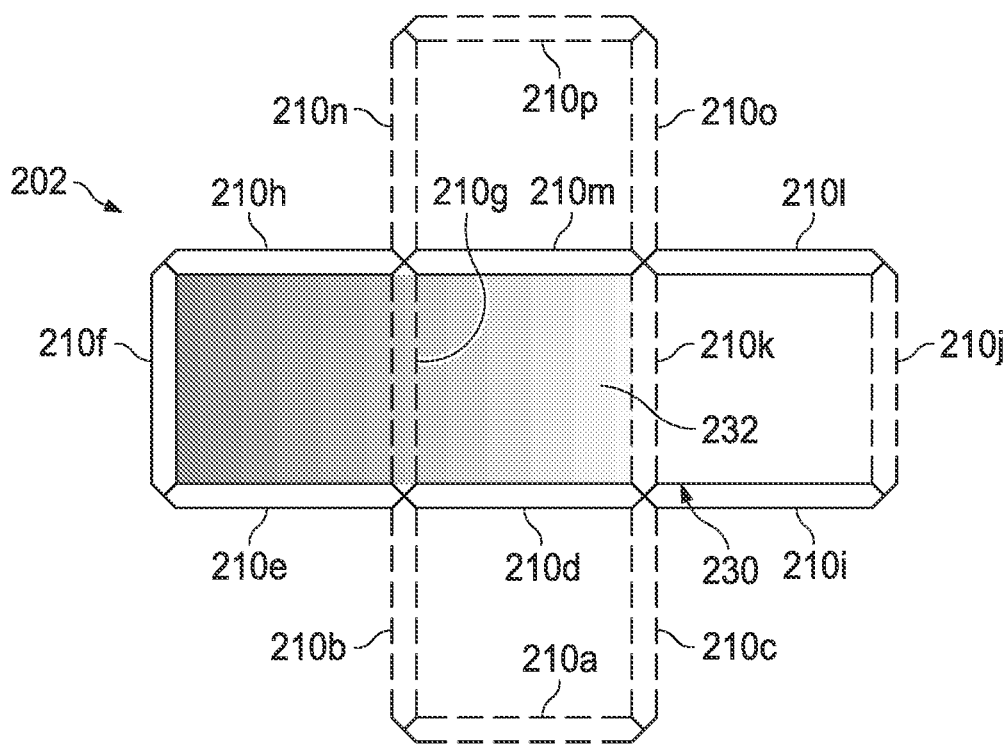
FIG. 11B is a diagrammatic representation of a top view of one embodiment of the adjustable form 202 at the second location.
Figure 11C:
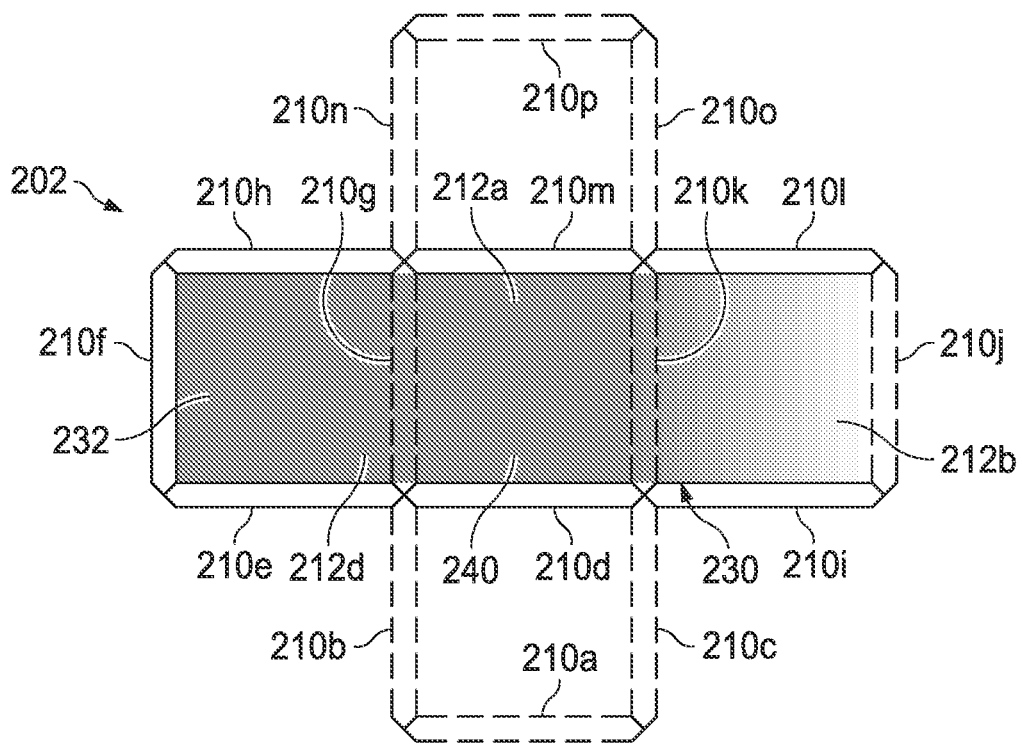
FIG. 11C is a diagrammatic representation of a top view of one embodiment of the adjustable form with additional material having been dispensed at the second location.
Figure 11D:
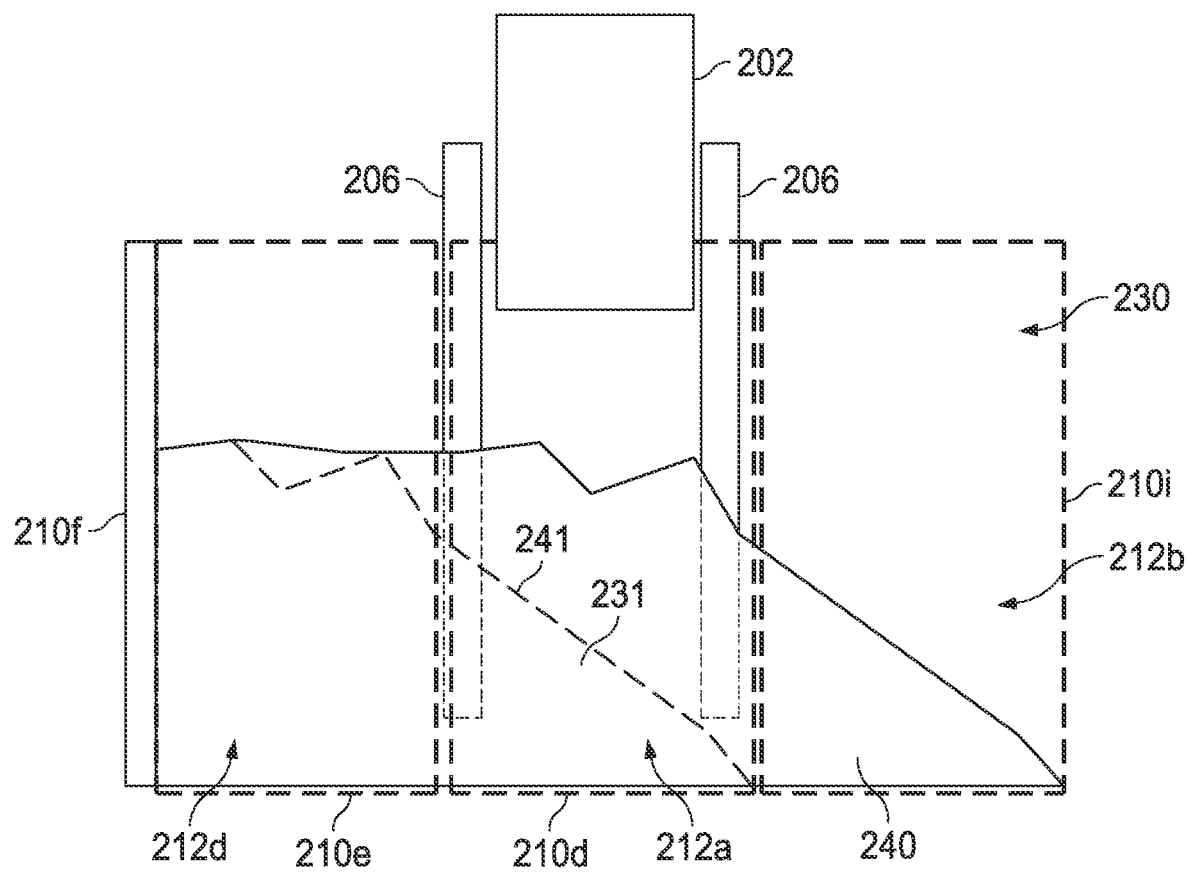
FIG. 11D is a diagrammatic representation of one embodiment of consolidating material at the second location.

FIG. 11A is a diagrammatic representation of one embodiment of the adjustable form 202 in another configuration, FIG. 11B is a diagrammatic representation of a top view of one embodiment of the adjustable form 202 at the second location, FIG. 11C is a diagrammatic representation of a top view of one embodiment of the adjustable form 202 with additional material having been dispensed at the second location, FIG. 11D is a diagrammatic representation of one embodiment of consolidating material at the second location, and FIG. 11F is a diagrammatic representation of one embodiment of the portion of the object being created having been extended.

Figure 12A:
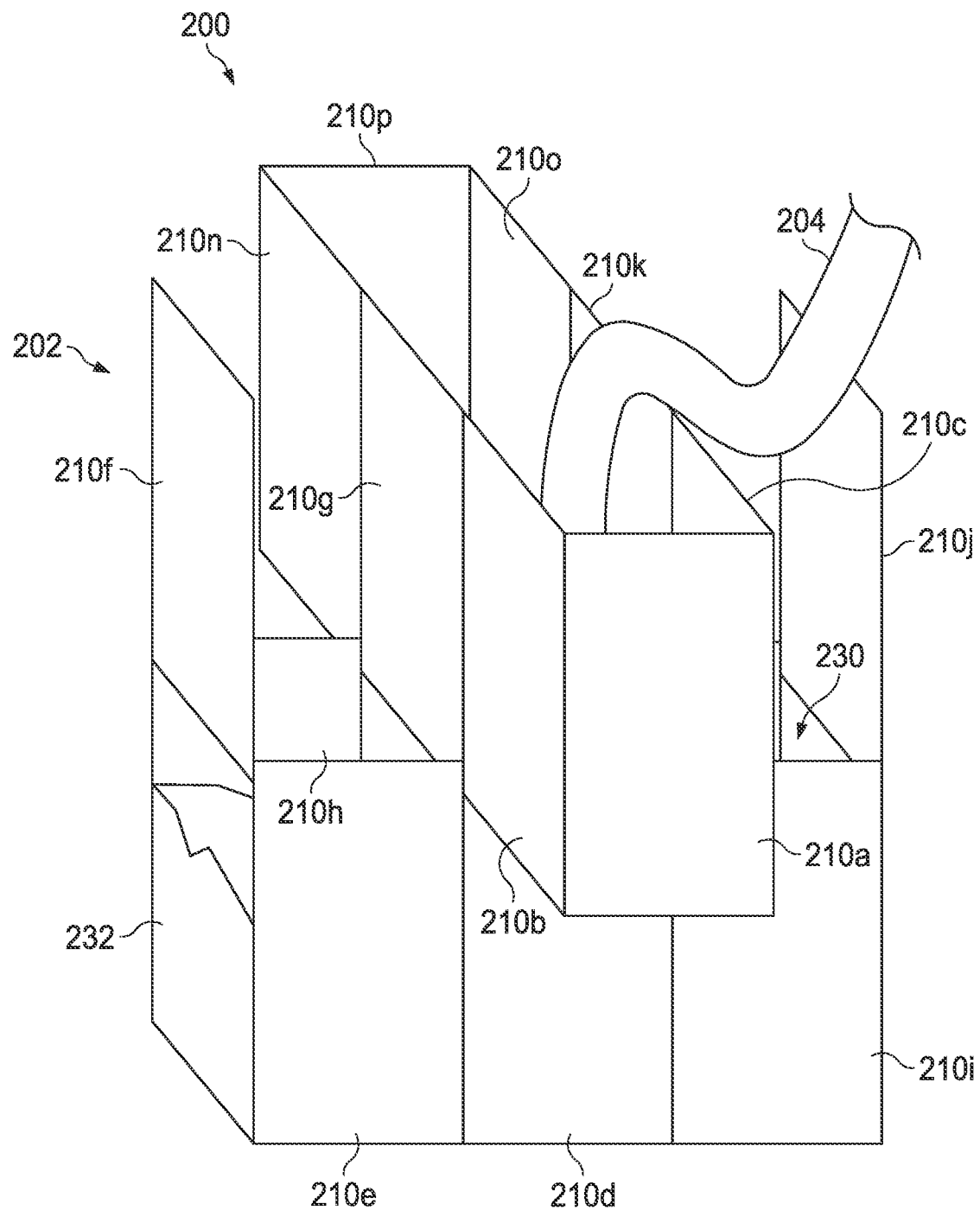
FIG. 12A is a diagrammatic representation of one embodiment of an adjustable form configured in another configuration for movement to a third location and FIG. 12B is a diagrammatic representation of a top view of one embodiment of the adjustable form in the configuration of FIG. 12A.
Figure 12B:
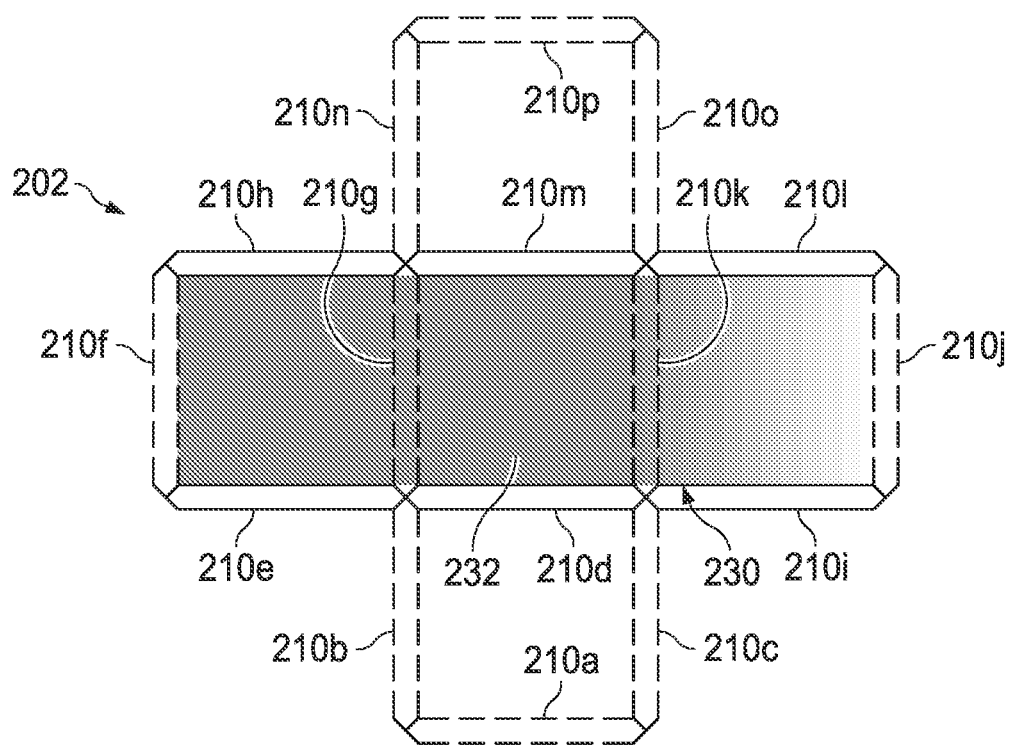

FIG. 12A is a diagrammatic representation of one embodiment of adjustable form 202 configured in yet another configuration for movement to a third location and FIG. 12B is a diagrammatic representation of a top view of one embodiment of the head 200 with the adjustable form 202.

Figure 13A:
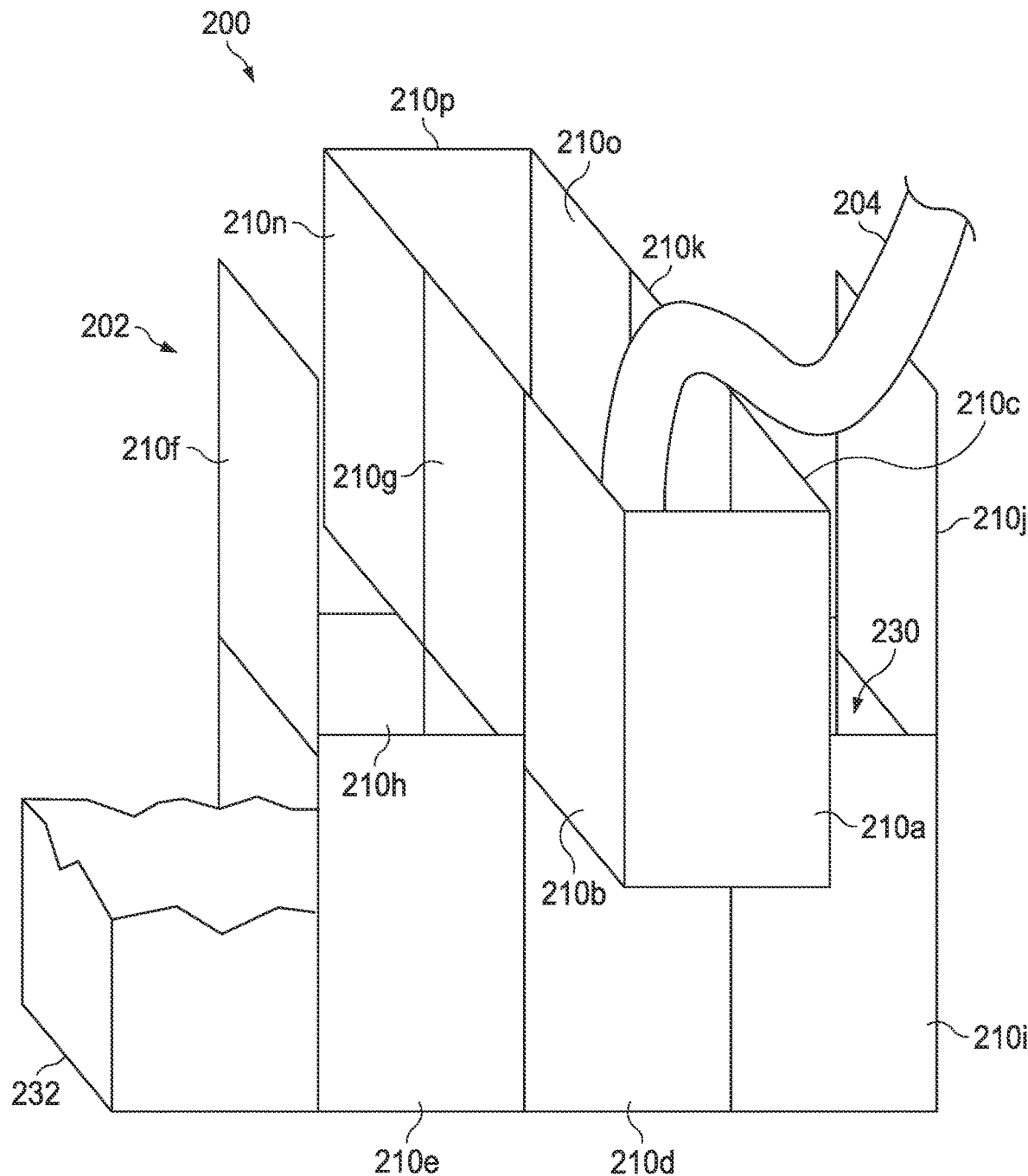
FIG. 13A is a diagrammatic representation of one embodiment of the adjustable form at the third location.
Figure 13B:
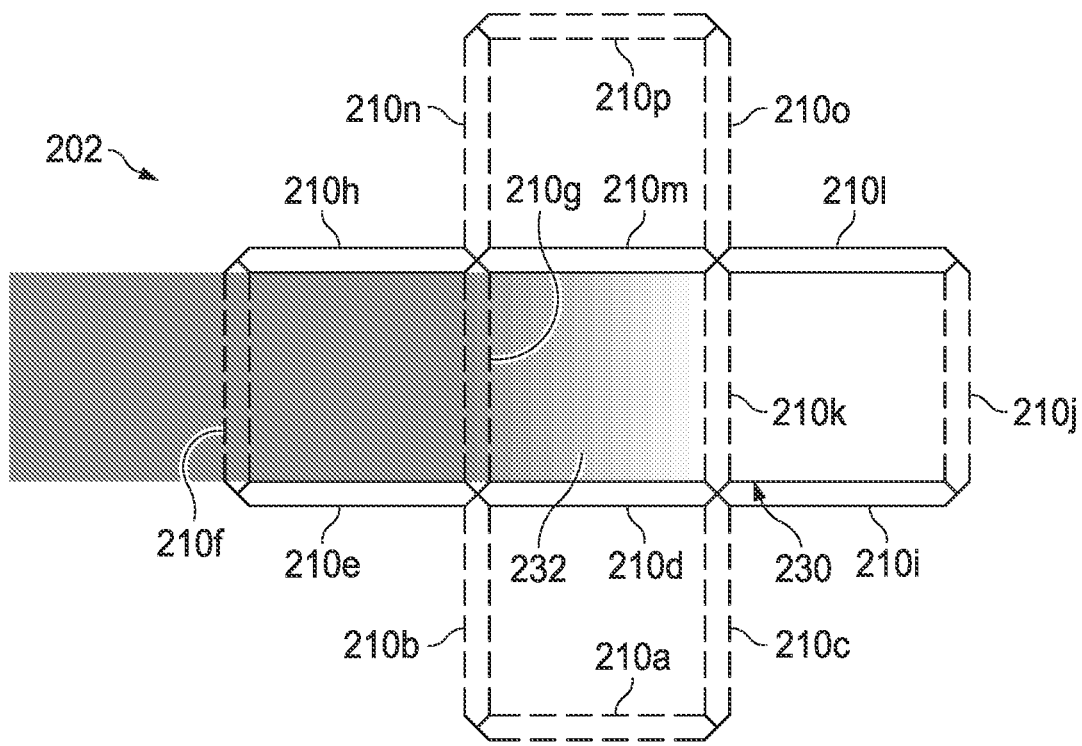
FIG. 13B is a diagrammatic representation of a top view of one embodiment of the adjustable form at the third location.
Figure 13C:
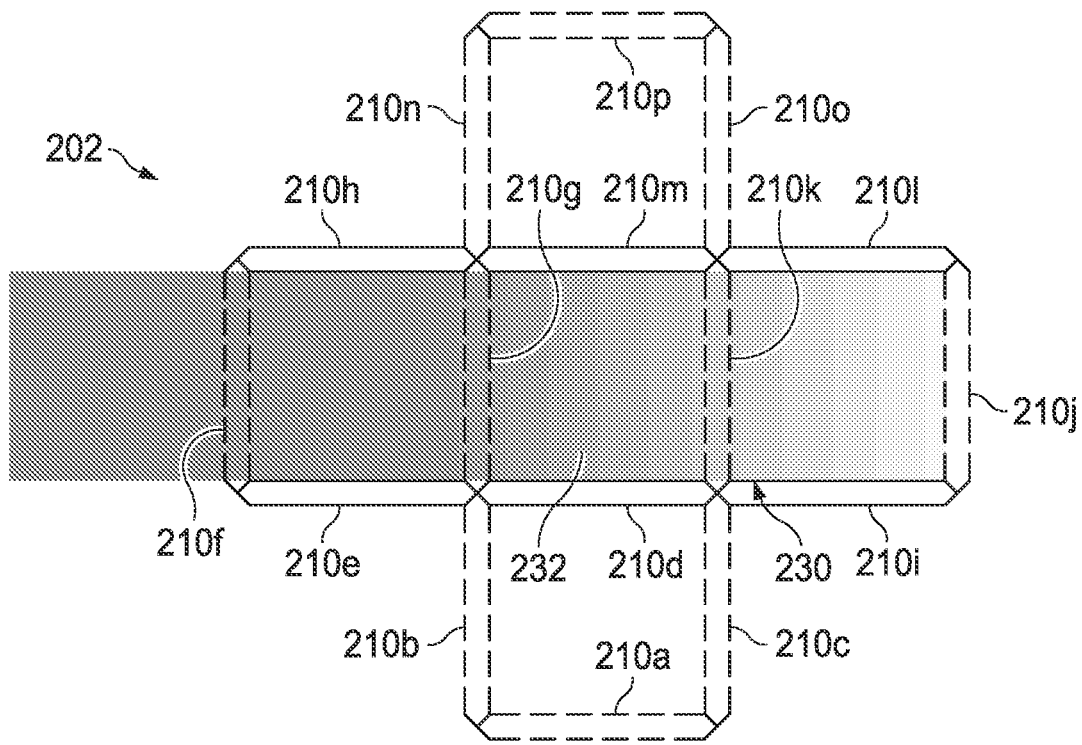
FIG. 13C is a diagrammatic representation of a top view of one embodiment of the adjustable form at the third location with additional material having been dispensed to extend the portion of the object being created.
Figure 13D:
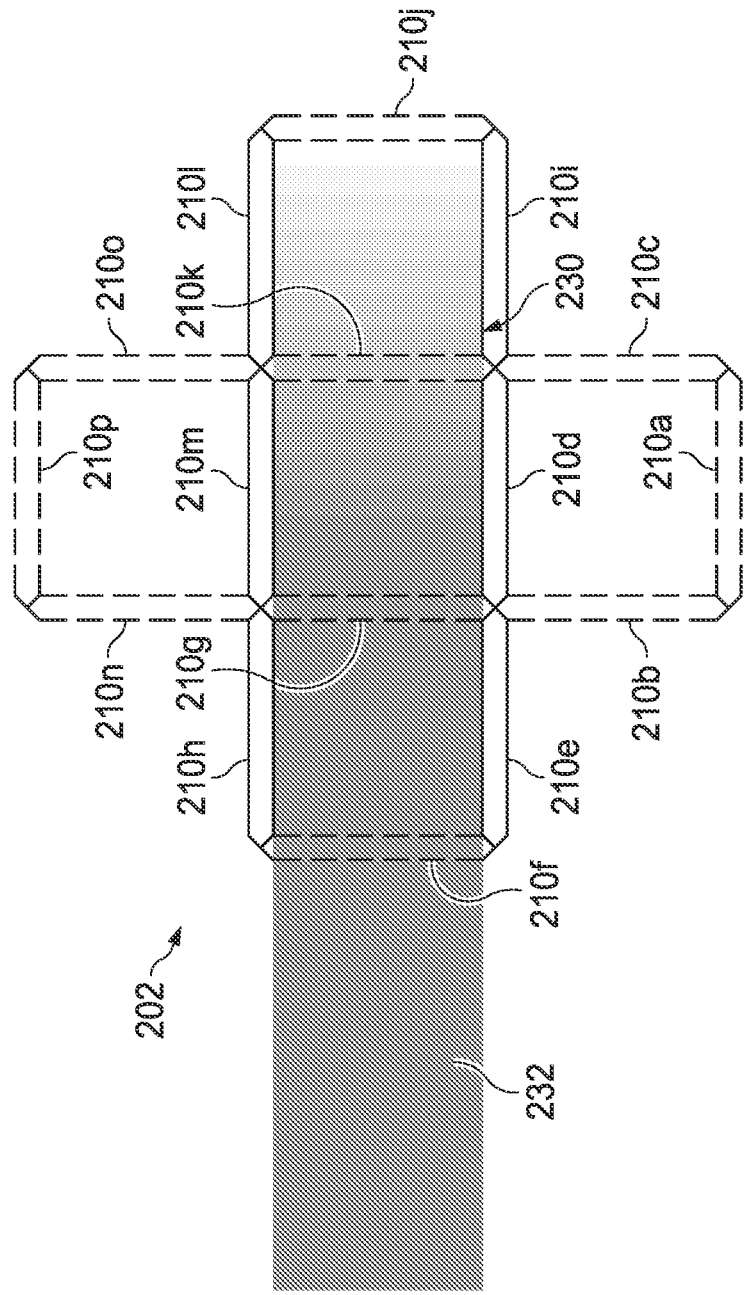
FIG. 13D is a diagrammatic representation of a top view of one embodiment of the adjustable form at a fourth location with additional material having been dispensed to extend the portion of the object being created.
Figure 13E:
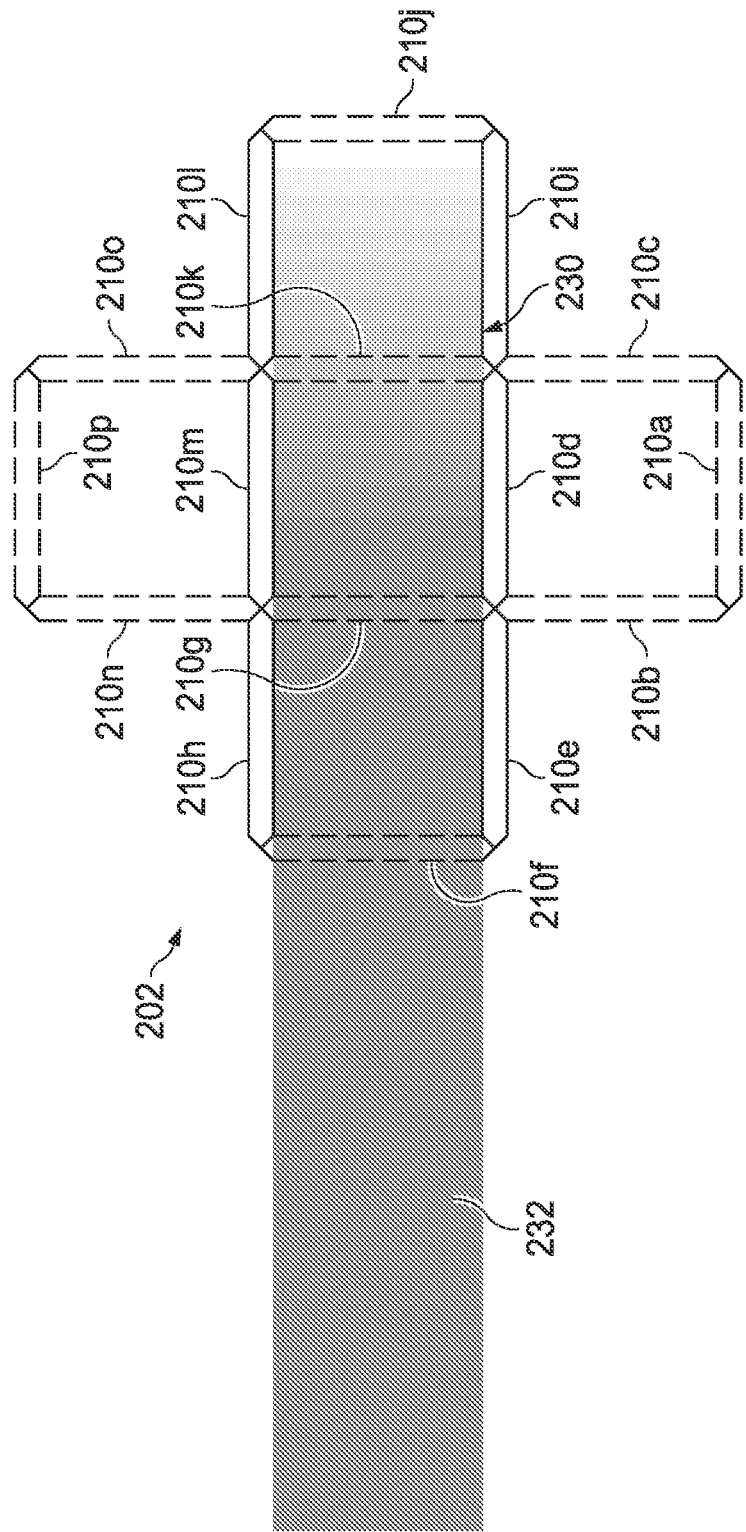
FIG. 13E is a diagrammatic representation of a top view of one embodiment of the adjustable form at a fifth example location with additional material having been dispensed to extend the portion of the object being created.

FIG. 13A is a diagrammatic representation of one embodiment of the head 200 with the adjustable form 202 at the third location, FIG. 13B is a diagrammatic representation of a top view of one embodiment of the adjustable form 202 at the third location, FIG. 13C is a diagrammatic representation of a top view of one embodiment of the adjustable form 202 at the third location with additional material having been dispensed to extend the portion of the object being created, FIG. 13D is a diagrammatic representation of a top view of one embodiment of the adjustable form 202 at a fourth example location with additional material having been dispensed to extend the portion of the object being created, FIG. 13E is a diagrammatic representation of a top view of one embodiment of the adjustable form 202 at a fifth example location with additional material having been dispensed to extend the portion of the object being created.

Figure 14A:
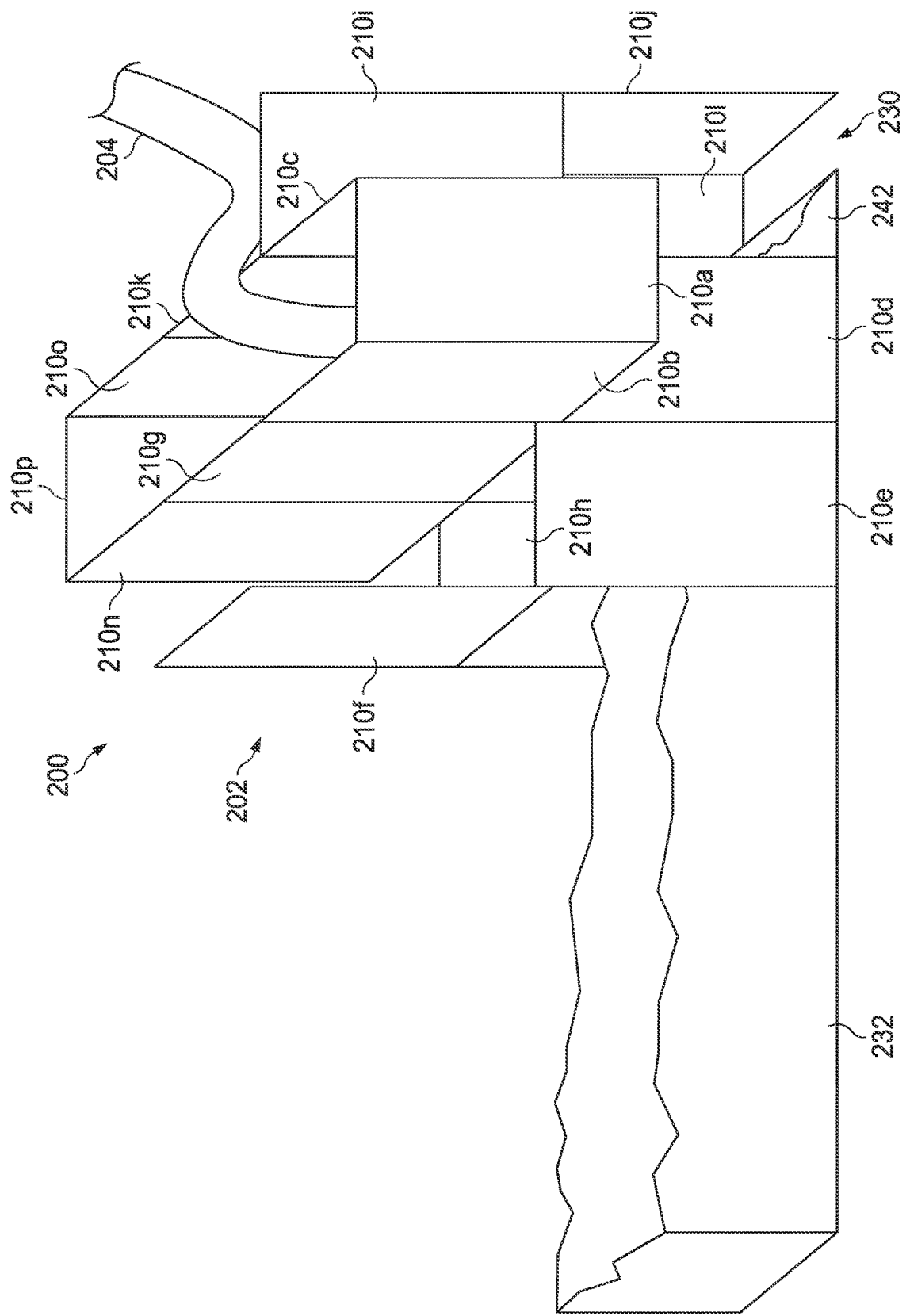
FIG. 14A is a diagrammatic representation of one embodiment of the adjustable form in another configuration and at a sixth example location.

FIG. 14A is a diagrammatic representation of one embodiment of the head 200 with the adjustable form 202 in yet another configuration and at a sixth example location and FIG. 14B is a diagrammatic representation of a top view of one embodiment of the adjustable form 202 with material dispensed at the sixth location to extend the portion of the object being created.

Figure 15A:
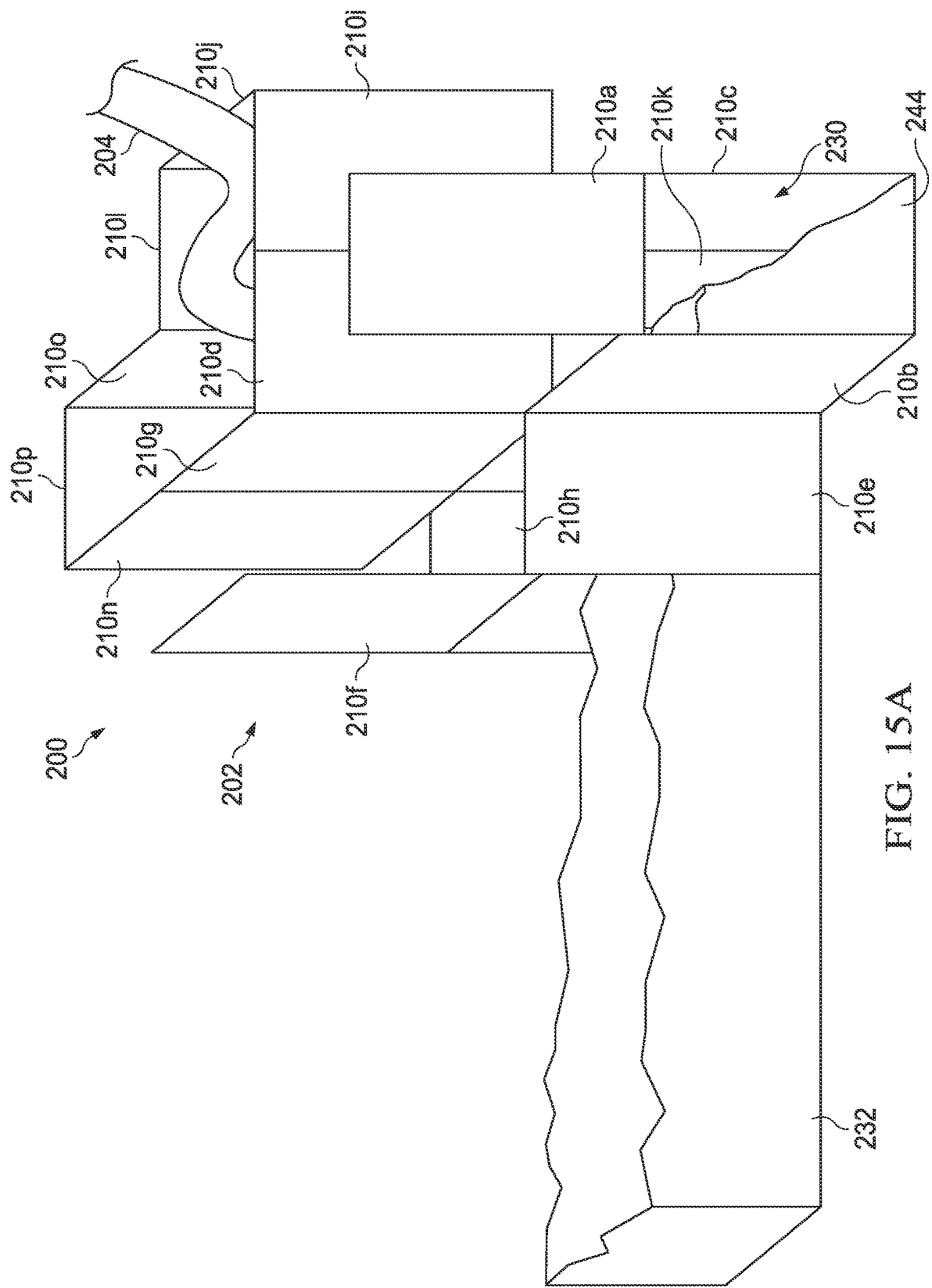
FIG. 15A is a diagrammatic representation of one embodiment of the adjustable form in yet another configuration and at a seventh example location.
Figure 15B:
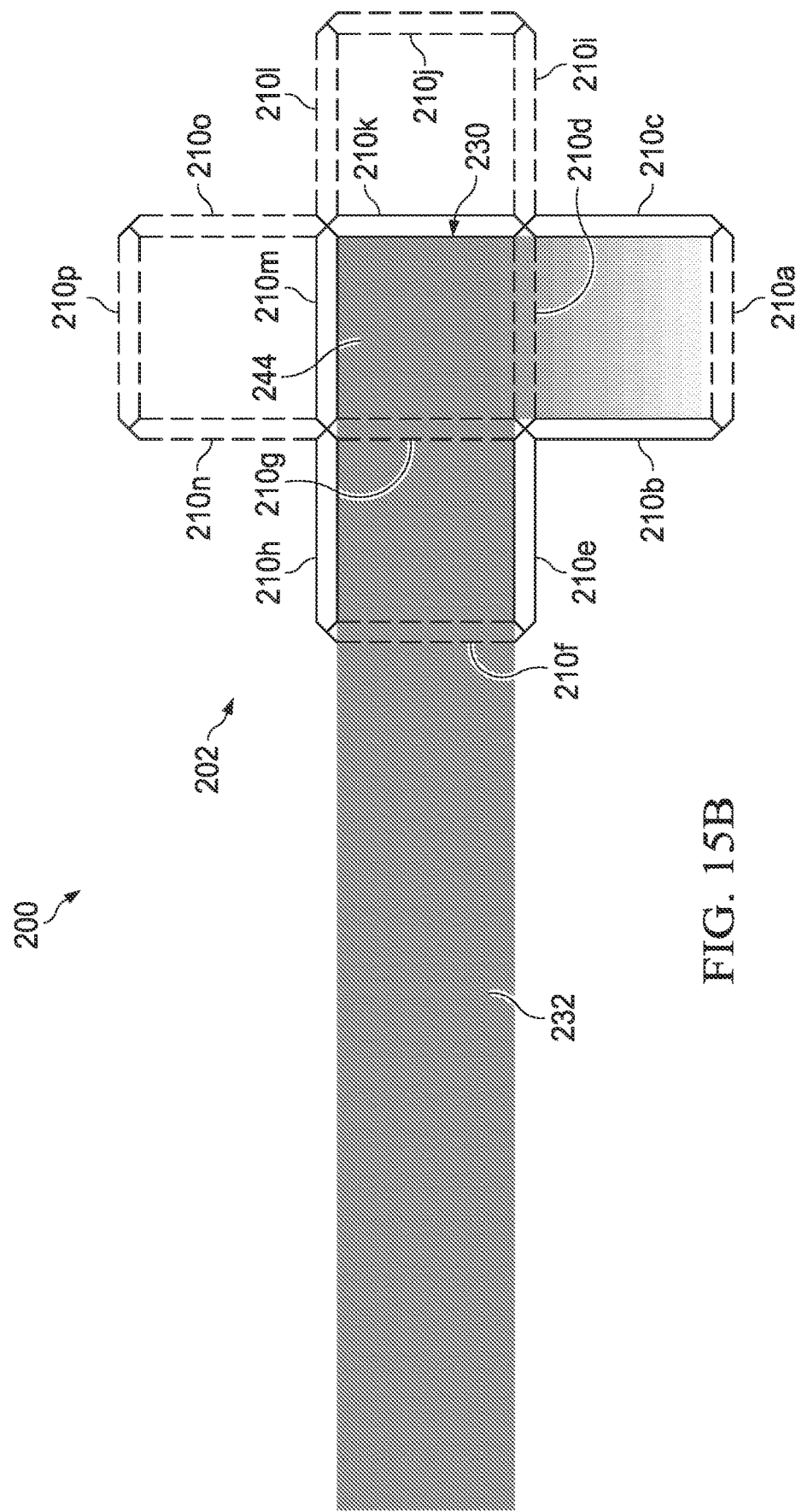
FIG. 15B is a diagrammatic representation of a top view of one embodiment of the adjustable form with material dispensed at the seventh location to extend the portion of the object being created.

FIG. 15A is a diagrammatic representation of one embodiment of the adjustable form 202 in another configuration and at a seventh example location and FIG. 15B is a diagrammatic representation of a top view of one embodiment of the adjustable form 202 with material dispensed at the seventh location to extend the portion of the object being created.

Figure 16A:
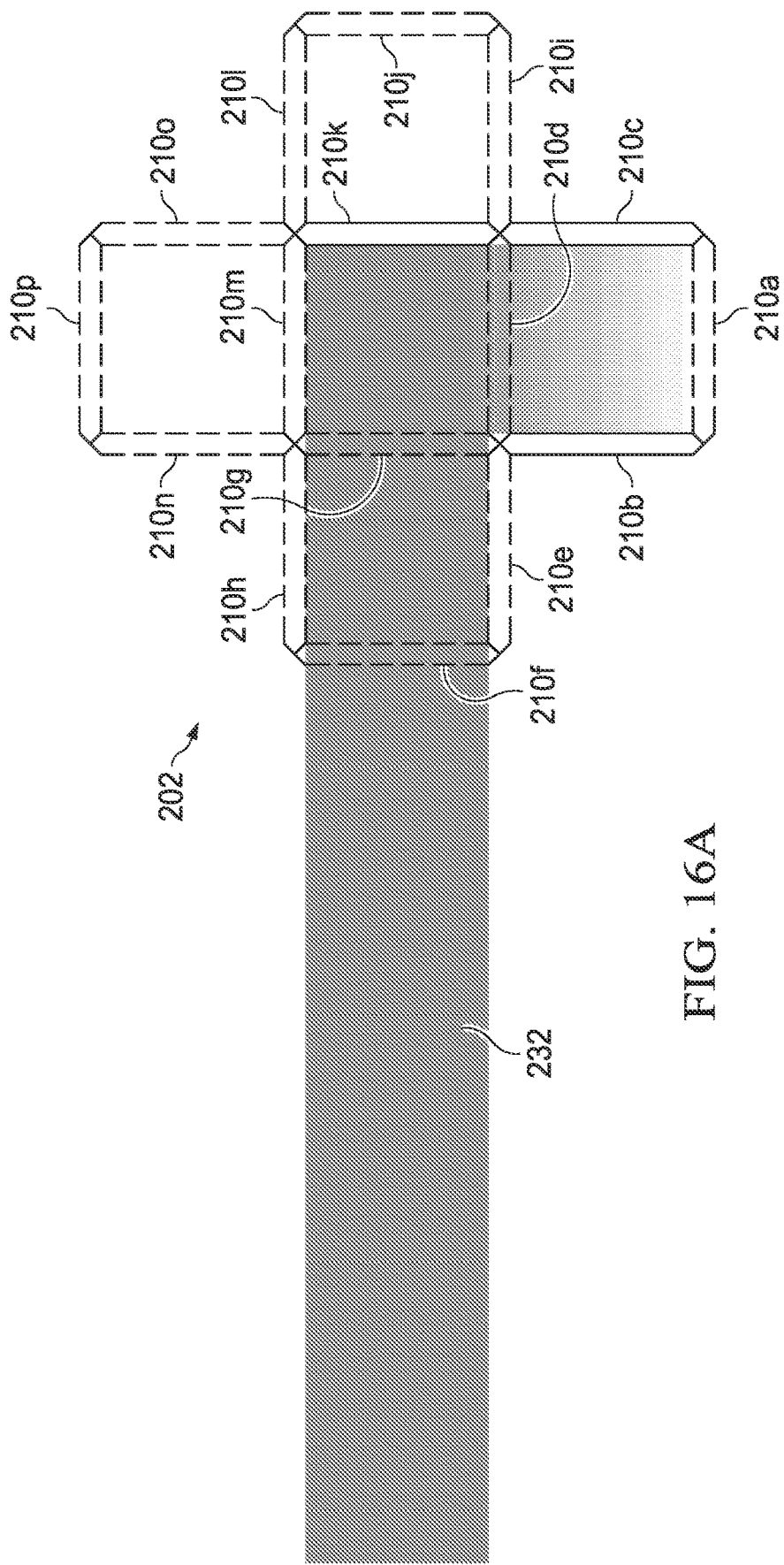
FIG. 16A is a diagrammatic representation of a top view of one embodiment of the adjustable form in yet another configuration to allow movement to an eighth example location.
Figure 16B:
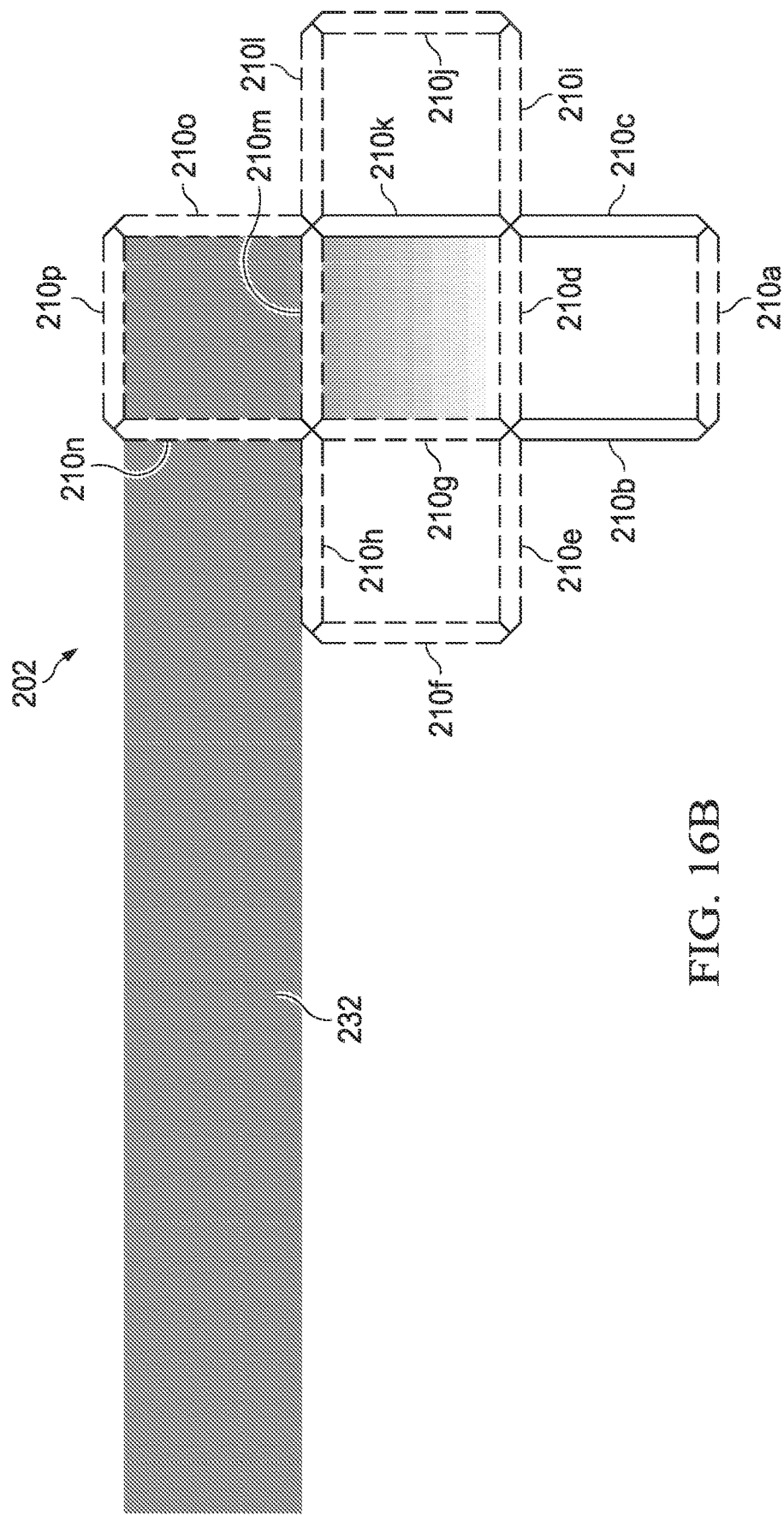
FIG. 16B is a diagrammatic representation of a top view of one embodiment of the adjustable form having moved to the eighth example location.

FIG. 16A is a diagrammatic representation of a top view of one embodiment of the adjustable form 202 in another configuration to allow movement to an eighth example location and FIG. 16B is a diagrammatic representation of a top view of one embodiment of the adjustable form 202.

Figure 17A:
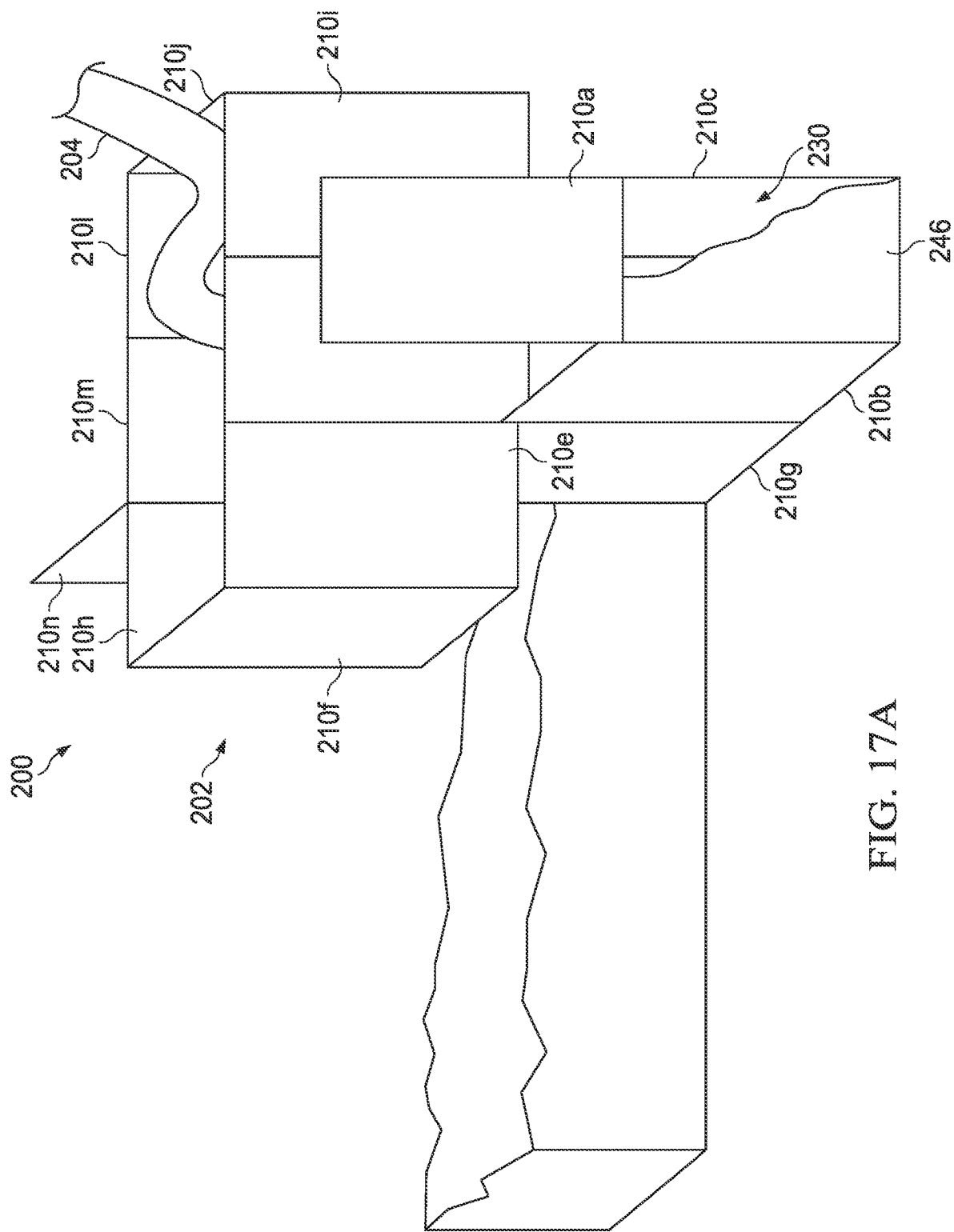
FIG. 17A is a diagrammatic representation of one embodiment of the adjustable form in in yet another configuration and at the eighth example location.
Figure 17B:
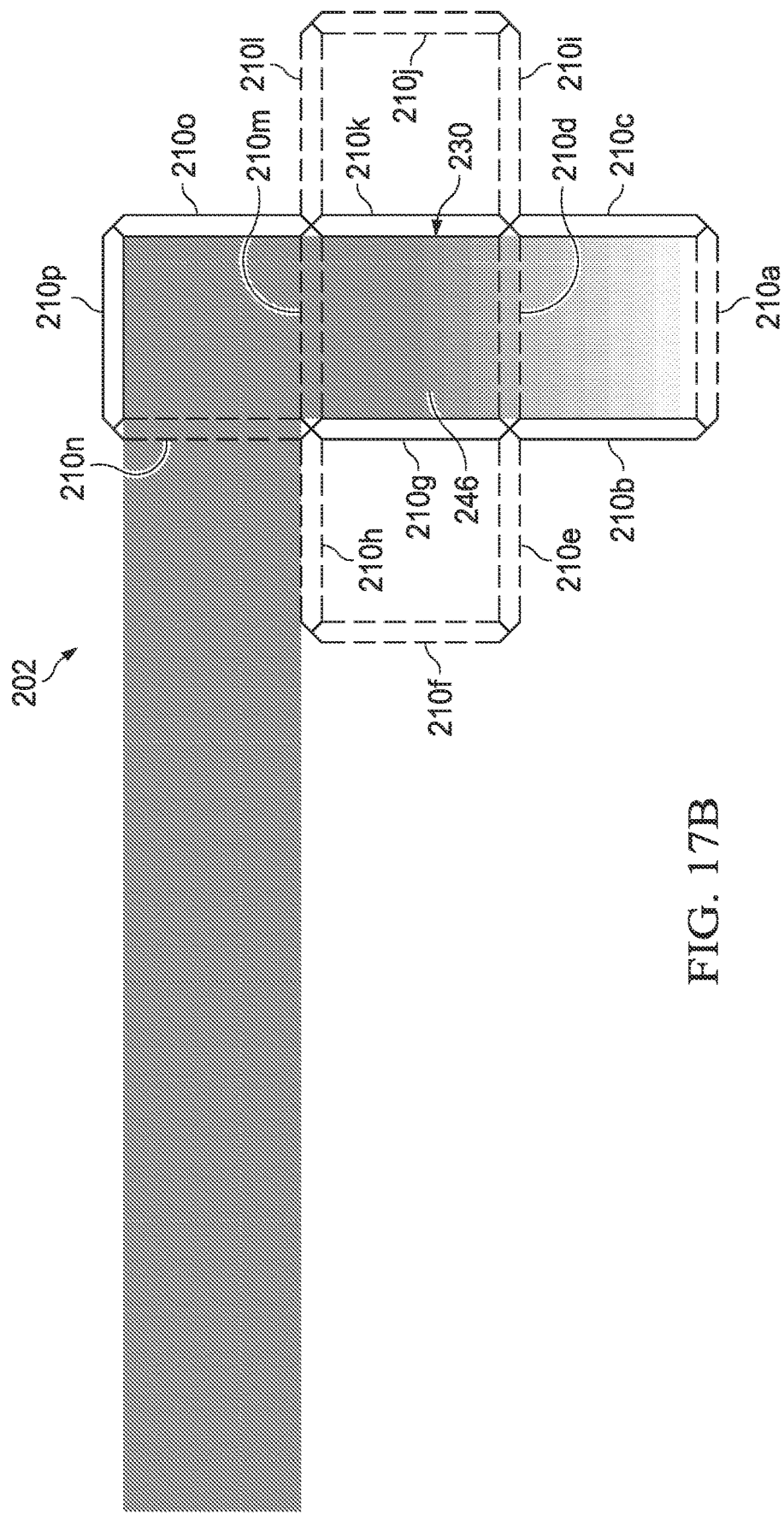
FIG. 17B is a diagrammatic representation of a top view of one embodiment of the adjustable form with material dispensed at the eighth location to extend the portion of the object being created.

FIG. 17A is a diagrammatic representation of one embodiment of the head 200 with the adjustable form 202 in another configuration and at an eighth example location and FIG. 17B is a diagrammatic representation of a top view of one embodiment of the adjustable form 202 with material dispensed at the eighth location to extend the portion 232 of the object being created.

Figure 18A:
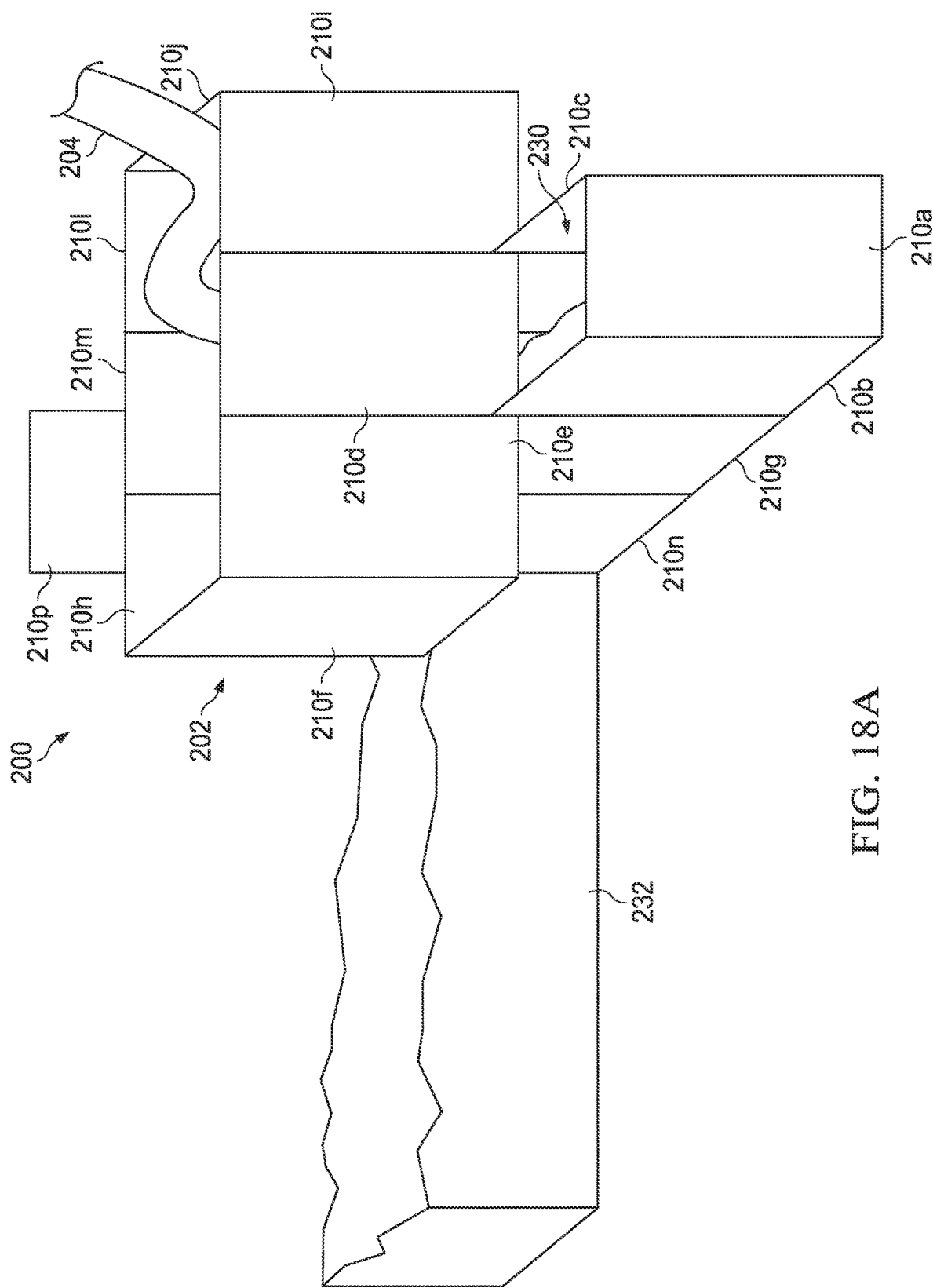
FIG. 18A is a diagrammatic representation of one embodiment of the adjustable form in another configuration and at a ninth location.
Figure 18B:
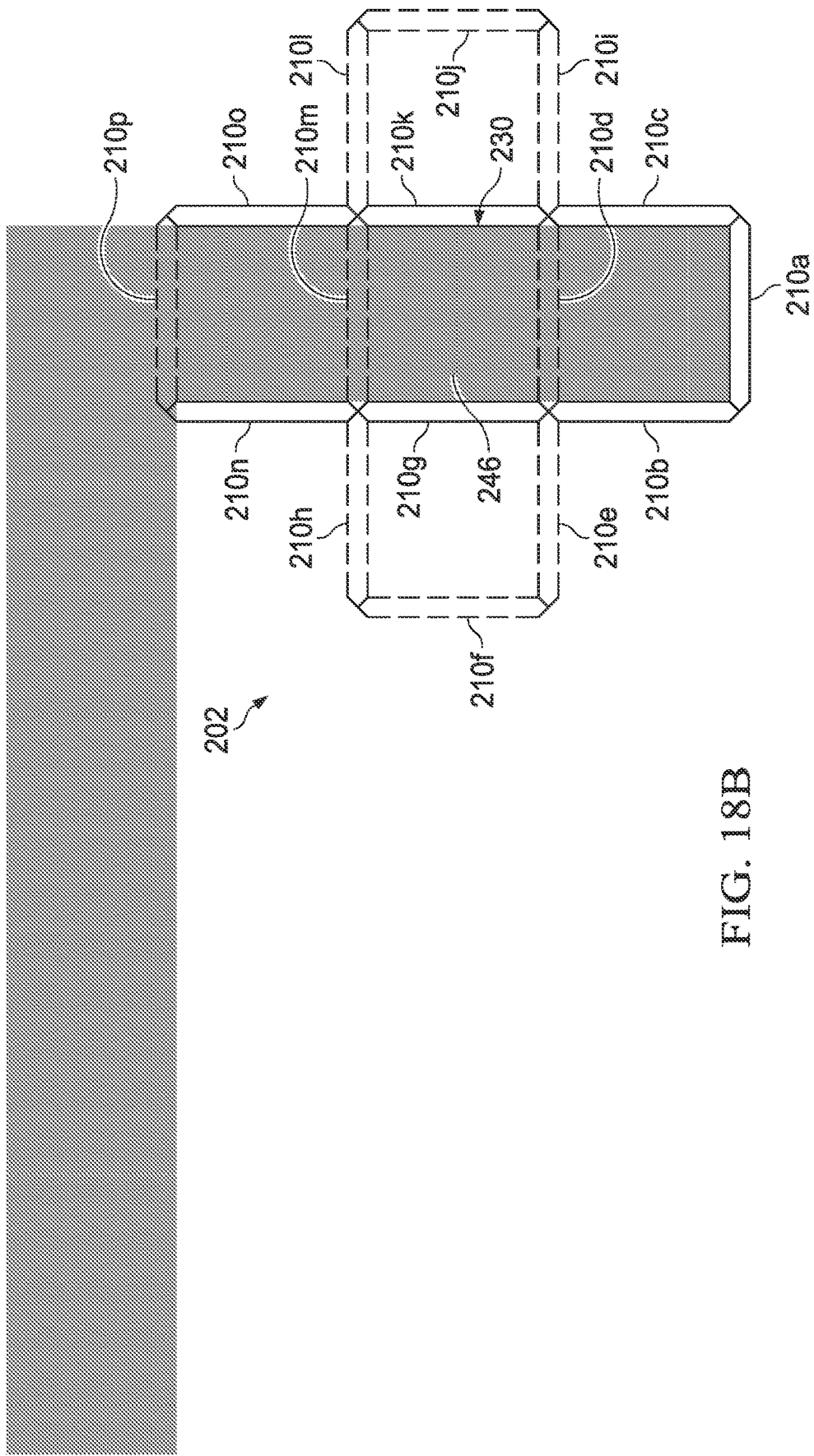
FIG. 18B is a diagrammatic representation of a top view of one embodiment of the adjustable form with material dispensed at the ninth location to extend the portion of the object being created.

FIG. 18A is a diagrammatic representation of one embodiment of the head 200 with the adjustable form 202 in yet another configuration and at a ninth location and FIG. 18B is a diagrammatic representation of a top view of one embodiment of the adjustable form 202 with material dispensed at the ninth location to extend the portion 232 of the object being created.

FIG. 19A is a diagrammatic representation of one embodiment of the head 200 dispensing new material into the adjustable form 202 at a tenth location, which is above the first location, to vertically extend the portion 232 of the object being created, FIG. 19B is a diagrammatic representation of one embodiment of consolidating the dispensed material and FIG. 19C is a diagrammatic representation of one embodiment of a subsection of the portion 232 of the object being created. FIG. 20 illustrates one embodiment of the adjustable form 202 moving from the tenth location to an eleventh location, which is above the second location. In FIG. 10B, FIG. 10E, FIG. 11B, FIG. 11C, FIG. 12B, FIG. 13A, FIG. 13B, FIG. 13C, FIG. 13D, FIG. 13E, FIG. 14B, FIG. 15B, and FIG. 16B, the lowered form sections illustrated in solid lines and the retracted form sections indicated in dashed lines.

During the process of forming an object, the shape and position of the casting form are adjusted based, for example, on instructions defined by a program run at the control system 108 (FIG. 7). Turning to FIG. 10A and FIG. 10B, one embodiment of using the adjustable form 202 to form material into a portion of an object being created is provided. The adjustable form 202 is controlled to have a first configuration for a first location. More particularly, the form sections are actuated to create a forming chamber 230 having a desired shape for the first location. Further, the adjustable form 202 is positioned at the first location.

In this example, form section 210g, form section 210m, form section 210l, form section 210i, and form section 210d are lowered to define the forming chamber 230, which is open at one end, and the other form sections are retracted (raised). The forming chamber 230 thus includes chamber portion 212a and chamber portion 212b. Material is delivered via the material delivery hose 204 to the adjustable form 202 and dispensed into the forming chamber 230 until it reaches a predetermined volume. Thus, material 231, which is a first portion of the material used to create the object, is dispensed at the first example location.

The material 231 may have a rheology so that it begins to set immediately or almost immediately upon being dispensed and so that it liquefies essentially immediately or otherwise quickly when consolidation energy is applied and stiffens essentially immediately or otherwise quickly upon the cessation of the application of the consolidation energy. More particularly, the material may have a rheology so that it exhibits shape-holding properties upon being dispensed into the forming chamber 230 but has sufficient shear thinning properties such that it liquefies as soon as consolidation energy is applied, and returns to a shape-holding state upon the cessation of the application of consolidation energy. As such, material 231 may accumulate under the opening of material delivery hose 204 in a generally cone or "volcano" shape and does not flow or only slightly flows to the walls of chamber portion 212a. According to one embodiment, the material 231 is consolidated so that it liquefies and flows to the walls of chamber portion 212a and at least partially into chamber portion 212b.

As illustrated in FIG. 10C, the material 231 in the forming chamber 230 may be consolidated as needed (form sections 210i and 210d are made transparent). The consolidation element 206—for example, one or more vibrators—is lowered into the material 231 in the forming chamber 230 and activated to impart energy. In another embodiment, the adjustable form 202 (or individual sections thereof) is vibrated to consolidate the material in the forming chamber 230. Consolidation causes the material 231 to liquefy, allowing it to flow against the walls of the form chamber 230 at chamber portion 212a. Consolidation may also cause the material to flow at least partially into chamber portion 212b. While illustrated as flowing the entire length of chamber portion 212b, the material is consolidated in some embodiments such that it only flows halfway or less into any chamber portions of the forming chamber 230 adjacent to the central chamber portion 212a. With consolidation performed, the consolidation element 114 is retracted.

The material is allowed to stiffen sufficiently so that it maintains its shape when the adjustable form 202 is removed. As discussed above, in some embodiments the material has a rheology so that it stiffens to a shape-holding state almost immediately upon cessation of the consolidation energy. The material 231 creates a formed portion 232 of an object being created.

As will be appreciated then, the material 231 flows to take on a shape that is at least partially defined by the forming chamber. In other cases, the dispensed material takes on a shape that is not defined by the forming chamber, for example when the material is dispensed at a location at which the newly dispensed material is surrounded on all sides by previously dispensed material. The material that comes up against the surfaces of the form sections that define the forming chamber 230 generally take on the surface shape, which may be smooth in some embodiments. Thus, as illustrated in FIG. 10D, the formed portion 232 includes finished surfaces that are formed by the form sections (finished surface 234 and finished surface 236 are visible). The formed portion 232 also includes a working surface 238. The head 200 can be moved to reposition the adjustable form 202, the adjustable form 202 may be reconfigured if needed, and additional material dispensed, and consolidated with the consolidation element 206. The working surface 238 may take on the shape of a finished surface as it flows forward, and additional material accumulates on top of it.

As discussed, the adjustable form 202 can be moved to a new position. Any form sections that are lowered in the first configuration of FIG. 10A and FIG. 10B that need to be raised for the second dispense location are raised and head 200 moves to the new position. In the example of FIG. 10E, the adjustable form 202 is reconfigured to a second configuration by raising form section 210g and the head advances to the next position. At the new dispense location, any form sections that need to be lowered are lowered. In the illustrated embodiment of FIG. 11A and FIG. 11B, the adjustable form 202 is reconfigured to a third configuration (FIG. 11A and FIG. 11B) corresponding to the second location. In this example, form section 210f, form section 210e and form section 210f are lowered (compared to the configuration in FIG. 10E). Thus, form section 210f, form section 210e, form section 210d, form section 210i, form section 210l, form section 210m and form section 210h define the forming chamber 230 and the other form sections are retracted.

At this position, the head 200 dispenses additional material 240 (FIG. 11C, FIG. 11D) until it reaches a predetermined volume. Material 240 is thus a second portion of the material used to form the object being created. According to one embodiment, the head 200 dispenses the additional material 240 at chamber portion 212a on top of the precedingly dispensed material or in a position that allows the additional material 240 to flow onto the previously dispensed material. In the example of FIG. 11C, the new material 240 is dispensed at chamber portion 212a by the head 200. Thus, in some embodiments, the head 200 dispenses the new material 240 partially on top of the previously dispensed material 231, which has been allowed to stiffen to the point that it can hold its form without the adjustable form 202. As illustrated in FIG. 11D, the material in forming chamber 230 may be consolidated as needed. For example, the consolidation element 206 is lowered into the newly dispensed material 240 in the forming chamber 230. In some embodiments, the consolidation element 206 extends into the previously dispensed material 231 below the newly dispensed material 240. In another embodiment, the adjustable form 202 is vibrated to consolidate the material in the forming chamber 230.

The consolidation element 206—for example, one or more vibrators—is lowered into the material in the forming chamber 230 and activated to impart energy. Consolidation causes the material 240 to liquefy, allowing it to flow against the walls of the forming chamber 230 at chamber portion 212a. Consolidation of material in the forming chamber may also cause the material to flow at least partially into chamber portion 212b and chamber portion 212d. While illustrated as flowing the entire length of chamber portion 212b, the material is consolidated in some embodiments such that it only flows halfway or less into any chamber portions of the forming chamber 230 adjacent to the central chamber portion 212a.

Additionally, consolidation of the material in the forming chamber 230 can include consolidating the previously dispensed material 231 below the newly dispensed material 240 and in particular consolidating at least the portion of the previously dispensed material 231 proximate to the interface 241 between the newly dispensed material 240 and the previously dispensed material 231 so that interface 241 liquefies to allow the newly dispensed material 240 and previously dispensed material 231 to mechanically intermix. With consolidation performed, the consolidation element 206 is retracted. The material is allowed to stiffen sufficiently so that it maintains its shape when the adjustable form 202 is removed, which may occur immediately upon cessation of the application of the consolidation energy in some embodiments.

Figure 11E:
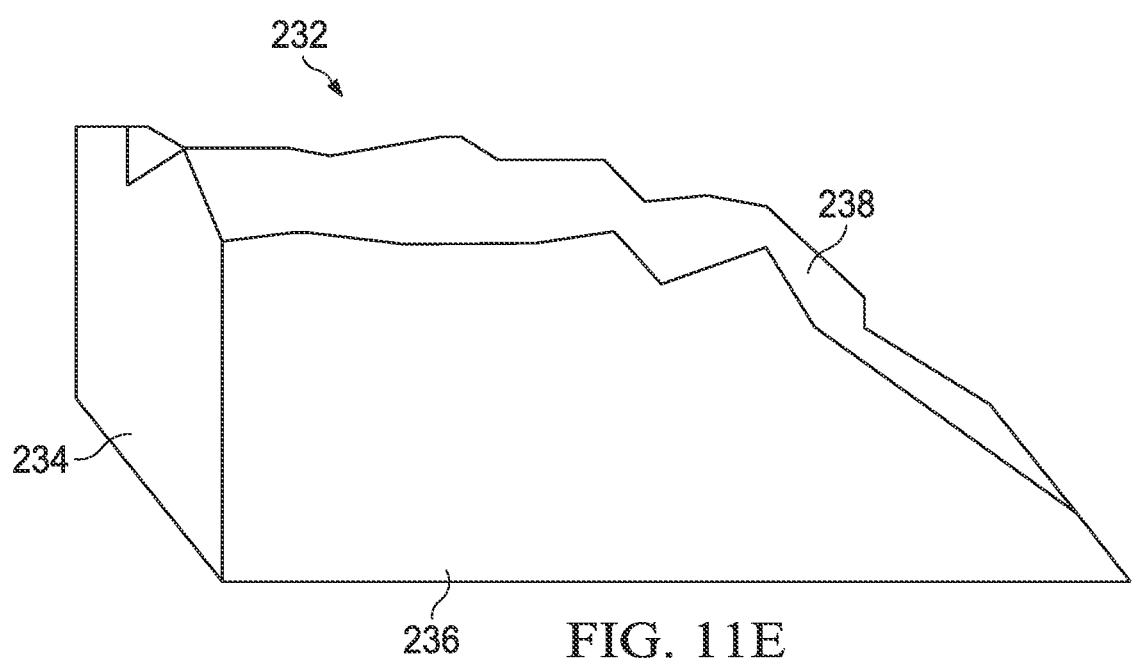
FIG. 11E is a diagrammatic representation of one embodiment of the portion of the object being created having been extended.

Turning to FIG. 11E, the formed portion 232 is extended by material 240 and has finished surfaces (finished surface 234 and finished surface 236 are shown) as defined by the forming chamber 230 and a working surface 238. The formed portion 232 is extended in a manner that does not result in cold seams or visible seams between the previously dispensed material 231 and the newly dispensed material 240. Thus, the new material 240 and the previously dispensed material 231 form a seamless and contiguous structure.

More particularly, by consolidating the newly dispensed material 240 and the previously dispensed material 231, the matrix of material components—for example, often sand, coarse aggregate, and cement, in the case of concrete—is evenly mixed and void-free within and across the newly dispensed material 240 and the previously dispensed material 231, thereby consolidating them together into one monolithic, contiguous, and joint free portion 232. As such, "cold joints" are avoided and a monolithic structure cast.

The adjustable form 202 is then moved to further extend the formed portion 232 of the object being created. In FIG. 12A and FIG. 12B, for example, the adjustable form 202 is reconfigured to a fourth configuration for movement to a third location by raising form section 210f. In this configuration, form section 210e, form section 210d, form section 210i, form section 210l, form section 210m and form section 210h define the forming chamber 230, and the remaining form sections are retracted. The adjustable form is advanced to the third location (FIG. 13A and FIG. 13B). Additional material is dispensed at the third location (FIG. 13C) and the material in the forming chamber consolidated as needed. This may include consolidating previously dispensed material adjacent to the newly dispensed material. In any event, as illustrated, the formed portion 232 is further extended with the additional material, which has a shape at least partially defined by the adjustable form 202 and the previously dispensed material. The newly dispensed material can be allowed to stiffen until it is stable enough to hold its shape without the adjustable form 202. As discussed above, this may occur almost immediately upon cessation of consolidation energy in some embodiments.

The head 200 can continue to move and deposit material at each location according to the design of the object being created. For example, the adjustable form 202 can be moved to a fourth example location (FIG. 13D) and a fifth example location (FIG. 13E). Additional material is dispensed at each location, consolidated, and allowed to stiffen as needed at the fourth location and fifth location to further extend the formed portion 232 of the object being created.

Some embodiments of an adjustable form 202 can be configured to form corners. In FIG. 14A and FIG. 14B, for example, the adjustable form 202 is reconfigured into a fifth configuration (not shown) by raising form section 210i and moved to a sixth location. Adjustable form is reconfigured to a sixth configuration to facilitate a 90-degree bend by lowering form section 210j. In the sixth configuration, form section 210d, form section 210e, form section 210h, form section 210m, form section 210l, and form section 210j are lowered to define the forming chamber 230 and the remaining form sections raised. Additional material 242 is dispensed into the forming chamber 230, consolidated, and allowed to stiffen as needed to extend the formed portion 232.

The adjustable form 202 is reconfigured into a seventh configuration (not shown) by raising form section 210d, form section 210j and form section 210l. The adjustable form 202 is moved to a seventh location. With reference to FIG. 15A and FIG. 15B, the adjustable form 202 is reconfigured to an eighth configuration by lowering form section 210c, form section 210b, and form section 210k. In the configuration of FIGS. 15A and 9B, form section 210h, form section 210m, form section 210k, form section 210c, form section 210b, and form section 210e define the forming chamber 230 and the other form sections are raised. Additional material 244 is dispensed into the forming chamber 230 until the material reaches a desired volume. The material in forming chamber 230 is consolidated so that it takes on a shape at least partially defined by forming chamber 230 (and the previously dispensed material) and mechanically intermixes with the previously dispensed material.

The adjustable form 202 is reconfigured into a ninth configuration (FIG. 16A) by raising form section 210h, form section 210k, and form section 210m. The adjustable form 202 is moved to an eighth location (FIG. 16B).

The adjustable form 202 is reconfigured to a tenth configuration at the eighth location (FIG. 17A and FIG. 17B). More particularly, form section 210g and form section 210o are lowered such that form section 210p, form section 210o, form section 210k, form section 210c, and form section 210b, and form section 210g define the forming chamber 230 and the other form sections remain retracted. Additional material 246 is dispensed at the eighth location. The material in forming chamber 230 is consolidated and allowed to stiffen as needed to extend the formed portion 232.

The adjustable form 202 is reconfigured to an eleventh configuration for movement to a ninth location. In particular, form section 210p is raised. The adjustable form is moved to the ninth location and reconfigured to a twelfth configuration suitable for the ninth location. For example, form section 210n and form section 210a are lowered. FIG. 18A is a diagrammatic representation of one embodiment of the adjustable form 202 in a twelfth configuration and at a ninth location and FIG. 18B is a diagrammatic representation of a top view of one embodiment of the adjustable form 202 according to the twelfth configuration with material dispensed at the ninth location to extend the portion 232 of the object being created. In this example, form section 210o, form section 210k, form section 210c, and form section 210b, form section 210g and form section 210n define the forming chamber 230 and the other form sections remain retracted. Material is delivered via the material delivery hose 204 and dispensed into the forming chamber 230 until it reaches a predetermined volume. The material in forming chamber 230 is consolidated and allowed to stiffen as needed to extend the formed portion 232.

In addition, or in the alternative, to horizontally extending an object being created, embodiments can vertically extend the material. For example, after completing a layer of the object being built, the material casting system may form a subsequent layer on top of the preceding layer, adding subsequent layers until the structure has reached the required height. In general, the previous layer is allowed to set sufficiently to support the subsequently stacked layer while still remaining workable so that the layers can be consolidated together.

With reference to FIG. 19A, the adjustable form 202 is positioned at a tenth position, which is above the first position of FIG. 10A, to begin a second layer. The adjustable form 202 is configured for forming material at the tenth position. In the illustrated embodiment, the adjustable form 202 is configured in the first configuration (see, FIG. 10A and FIG. 10B) in which form section 210g, form section 210m, form section 210l, form section 210i, and form section 210d are lowered to define the forming chamber 230 and the remaining form sections are raised. According to one embodiment, the adjustable form 202 is positioned so that the lower ends of form section 210g, form section 210m, form section 210l, form section 210i, and form section 210d extend below the top of the previous layer.

Material 250 is delivered via the material delivery hose 204 to the forming chamber and dispensed until it reaches a predetermined volume. As illustrated, the material delivery hose deposits the additional material 250 on top of the previously formed portion 232 of the object being created, which is vertically adjacent to the location at which additional material 250 is dispensed.

In the example of FIG. 19A, the head 200 is positioned so that the ends of the adjustable form 202 extend below the top surface of the preceding layer. This can allow the top surface of the preceding layer to be reliquefied and mechanically intermixed with the current layer, all while being held within the extended adjustable form.

Turning to FIG. 19B, the material in forming chamber 230 may be consolidated as needed. For example, the consolidation element 206 can be lowered into the newly dispensed material 250 in the forming chamber 230. In some embodiments, the consolidation element 206 extends into the previously dispensed material of the layer below. The consolidation element 206 is activated to impart energy and consolidate the newly dispensed material 250. With consolidation performed, the consolidation element 114 is retracted. In another embodiment, the adjustable form 202 is vibrated to consolidate the material in the forming chamber 230.

Consolidation of the material in the forming chamber 230 can include consolidating the previously dispensed material below the newly dispensed material 250 and in particular consolidating the portion of the previously cast section proximate to the interface 251 between the newly dispensed material 250 and the previous dispensed material so that the interface 251 liquefies and the newly dispensed material and previously dispensed material mechanically intermix. With consolidation performed, the consolidation element 206 is retracted. The material is allowed to stiffen sufficiently so that it maintains its shape when the adjustable form 202 is removed.

By consolidating the newly dispensed material 250 and the previously dispensed material, the matrix of material components is evenly mixed and void-free within and across the newly dispensed material 250 and the previously dispensed material, thereby consolidating them together into one monolithic, contiguous, and joint free portion 232. As such, "cold joints" can be avoided, and a monolithic structure cast as illustrated in FIG. 19C.

At the time that the last layer is being formed, the adjustable form 202 or other element carried by the head may be used to scrape the top surface of the structure, thus leveling or screeding the surface. With reference to FIG. 20, the adjustable form 202 is moved from the tenth location to an eleventh location, which is above the second location (see, FIG. 11C). A form section, in this case the form section 210e, is set to a desired height to scrape the top surface of formed portion 232 as the adjustable form 202 moves from the tenth location to the eleventh location to create a smooth top surface 252.

By repeating this process of continually adjusting the forming chamber, moving the adjustable form 202, dispensing additional material, and consolidating the material, an entire object can be made. As will be appreciated, embodiments described herein may be used to build a variety of structures including, but not limited to basement walls, stem walls, finished walls, stairs, footings, piles, culverts, beams, doubleT, singleT, columns, septic tanks, distributions boxes, manholes and other structures.

The example process of FIG. 10A through FIG. 20 provides an example of consolidating material in the forming chamber 230 so that newly dispensed material mechanically intermixes with a previously cast, horizontally adjacent section (see e.g., FIG. 11C) and an example of consolidating material in the forming chamber 230 so that newly dispensed material mechanically intermixes with a previously cast, vertically adjacent section (see e.g., FIG. 19B). It will be appreciated that material may be dispensed at a location at which the newly dispensed material is horizontally and vertically adjacent to previously cast material. For example, when forming a current layer, the head 200 may dispense material at a location that is horizontally adjacent to previously cast material of the current layer and vertically adjacent to previously cast material of the previous layer. Consolidation of the material in the forming chamber 230 can be performed to ensure that the newly dispensed material sufficiently fills the forming chamber to take on a desired shape that is at least partially defined by the adjustable form and the previously dispensed material, is void free, and has mechanically intermixed with both the horizontally and vertically adjacent previously cast sections.

Figure 21:
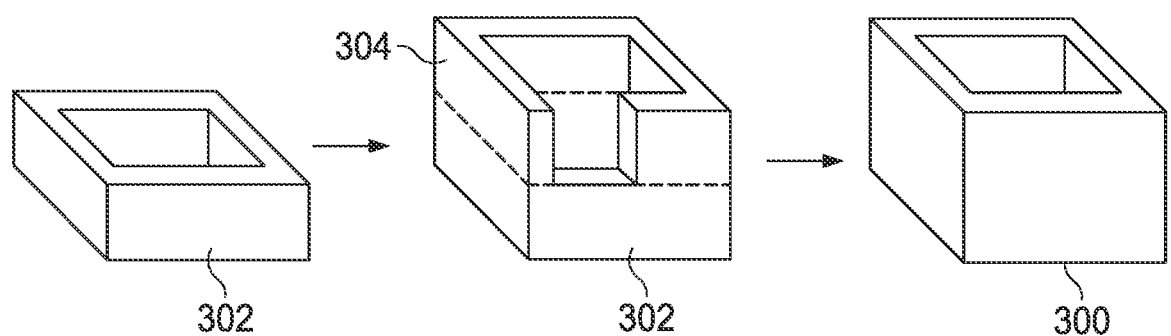
FIG. 21 is a diagrammatic representation of one embodiment of forming an object.

FIG. 21 illustrates one example of building an object 300 from a material such as concrete. In this example, a first layer 302 is built by dynamically configuring an adjustable form (e.g., the adjustable form 202), moving the adjustable form to a series of locations, dispensing material at each location, and consolidating the material. When the first layer 302 has set sufficiently to support a second layer 304 but is in a state in which it can still be consolidated, a second layer 304 is initiated. The head is positioned to dispense material on top of the first layer 302, and additional material is cast and consolidated with the first layer to form a second layer 304. The process is repeated until the final height of the object 300 is achieved. As illustrated, object 300 may be cast as a monolithic object without seams or cold joints between the layers.

Figure 22:
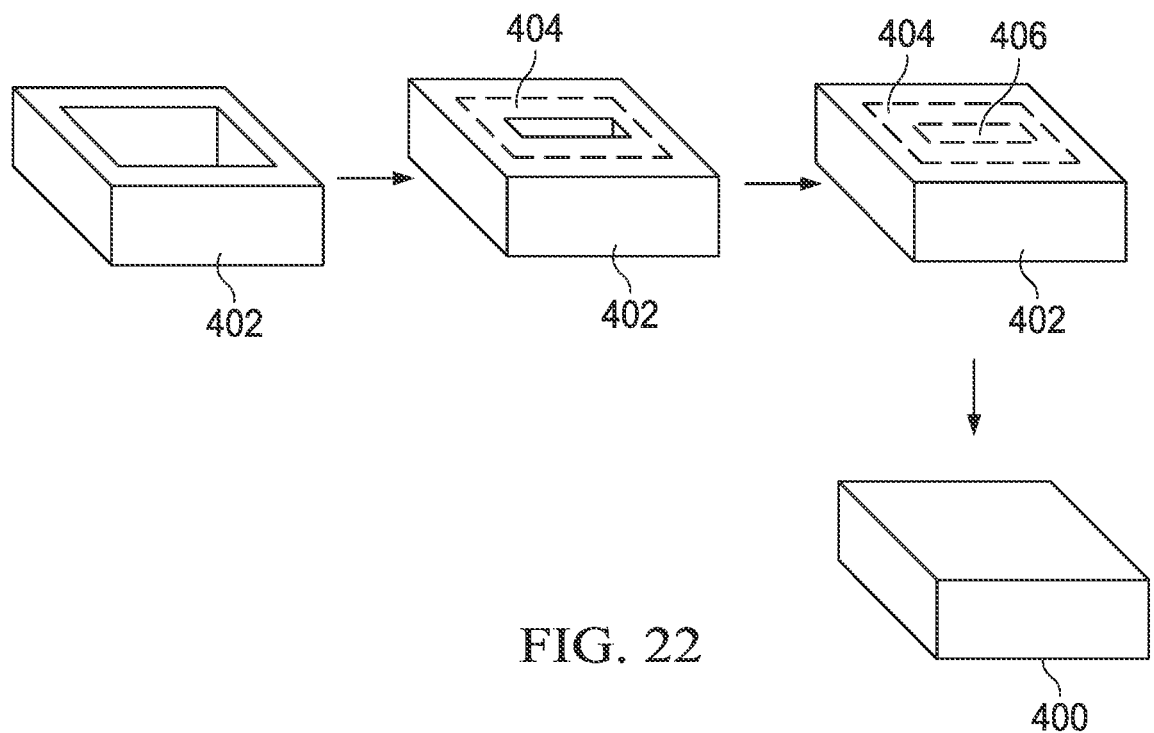
FIG. 22 is a diagrammatic representation of another embodiment of forming an object.

FIG. 22 illustrates another example of building an object 400 from a material such as concrete. In this example, a first portion 402 is built on a substrate by dynamically configuring an adjustable form (e.g., the adjustable form 202), moving the adjustable form to a series of locations, dispensing material at each location, and consolidating the material. When the first portion 402 is in a state that it can still be consolidated, the second portion 404 is initiated. The head is positioned to dispense material adjacent to first portion 402, and additional material is cast to form the second portion 404. The material is consolidated as the second portion 404 is formed so that first portion 402 and second portion 404 form a monolithic structure. With the second portion 404 in a state that it can still be consolidated a third portion 406 is initiated. The head is positioned to dispense material adjacent to second portion 404, and additional material is cast to form the third portion 406. The material is consolidated as third portion 406 is formed so that the third portion 406 forms a monolithic structure with the second portion 404. The process is repeated until a desired coverage is achieved. As illustrated, object 400 may be cast as a monolithic object without seams or cold joints between the adjacent portions.

FIG. 22 is provided by way of example and not limitation. Many different objects can be created, and many different build orders used.

Figure 23:
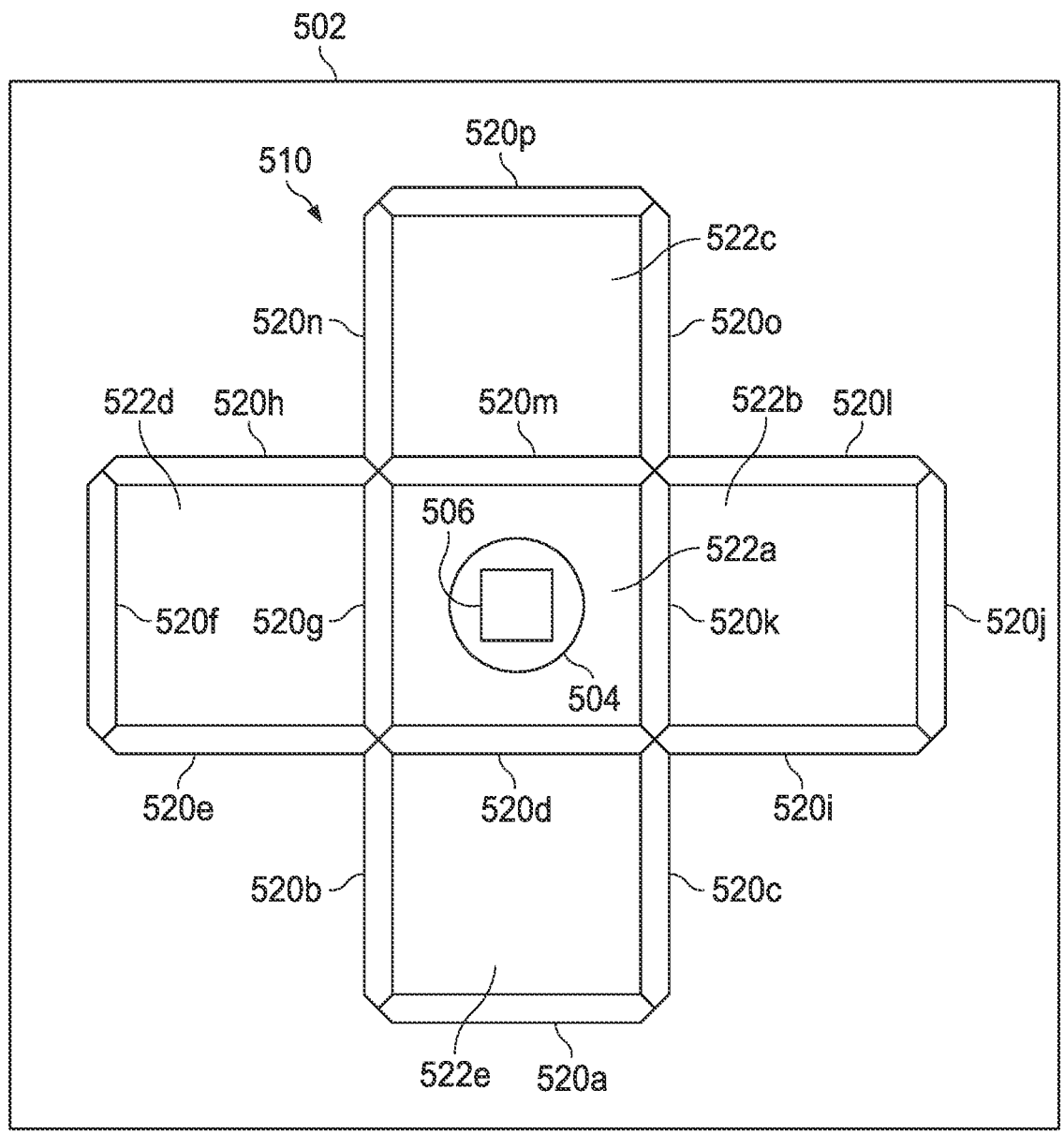
FIG. 23 is a diagrammatic representation of another embodiment of a head.

FIG. 23 is a diagrammatic representation of a bottom view of another embodiment of a head 502, which is another embodiment of head 102. In the embodiment of FIG. 23, head 502 comprises an adjustable form 510, a material delivery hose 504, and a consolidation element 506. In this embodiment, the material delivery hose 504 and consolidation element 506 are placed at the center of the adjustable form 510. The consolidation element 506 comprises a vibrator that can be raised, lowered, and activated as needed.

The adjustable form 510 comprises a plurality of form sections including form section 520a, form section 520b, form section 520c, form section 520d, form section 520e, form section 520f, form section 520g, form section 520h, form section 520i, form section 520j, form section 520k, form section 520l, form section 520m, form section 520n, form section 520o, and form section 520p. In one embodiment, the form sections are provided by a plurality of blade assemblies. The form sections may be selectively actuated to create a forming chamber that comprises chamber portion 522a into which material is dispensed and zero or more of chamber portion 522b, chamber portion 522c, chamber portion 522d, or chamber portion 522e into which material can flow. Adjustable form 510 can be configured similarly to adjustable form 202. According to one embodiment, the consolidation element 506 is controlled so the vibration influences the material dispensed in chamber portion 522a. The vibrations may also extend at least partially into adjoining chamber portions.

Figure 24:
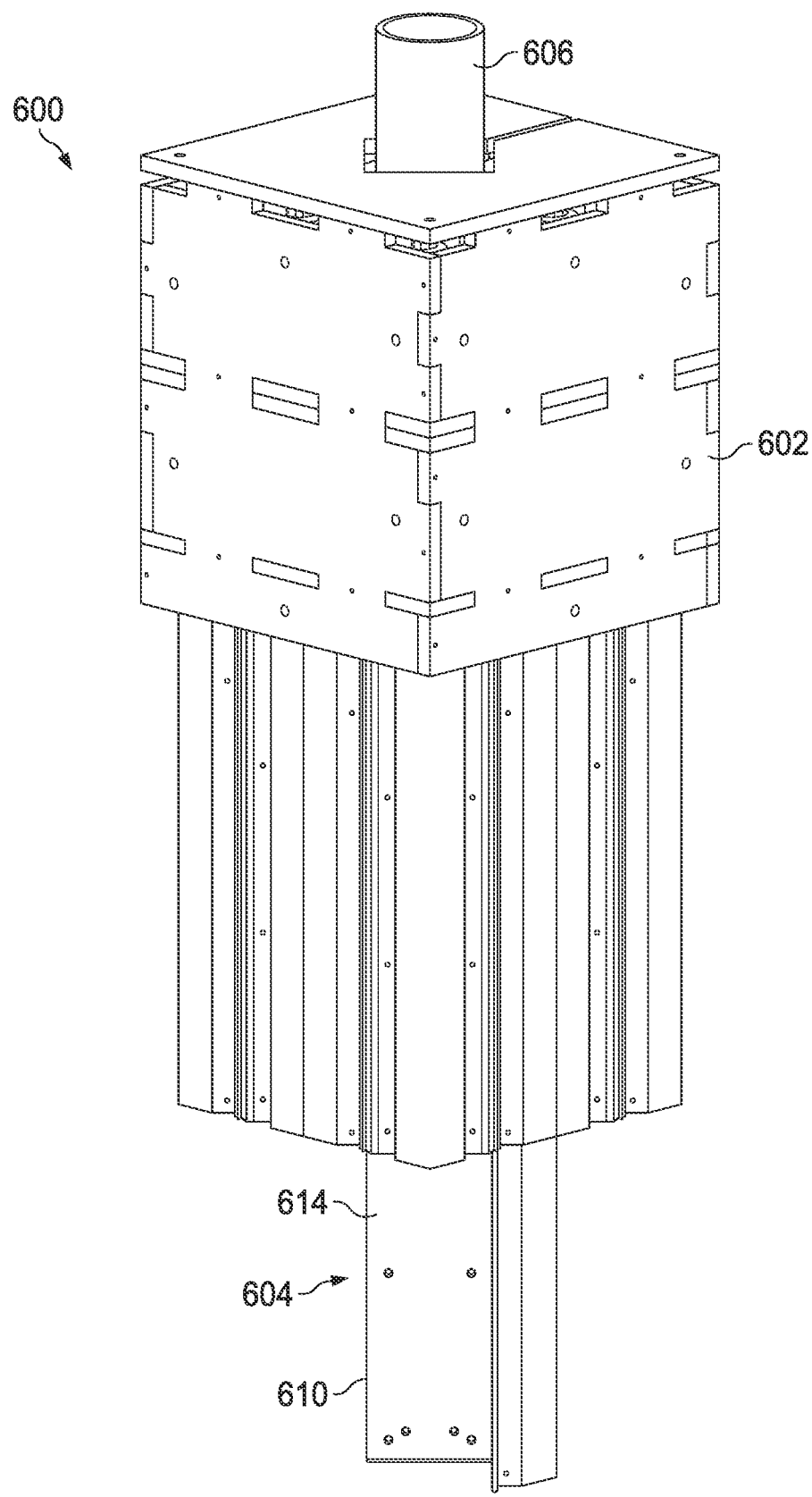
FIG. 24 is a diagrammatic representation of an isometric view of one embodiment of a head.
Figure 25:
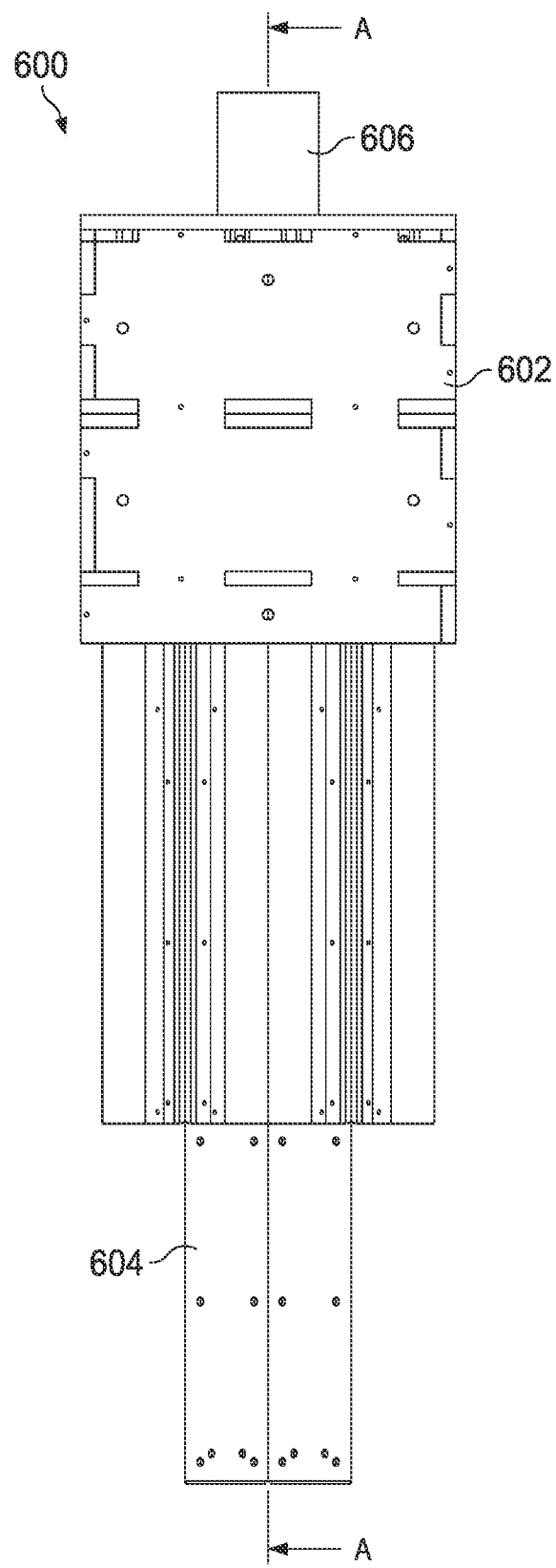
FIG. 25 is a diagrammatic representation of a front view of one embodiment of the head of FIG. 24.
Figure 26:
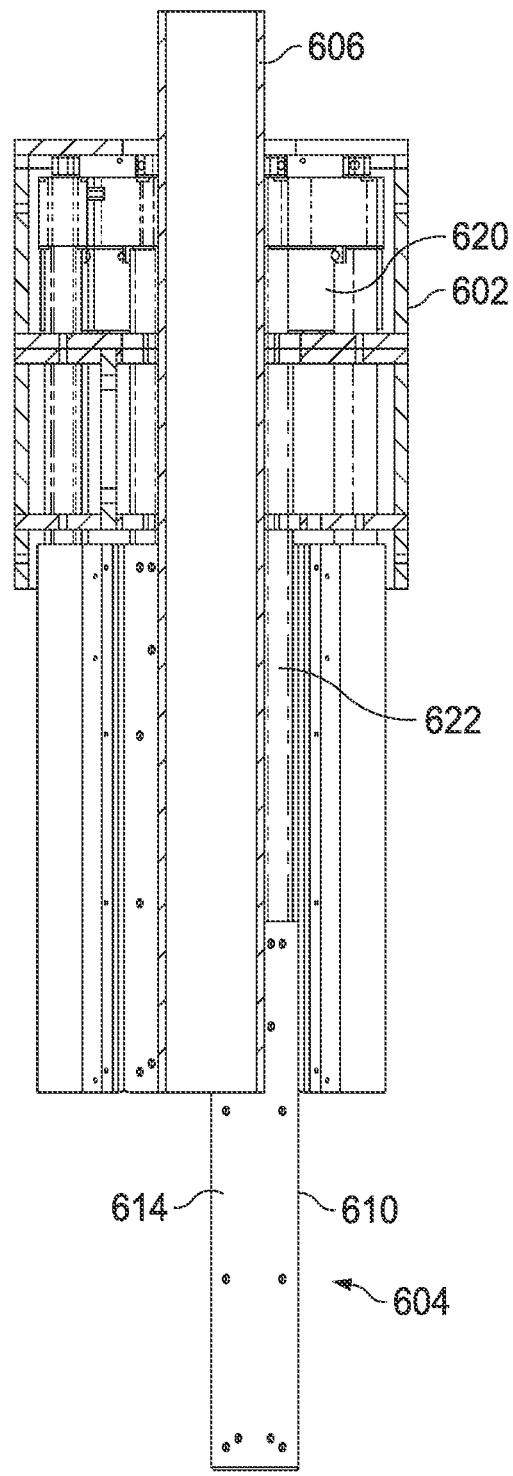
FIG. 26 is a cross-sectional view of the embodiment of FIG. 25.
Figure 27:
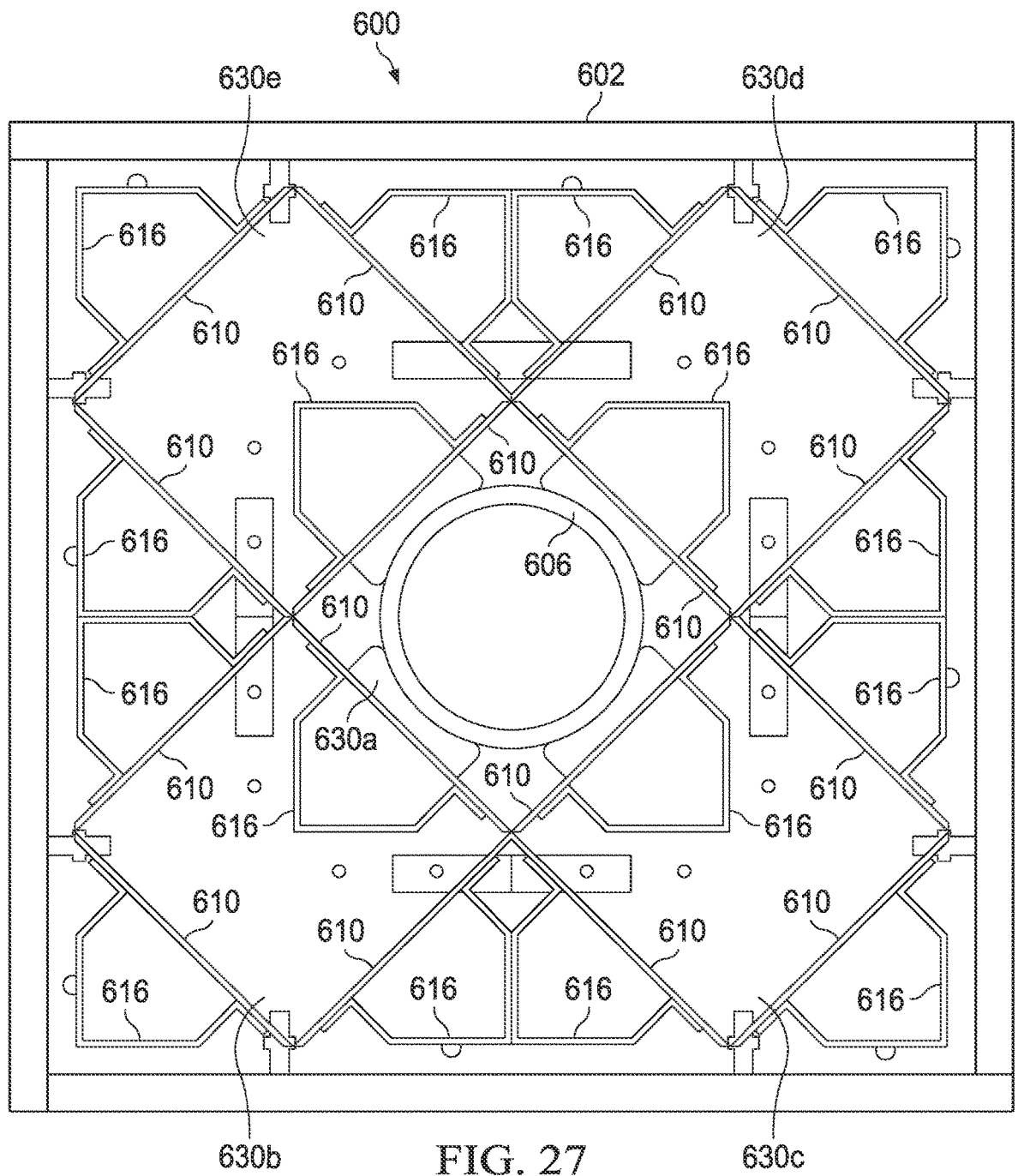
FIG. 27 is a diagrammatic representation of a bottom view of one embodiment of the head.
Figures 28, 29:
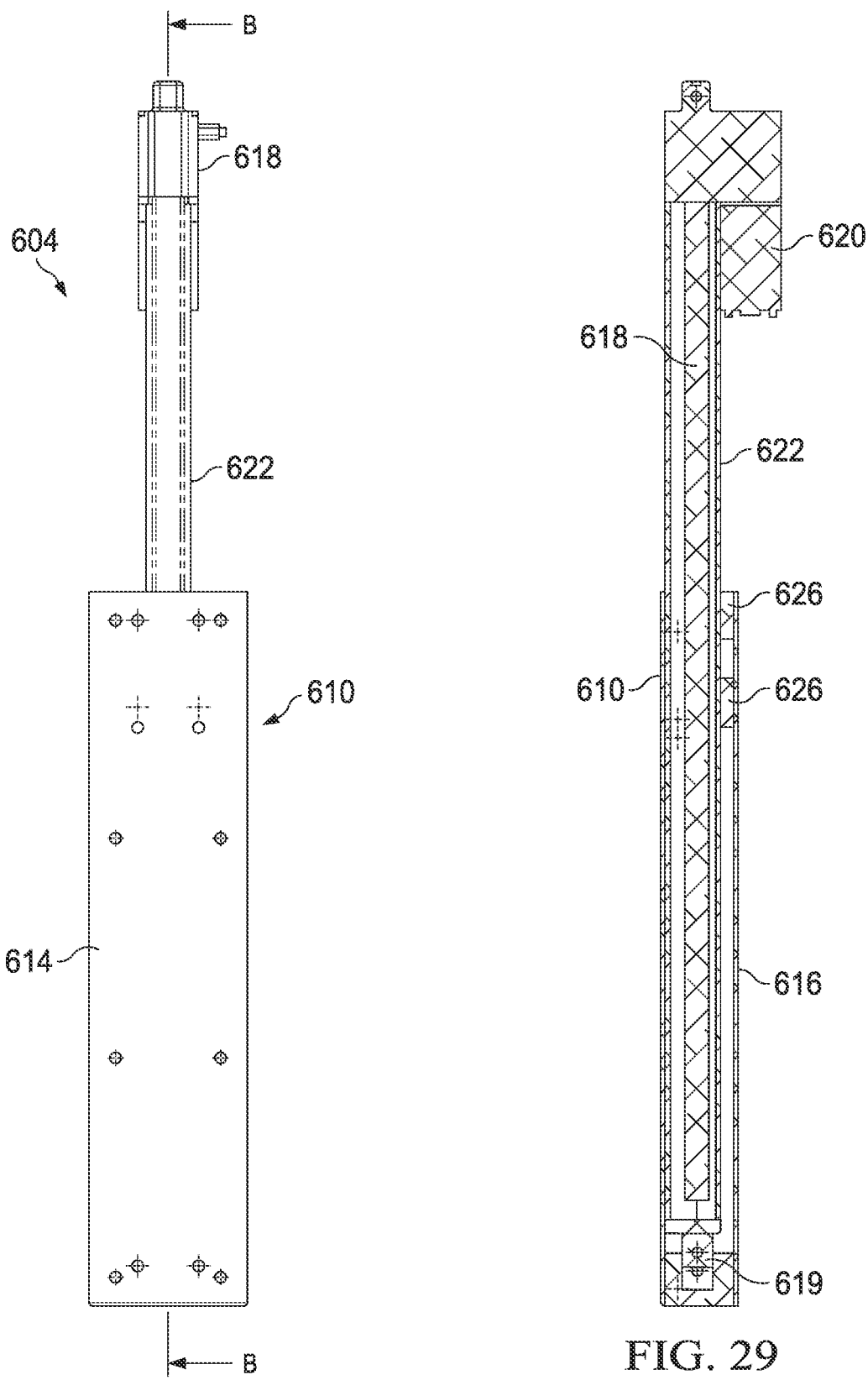
FIG. 28 is a diagrammatic representation of one embodiment of a blade assembly.
FIG. 29 is a cross-sectional view of the embodiment of FIG. 27.

The head may have a variety of configurations and shapes, sizes, and movement mechanisms. FIG. 24 is a diagrammatic representation of an isometric view of one embodiment of a head 600, which may be one example of a head 102, FIG. 25 is a diagrammatic representation of a front view of one embodiment of the head 600, FIG. 26 is an A-A cross-sectional view of the embodiment of FIG. 25, FIG. 27 is a diagrammatic representation of a bottom view of one embodiment of the head 600, FIG. 28 is a diagrammatic representation of one embodiment of a blade assembly 604 of the head 600 and FIG. 29 is a B-B cross-sectional view of the embodiment of FIG. 28. The head 600 may be mounted to a head positioning system (e.g., head positioning system 104 of FIG. 7). The head 600 includes a chassis 602 that carries a plurality of blade assemblies (one blade assembly 604 is indicated in FIG. 24 for simplicity). In some embodiments, a consolidation element, such as one or more vibrators, may also be mounted to chassis 602. A material delivery system (e.g., material delivery system 106 of FIG. 7) provides material to head 600 via a material delivery hose 606 (e.g., a concrete delivery hose).

The head 600 includes an adjustable form into which material can be dispensed via the material delivery hose 606. In particular, the blade assemblies (e.g., blade assembly 604) can actuate blades up and down to shape a forming chamber into which material is dispensed. FIG. 28 is a diagrammatic representation of one embodiment of a blade assembly 604 and FIG. 29 is a cross-section B-B of the blade assembly 604 of FIG. 28. Each blade assembly includes a blade 610 that has a concrete face 614 to abut concrete in the forming chamber. The blade 610 is mounted to a bracket 616 or sleeve which is connected to a telescoping actuator 618, driven by motor 620. The bracket 616 is attached to the actuator by a fixed joint 619. Bushings 626 between the bracket and an outer sleeve 622 allow the bracket to slide along the sleeve 622 as the telescoping actuator 618 extends and retracts.

In the illustrated embodiment, actuator 618 is a motor driven actuator. Other embodiments may use other types of actuators, such as pneumatic or hydraulic actuators to actuate the form sections. Moreover, while each blade has its own actuator in the embodiment of head 600 illustrated, other embodiments may drive multiple blades (form sections) with a single actuator. For example, a single actuator can control two or more blades. For example, twelve actuators may be used to control sixteen blades. In another embodiment, a transmission/clutch system can be used so that one motor can be applied to multiple blades as selected by the transmission/clutch.

With reference to FIG. 27, the head 600 can include a number of blade assemblies. In this embodiment, the adjustable form comprises a plurality of blades 610 that act as form sections. The blades 610 may be selectively actuated to create a forming chamber that comprises chamber portion 630a into which material is dispensed through material delivery hose 606 and zero or more of chamber portion 630b, chamber portion 630c, chamber portion 630d, or chamber portion 630e into which material can flow. Thus, the forming chamber into which material is dispensed can be dynamically changed by actuating the blades.

Figure 30A:
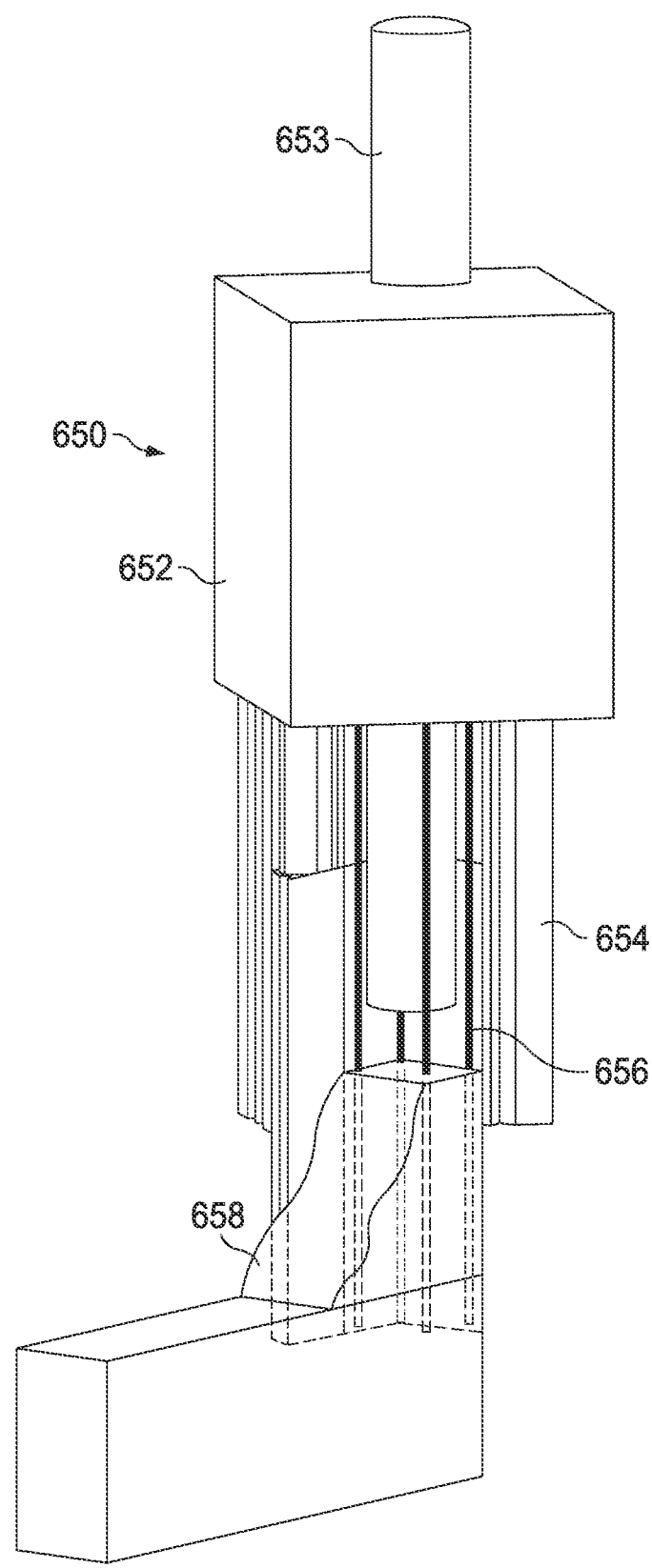
FIG. 30A is a diagrammatic representation of another embodiment of a head and FIG. 30B is a bottom view of the embodiment of FIG. 30A.
Figure 30B:
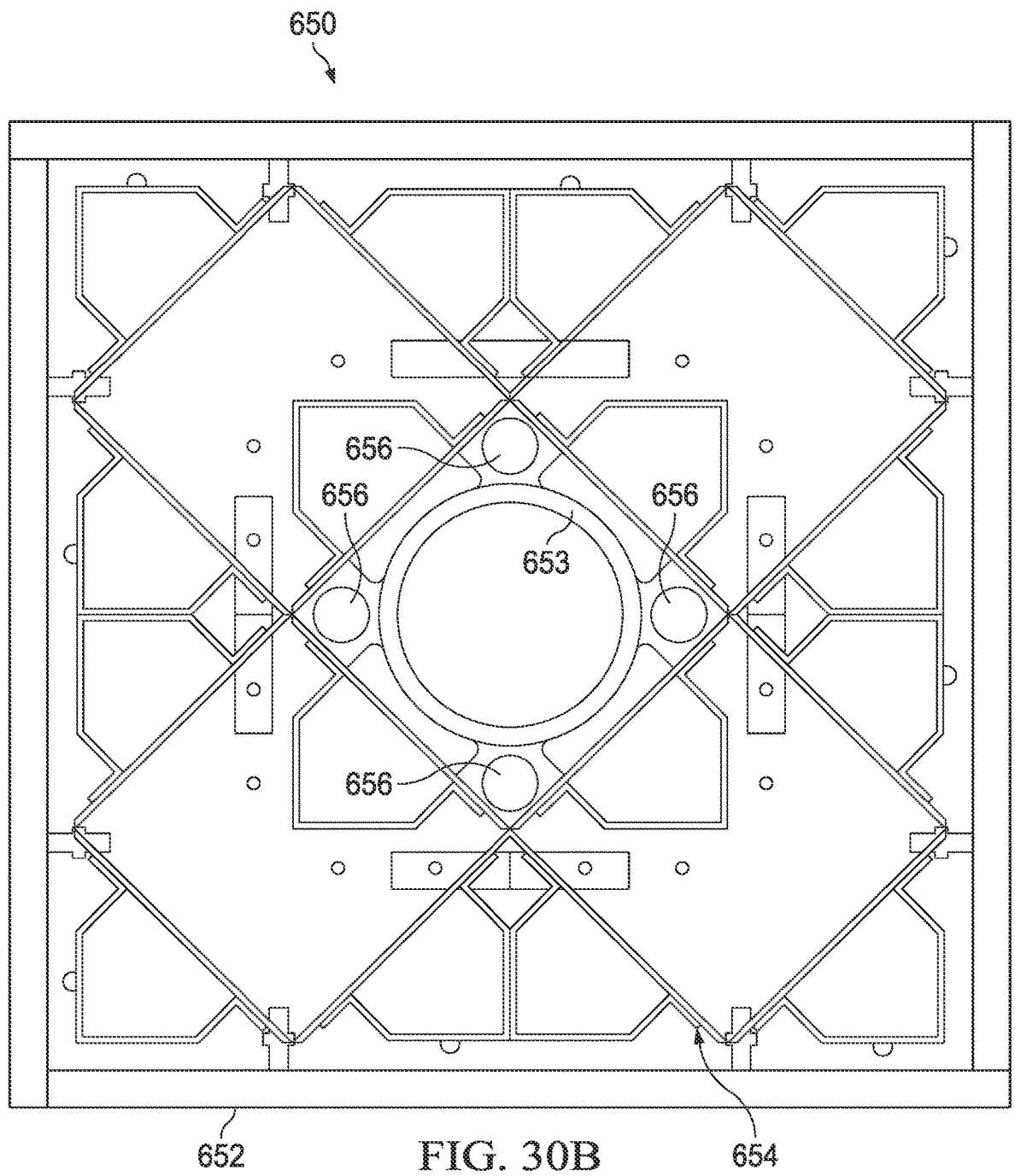

FIG. 30A is a diagrammatic representation of an isometric view of another embodiment of a head 650, which includes a chassis 652 that carries a plurality of blade assemblies 654 and vibrators 656 and FIG. 30B is a bottom view of head 650. The plurality of blade assemblies 654 can be selectively actuated to create a forming chamber having a desired shape. A material delivery hose 653 delivers material to the forming chamber. Head 650 is similar to head 600 but includes vibrators 656 that are coupled to actuators or a single actuator that controls multiple vibrators. The vibrators 656 can be lowered into a material (e.g., material 658) in the forming chamber and retracted when not in use.

In the examples of head 200, head 502, head 600, and head 650 the heads each have sixteen form sections arranged in a set of squares. However, in other embodiments there may be more form sections or fewer form sections. Further, the form sections may be of different lengths to create chamber portions of various sizes. Moreover, embodiments are not limited to form sections that have straight faces. In some embodiments, one or more of the form sections (e.g., blades) may have a curved face that faces the material being molded (e.g., a curved concrete face) or a face that has some other static or dynamically adjustable profile.

Furthermore, in some embodiments, the actuators of a head (e.g., head 200, head 502, head 600) can position the respective form sections in any position in a range of positions from a fully extended position to a fully retracted position.

Figure 31A:
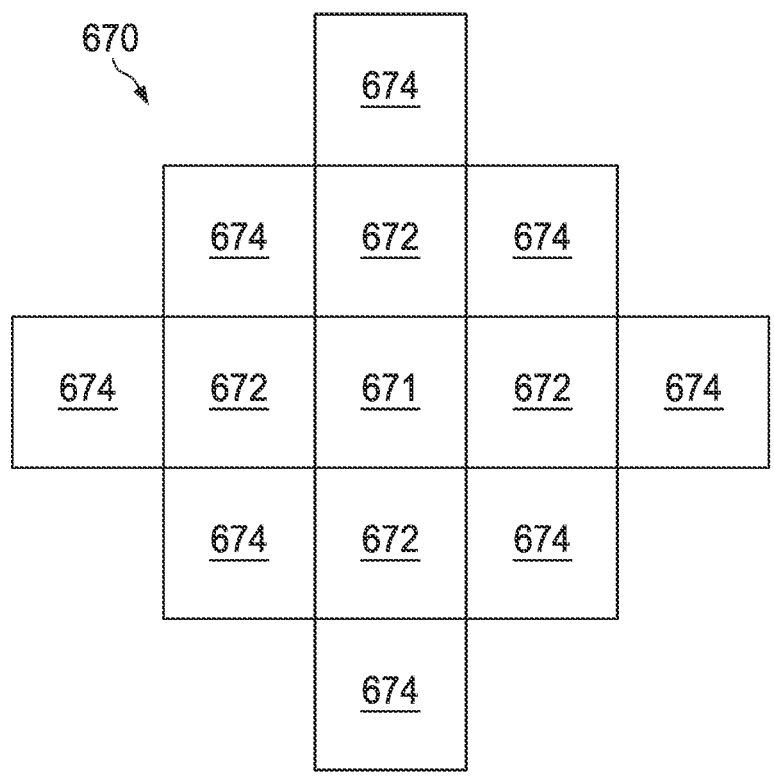
FIG. 31A is a diagrammatic representation of yet another embodiment of a head and FIG. 31B illustrates one embodiment of a form section.
Figure 31B:
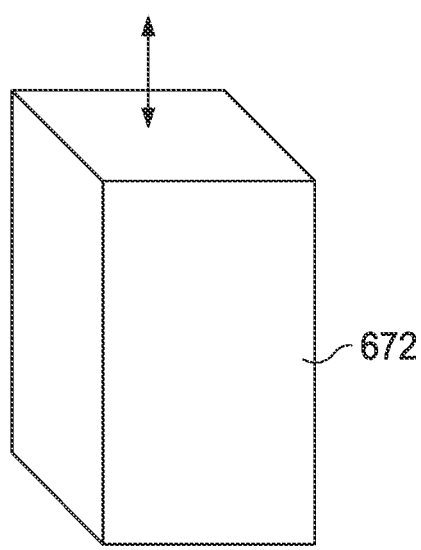

In yet other embodiments, the adjustable form may comprise a set of blocks or bars that can be actuated to fill or expose chamber portions to shape the forming chamber. The blocks or bars may have any desired shape, such as squares, triangles, combinations of geometric shapes. For example, FIG. 31A illustrates one embodiment of a head 670 having a center chamber 671 into which material can be dispensed. Blocks 672 can be retracted or extended (as illustrated in FIG. 31B) to selectively connect additional chamber sections to the center chamber 671. Blocks 674 may be stationary or may also be able to move up and down. Thus, the forming chamber is defined by a set of blocks that act as form sections. In other embodiments, blocks may have any number of other shapes.

In some embodiments, the form sections of an adjustable form may move horizontally outward to facilitate releasing the material in the forming chamber.

In some embodiments, seals are provided between form sections to prevent leakage. In addition, or in the alternative, physical, electromechanical, or electromagnetic alignment features are incorporated into the form sections to ensure that they maintain coplanarity, or orthogonality, or other desirable alignments in its various configurations.

The adjustable form may incorporate some degree of compliance using springs, air or other mechanisms, allowing for passive adjustment to slight variations in material properties.

Figure 32:
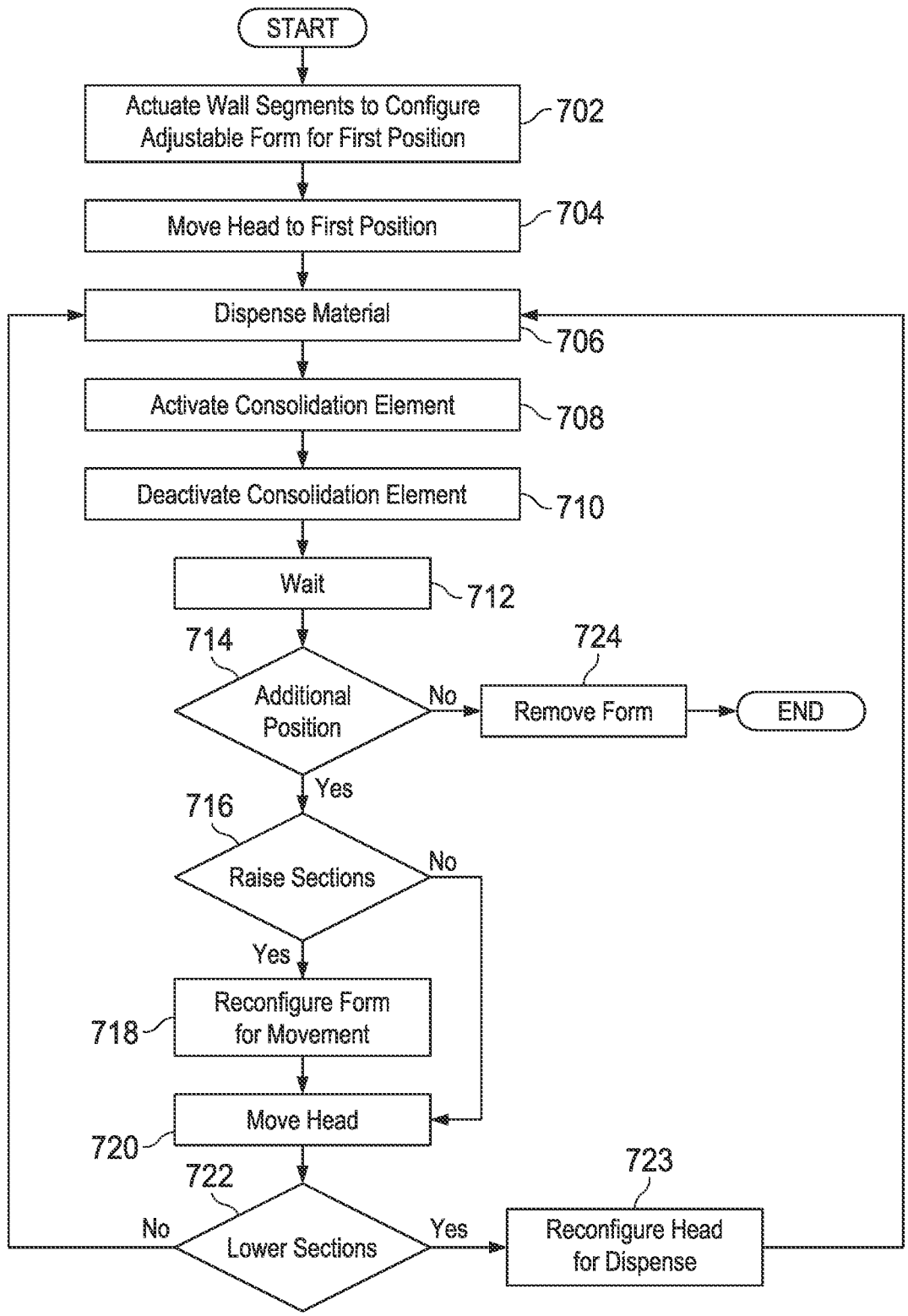
FIG. 32 is a flowchart illustrating one embodiment of a method for additively manufacturing an object.

FIG. 32 is a flowchart for one embodiment of a method for building an object using additive manufacturing. In some embodiments, the various steps may be controlled by a control system, such as control system 108. One or more steps may be embodied in computer software for controlling manufacturing according to a 3D design. At step 702, the control system 108 controls the adjustable form 110 to create a forming chamber having a shape corresponding to a starting location for building the object. At step 704, the control system 108 controls the head positioning system 104 to position the head 102 at the first position. At step 706, the control system 108 controls the material delivery system 106 to dispense a predetermined volume of material—for example, a cementitious material in some embodiments—into the forming chamber at the first location. In some embodiments, the control system 108 dynamically controls adding admixes to the material at the time of dispensing to achieve desired material properties.

At step 708, the control system 108 controls the head 102 to activate a consolidation element. This may include, for example, actuating the consolidation element to lower the consolidation element into the newly dispensed material prior to activating the consolidation element. In other embodiments, consolidation, if performed, is performed by human laborers or additional automated equipment. In still other embodiments, consolidation, if performed, is achieved by transmission of energy without direct contact with the casting material, e.g., using electromagnetic, magnetic, or sonic waves. When the material has been consolidated for a sufficient period of time, for example as programmatically determined, the consolidation element is deactivated and removed from the material (step 710).

In some embodiments, the consolidation element is activated prior or during being moved into the material in the forming chamber so that it is imparting consolidation energy immediately upon contacting the material in the forming chamber. Further, in some embodiments, the consolidation element remains activated during the movement to remove it from the material. Using the example of head 200, the vibrators of consolidation element 206 may be activated prior to the vibrators being lowered into the material in forming chamber 230 (see e.g., FIG. 10C, FIG. 11D, FIG. 19B) and remain activated until they are lifted clear of the material in the forming chamber.

The system may wait before removing the form from the location (step 712). In a particular embodiment, the system waits a sufficient period of time to allow the material (e.g., the cementitious material) to stiffen so that the material can hold its shape without support from the adjustable form 110. For example, the material may be allowed to achieve an early set—that is, an initial set in which some strength is gained but the material remains workable and can be relaxed by agitation. In some embodiments, a cementitious material is maintained in the adjustable form 110 until it achieves a shape-holding state. As will be appreciated by those of skill in the art, the amount of wait time will depend on a variety of factors, including the volume and properties of the material dispensed, environmental factors, and other factors. In some embodiments, the material may stiffen sufficiently immediately or almost immediately upon cessation of consolidation energy.

The control system 108 determines from the object design if additional material should be dispensed at another location (step 714). If the object is complete, the adjustable form can be removed (step 724) and the process ends. If building the object requires adding material at additional locations, the control system determines if the configuration of the adjustable form 110 to be used at the next location has any form sections that are raised in that configuration, but not raised in the current configuration (step 716). If so, those form sections are raised (step 718) and the head moved to the next location (step 720). If not, the head can be moved to the next location (step 720). The control system 108 determines if the configuration of the adjustable head to be used to cast material at the current location has any form sections that are lowered in that configuration, but not lowered in the current configuration (step 722). If not, control can return to step 706. If so, the appropriate form sections are lowered (step 723) and control returns to step 706.

Thus, with the head 102 at the new location and the adjustable form 110 in the correct configuration for that location, control can pass to step 706. The new material can be dispensed, consolidated as needed, which may include consolidating previously dispensed material as well, and allowed to stiffen to a shape-holding state before removing the adjustable form 110. These steps can be repeated for each location until the object is complete.

Various steps include reconfiguring the adjustable form 110. According to one embodiment, the adjustable form 110 may be configured by controlling the head 102 to selectively raise or lower form sections to achieve a forming chamber shape appropriate for a location or to allow the head to move to a next location. In an even more particular embodiment, actuators may be controlled to raise or lower blades or other form sections as appropriate.

Further, some embodiments include consolidating material. Consolidation at step 708 may include applying a consolidation mechanism, such as vibration, to both the newly dispensed material in the forming chamber as well as previously dispensed material so that the newly formed material fills the form chamber to have a shape at least partially defined by the form or the previously dispensed material, is void free, and has mechanically intermixed with horizontally or vertically adjacent previously cast sections.

Further, in some embodiments, an intermediate configuration may include setting a form section to scrape the top surface of a layer as the head 102 moves. For example, at the time that the last layer of the object is being formed, the head 102 may use elements of the adjustable form 110 to scrape the top surface of the layer, thus leveling or screeding the surface.

In some embodiments, a location may correspond to a layer that is on top of a previous layer. The head may be positioned so that the ends of the adjustable form 110 extend below the top surface of the preceding layer allowing the top surface of the preceding layer to be reliquified, mechanically intermixed with the current layer, all while being held within the extended adjustable form.

FIG. 32 is provided by way of example, but not limitation. Various steps may be repeated as needed or desired. Further, steps may be performed in different orders. As just one example, in some instances the head 102 may be moved while or before reconfiguring the adjustable form 110 for a next location. Steps may be omitted, and additional or alternative steps performed.

Figure 33:
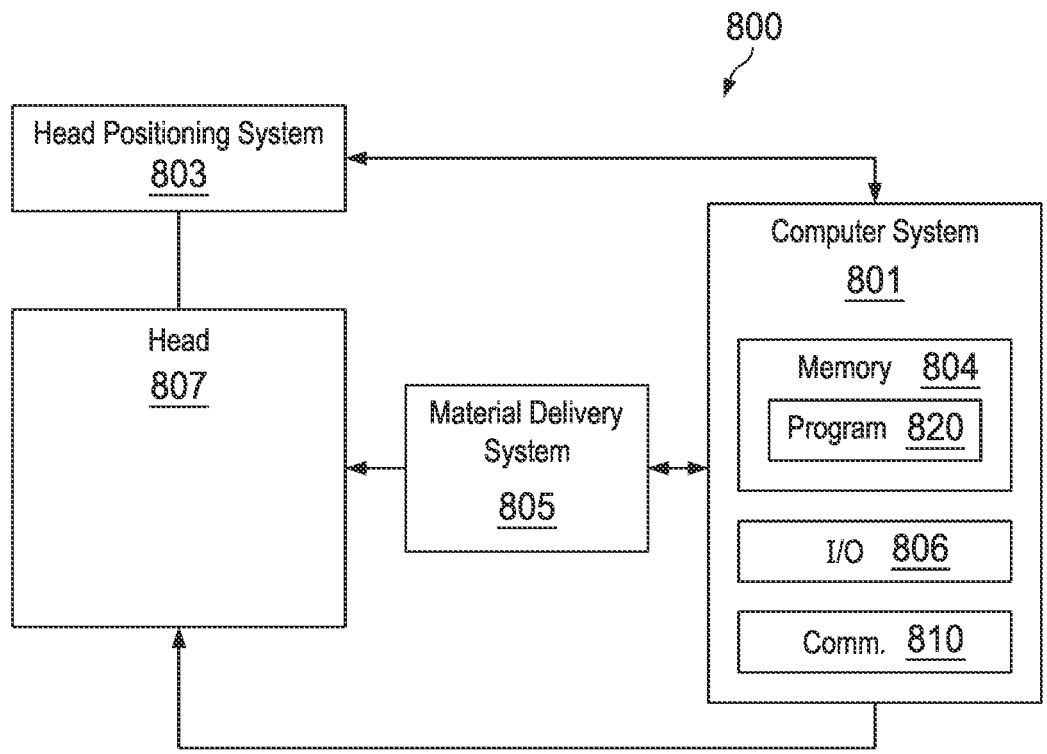
FIG. 33 is a diagrammatic representation of one embodiment of a computing environment.

Embodiments of the technology may be implemented on a computing system. Any combination of mobile desktop, server, embedded or other types of hardware may be used. FIG. 33 is a diagrammatic representation of one embodiment of a computing environment 800 where embodiments disclosed herein can be implemented. The computing environment includes a computer system 801, connected to a head positioning system 803, a material delivery system 805, and a head 807 via communications links. The communications links may include, for example, a network, or various serial communications links for controlling devices or other communications links. A communicating link may represent a combination of wired and wireless networks that the computing environment may utilize for various types of communications.

Computer system 801 may include, for example, a computer processor 802 and associated memory 804. Computer processor 802 comprises an integrated circuit for processing instructions. For example, the computer processor 802 may comprise one or more cores or micro-cores of a processor. Memory 804 may include volatile memory, non-volatile memory, semi-volatile memory, or a combination thereof. Memory 804, for example, may include RAM, ROM, flash memory, a hard disk drive, a solid-state drive, an optical storage medium (e.g., CD-ROM), or other computer readable memory or combination thereof. Memory 804 may implement a storage hierarchy that includes cache memory, primary memory or secondary memory. In some embodiments, memory 804 may include storage space on a data storage array. Computer system 801 may also include input/output ("I/O") devices 806, such as a keyboard, monitor, printer, electronic pointing device (e.g., mouse, trackball, stylus, etc.), or the like. Computer system 801 may also include a communication interface 810, such as a network interface card, or other communications interface, to interface with the communications links.

Memory 804 may store instructions executable by the computer processor 802. For example, memory 804 may include a control program 820 to control the head positioning system 803, the material delivery system 805, and the head 807 to additively manufacture objects. Thus, computer system 801 may be one embodiment of a control system 108.

The computer system 801 may be coupled to a data store that stores data usable by the control program 820. According to one embodiment, the data store may comprise one or more databases, one or more file systems or a combination thereof. In some embodiments, the data store is a portion of memory 804.

For the purpose of illustration, a single computer system is shown for computer system 801. However, computer system 801 may include a plurality of interconnected computers. For example, a plurality of computers may be coupled to a network. Computer system 801 may have more than one processor, memory or other hardware component, though, for the sake of brevity, computer system 801 is illustrated as having one of each of the hardware components, even if more than one is used. Methods or portions thereof described herein may be implemented through execution of suitable software code that may reside within memory 804.

Figure 34:
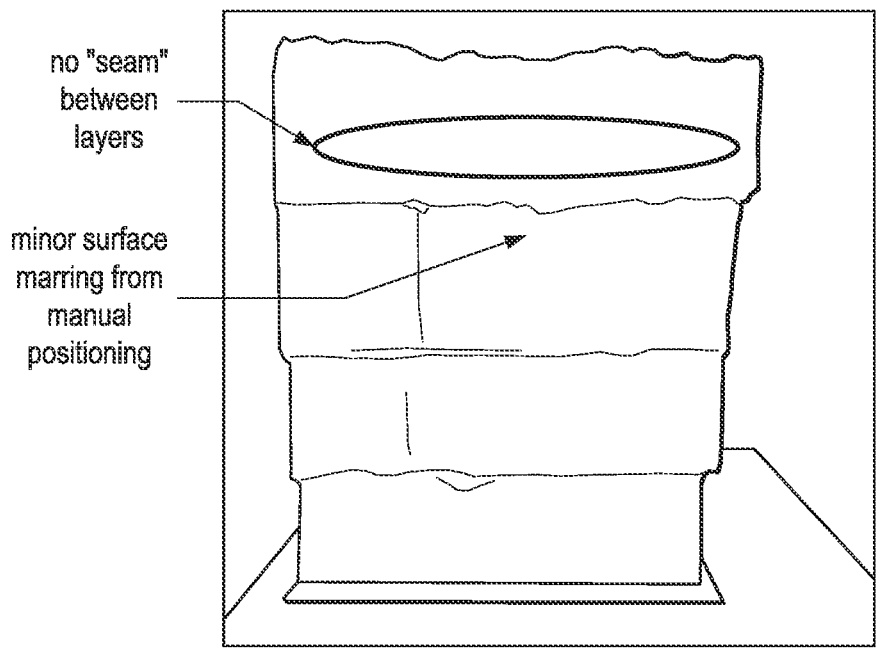
FIG. 34 depicts a wall additively constructed as described herein, but using manual positioning of an adjustable form and manual consolidation, and without leveling the top layer. The wall does not have cold seams between the layers and is cast as a monolithic structure.

FIG. 34 depicts a wall additively constructed as described herein using manual positioning of an adjustable form and manual consolidation, and without leveling the top layer. The wall does not have cold seams between the layers and is cast as a monolithic structure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature, or function, including any such embodiment feature or function described in the Abstract or Summary.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines, or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines, or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware that processes data, signals, or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods, or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems, or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a set", "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description (including the Abstract and Summary) is intended to describe illustrative embodiments, features and functions in order to provide a person of ordinary skill in the art context to understand the invention without limiting the invention to any particularly described embodiment, feature, or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A positioning system, comprising:
a hierarchical positioning system adapted to move an end-effector coupled to the hierarchical positioning system, the hierarchical positioning system comprising a set of positioning systems arranged in a hierarchy such that a coarse positioning system of the set of positioning systems is adapted to move a finer positioning system of the set of positioning systems and the end-effector, and the finer positioning system is adapted to move the end-effector; and
a control system adapted to control the hierarchical positioning system by:
performing a coarse positioning step, wherein performing the coarse positioning step comprises controlling the coarse positioning system of the hierarchical positioning system to move finer positioning system and the end-effector to a first position associated with a plan; and
subsequent to performing the coarse positioning step, performing a refinement positioning step, wherein performing the refinement positioning step comprises:
obtaining sensed position data associated with an actual position of the end-effector, and
controlling the finer positioning system of the hierarchical positioning system to move the end-effector based on a determination of the difference between the first position and the actual position of the end-effector.

2. The system of claim 1, wherein the coarse positioning system and finer positioning system are a crane, a gantry, a tower and cable positioning system, a robotic arm, SCARA, delta system, or a hexapod.

3. The system of claim 2, wherein the coarse positioning system and the finer positioning system comprise the same positioning system.

4. The system of claim 1, wherein the control system is adapted to control the hierarchical positioning system by:
subsequent to performing the refinement positioning step, performing a closed-loop adaptive positioning step, wherein performing the adaptive positioning step comprises:
obtaining sensed domain data associated with an environment, including sensed domain data associated with the end-effector and an object in the environment; and
controlling at least the finer positioning system of the hierarchical positioning system to move the end-effector to a desired position relative to the object in the environment based on the sensed domain data.

5. The system of claim 4, wherein the plan is associated with the object and the adaptive positioning step is adapted to compensate for a deviation between the object and the plan associated with the object.

6. The system of claim 4, wherein a domain sensor for sensing the sensed domain data is incorporated into the end-effector.

7. The system of claim 6, wherein the end-effector is an adaptive building head.

8. The system of claim 1, wherein the coarse positioning step is open-loop and the refinement positioning step is closed-loop.

9. A method, comprising:
controlling a hierarchical positioning system adapted to move an end-effector coupled to the hierarchical positioning system, wherein the hierarchical positioning system comprises a set of positioning systems arranged in a hierarchy such that a coarse positioning system of the set of positioning systems is adapted to move a finer positioning system of the set of positioning systems and the end-effector, and the finer positioning system is adapted to move the end-effector, wherein the hierarchical positioning system is controlled by:
performing a coarse positioning step, wherein performing the coarse positioning step comprises controlling the coarse positioning system of the hierarchical positioning system to move finer positioning system and the end-effector to a first position associated with a plan; and
subsequent to performing the coarse positioning step, performing a refinement positioning step.

10. The method of claim 9 wherein performing the refinement positioning step comprises:
obtaining sensed position data associated with an actual position of the end-effector, and
controlling the finer positioning system of the hierarchical positioning system to move the end-effector based on a determination of the difference between the first position and the actual position of the end-effector.

11. The method of claim 9, wherein the coarse positioning system and finer positioning system are a crane, a gantry, a tower and cable positioning system, a robotic arm, or a hexapod.

12. The method of claim 10, wherein the coarse positioning system and the finer positioning system comprise the same positioning system.

13. The method of claim 9, wherein the hierarchical positioning system is controlled by:
subsequent to performing the refinement positioning step, performing a closed-loop adaptive positioning step, wherein performing the adaptive positioning step comprises:
obtaining sensed domain data associated with an environment, including sensed domain data associated with the end-effector and an object in the environment; and
controlling at least the finer positioning system of the hierarchical positioning system to move the end-effector to a desired position relative to the object in the environment based on the sensed domain data.

14. The method of claim 13, wherein the plan is associated with the object and the adaptive positioning step is adapted to compensate for a deviation between the object and the plan associated with the object.

15. The method of claim 13, wherein a domain sensor for sensing the sensed domain data is incorporated into the end-effector.

16. The method of claim 15, wherein the end-effector is an adaptive building head.

17. The method of claim 9, wherein the coarse positioning step is open-loop and the refinement positioning step is closed-loop.

18. A non-transitory computer readable medium, comprising instructions for:
controlling a hierarchical positioning system adapted to move an end-effector coupled to the hierarchical positioning system, wherein the hierarchical positioning system comprises a set of positioning systems arranged in a hierarchy such that a coarse positioning system of the set of positioning systems is adapted to move a finer positioning system of the set of positioning systems and the end-effector, and the finer positioning system is adapted to move the end-effector, wherein the hierarchical positioning system is controlled by:
- performing a coarse positioning step, wherein performing the coarse positioning step comprises controlling the coarse positioning system of the hierarchical positioning system to move finer positioning system and the end-effector to a first position associated with a plan; and
- subsequent to performing the coarse positioning step, performing a refinement positioning step, wherein performing the refinement positioning step comprises:
  - obtaining sensed position data associated with an actual position of the end-effector, and
  - controlling the finer positioning system of the hierarchical positioning system to move the end-effector based on a determination of the difference between the first position and the actual position of the end-effector.

19. The non-transitory computer readable medium of claim 18, wherein the coarse positioning system and finer positioning system are a crane, a gantry, a tower and cable positioning system, a robotic arm, or a hexapod.

20. The non-transitory computer readable medium of claim 19, wherein the coarse positioning system and the finer positioning system comprise the same positioning system.

21. The non-transitory computer readable medium of claim 18, wherein the hierarchical positioning system is controlled by:
- subsequent to performing the refinement positioning step, performing a closed-loop adaptive positioning step, wherein performing the adaptive positioning step comprises:
  - obtaining sensed domain data associated with an environment, including sensed domain data associated with the end-effector and an object in the environment; and
  - controlling at least the finer positioning system of the hierarchical positioning system to move the end-effector to a desired position relative to the object in the environment based on the sensed domain data.

22. The non-transitory computer readable medium of claim 21, wherein the plan is associated with the object and the adaptive positioning step is adapted to compensate for a deviation between the object and the plan associated with the object.

23. The non-transitory computer readable medium of claim 21, wherein a domain sensor for sensing the sensed domain data is incorporated into the end-effector.

24. The non-transitory computer readable medium of claim 23, wherein the end-effector is an adaptive building head.

* * * * *